(12) United States Patent
Chaturvedi et al.

(10) Patent No.: US 8,446,900 B2
(45) Date of Patent: May 21, 2013

(54) SYSTEM AND METHOD FOR TRANSFERRING A CALL BETWEEN ENDPOINTS IN A HYBRID PEER-TO-PEER NETWORK

(75) Inventors: Sivakumar R. Chaturvedi, Allen, TX (US); Satish Gundabathula, Irving, TX (US)

(73) Assignee: Damaka, Inc., Richardson, TX (US)

( * ) Notice: Subject to any disclaimer, the term of this patent is extended or adjusted under 35 U.S.C. 154(b) by 299 days.

(21) Appl. No.: 12/818,931

(22) Filed: Jun. 18, 2010

(65) Prior Publication Data
US 2011/0310886 A1 Dec. 22, 2011

(51) Int. Cl.
*H04L 12/66* (2006.01)
*H04M 3/42* (2006.01)

(52) U.S. Cl.
USPC .......................................................... 370/352

(58) Field of Classification Search
USPC ............ 370/352; 379/208.01, 212.01, 218.02
See application file for complete search history.

(56) References Cited

U.S. PATENT DOCUMENTS

| | | | |
|---|---|---|---|
| 5,442,637 A | 8/1995 | Nguyen | |
| 5,761,309 A | 6/1998 | Ohashi et al. | |
| 5,790,637 A | 8/1998 | Johnson et al. | |
| 5,818,447 A | 10/1998 | Wolf et al. | |
| 5,889,762 A | 3/1999 | Pajuvirta et al. | |
| 6,031,818 A | 2/2000 | Lo et al. | |
| 6,128,283 A | 10/2000 | Sabaa et al. | |
| 6,141,687 A | 10/2000 | Blair | |
| 6,161,082 A | 12/2000 | Goldberg et al. | |
| 6,202,084 B1 | 3/2001 | Kumar et al. | |
| 6,219,638 B1 | 4/2001 | Padmanabhan et al. | |
| 6,298,129 B1 | 10/2001 | Culver et al. | |
| 6,311,150 B1 | 10/2001 | Ramaswamy et al. | |
| 6,343,067 B1 | 1/2002 | Drottar et al. | |
| 6,360,196 B1 | 3/2002 | Poznaski et al. | |
| 6,389,016 B1 | 5/2002 | Sabaa et al. | |
| 6,438,376 B1 | 8/2002 | Elliott et al. | |
| 6,473,425 B1 | 10/2002 | Bellaton et al. | |
| 6,574,668 B1 | 6/2003 | Gubbi et al. | |
| 6,741,691 B1 | 5/2004 | Ritter et al. | |
| 6,754,181 B1 | 6/2004 | Elliott et al. | |
| 6,766,373 B1 | 7/2004 | Beadle et al. | |
| 6,826,613 B1 | 11/2004 | Wang et al. | |
| 6,836,765 B1 | 12/2004 | Sussman | |
| 6,842,460 B1 | 1/2005 | Olkkonen et al. | |

(Continued)

FOREIGN PATENT DOCUMENTS

| EP | 1404082 A2 | 3/2004 |
|---|---|---|
| EP | 160339 A1 | 12/2005 |

(Continued)

OTHER PUBLICATIONS

Mahy et al., The Session Initiation Protocol (SIP) "Replaces" Header, Sep. 2004, RFC 3891, pp. 1-16.*

(Continued)

*Primary Examiner* — Asad Nawaz
*Assistant Examiner* — Nicholas A Jensen
(74) *Attorney, Agent, or Firm* — Howison & Arnott, L.L.P.

(57) ABSTRACT

An improved system and method are disclosed for peer-to-peer communications. In one example, the method enables an endpoint to move (e.g., transfer or forward) a call to another endpoint in a peer-to-peer environment.

11 Claims, 40 Drawing Sheets

U.S. PATENT DOCUMENTS

| | | |
|---|---|---|
| 6,850,769 B2 | 2/2005 | Grob et al. |
| 6,898,413 B2 | 5/2005 | Yip et al. |
| 6,912,278 B1 | 6/2005 | Hamilton |
| 6,940,826 B1 | 9/2005 | Simard et al. |
| 6,963,555 B1 | 11/2005 | Brenner et al. |
| 6,975,718 B1 | 12/2005 | Pearce et al. |
| 6,987,756 B1 | 1/2006 | Ravindranath et al. |
| 6,999,575 B1 | 2/2006 | Sheinbein |
| 6,999,932 B1 | 2/2006 | Zhou |
| 7,006,508 B2 | 2/2006 | Bondy et al. |
| 7,010,109 B2 | 3/2006 | Gritzer et al. |
| 7,013,155 B1 | 3/2006 | Ruf et al. |
| 7,079,529 B1 | 7/2006 | Khuc |
| 7,080,158 B1 | 7/2006 | Squire |
| 7,092,385 B2 | 8/2006 | Gallant et al. |
| 7,117,526 B1 | 10/2006 | Short |
| 7,123,710 B2 | 10/2006 | Ravishankar |
| 7,184,415 B2 | 2/2007 | Chaney et al. |
| 7,272,377 B2 | 9/2007 | Cox et al. |
| 7,302,496 B1 | 11/2007 | Metzger |
| 7,304,985 B2 | 12/2007 | Sojka et al. |
| 7,345,999 B2 | 3/2008 | Su et al. |
| 7,346,044 B1 | 3/2008 | Chou et al. |
| 7,353,252 B1 | 4/2008 | Yang et al. |
| 7,353,255 B2 | 4/2008 | Acharya et al. |
| 7,412,374 B1 | 8/2008 | Seiler et al. |
| 7,457,279 B1 | 11/2008 | Scott et al. |
| 7,477,282 B2 | 1/2009 | Firestone et al. |
| 7,487,248 B2 | 2/2009 | Moran et al. |
| 7,512,652 B1 | 3/2009 | Appelman et al. |
| 7,542,472 B1 | 6/2009 | Gerendai et al. |
| 7,570,743 B2 | 8/2009 | Barclay et al. |
| 7,574,523 B2 | 8/2009 | Traversat et al. |
| 7,590,758 B2 | 9/2009 | Takeda et al. |
| 7,613,171 B2 | 11/2009 | Zehavi et al. |
| 7,623,476 B2 | 11/2009 | Ravikumar et al. |
| 7,623,516 B2 | 11/2009 | Chaturvedi et al. |
| 7,656,870 B2 | 2/2010 | Ravikumar et al. |
| 7,664,495 B1 | 2/2010 | Bonner et al. |
| 7,769,881 B2 | 8/2010 | Matsubara et al. |
| 7,774,495 B2 | 8/2010 | Pabla et al. |
| 7,778,187 B2 | 8/2010 | Chaturvedi et al. |
| 7,782,866 B1 | 8/2010 | Walsh et al. |
| 7,917,584 B2 | 3/2011 | Arthursson |
| 8,009,586 B2 | 8/2011 | Chaturvedi et al. |
| 8,065,418 B1 | 11/2011 | Abuan et al. |
| 2002/0031212 A1 | 3/2002 | O'Neil et al. |
| 2002/0037000 A1 | 3/2002 | Park et al. |
| 2002/0038282 A1 | 3/2002 | Montgomery |
| 2002/0042769 A1 | 4/2002 | Gujral et al. |
| 2002/0062285 A1 | 5/2002 | Amann et al. |
| 2002/0064167 A1 | 5/2002 | Khan et al. |
| 2002/0080719 A1 | 6/2002 | Parkvall et al. |
| 2002/0087887 A1 | 7/2002 | Busam et al. |
| 2002/0097150 A1 | 7/2002 | Sandelman et al. |
| 2002/0118810 A1* | 8/2002 | Akhteruzzaman et al. ............ 379/212.01 |
| 2002/0120757 A1 | 8/2002 | Sutherland et al. |
| 2002/0143548 A1 | 10/2002 | Korall et al. |
| 2002/0150110 A1 | 10/2002 | Inbar et al. |
| 2002/0166053 A1 | 11/2002 | Wilson |
| 2002/0173303 A1 | 11/2002 | Shibutani |
| 2002/0176404 A1 | 11/2002 | Girard |
| 2002/0178087 A1 | 11/2002 | Henderson et al. |
| 2002/0184310 A1 | 12/2002 | Traversat et al. |
| 2003/0009565 A1 | 1/2003 | Arao |
| 2003/0031210 A1 | 2/2003 | Harris |
| 2003/0035441 A1 | 2/2003 | Cheng et al. |
| 2003/0043764 A1 | 3/2003 | Kim et al. |
| 2003/0044020 A1 | 3/2003 | Aboba et al. |
| 2003/0046056 A1 | 3/2003 | Godoy et al. |
| 2003/0046585 A1 | 3/2003 | Minnick |
| 2003/0061025 A1 | 3/2003 | Abir |
| 2003/0061481 A1 | 3/2003 | Levine et al. |
| 2003/0072485 A1 | 4/2003 | Guerin et al. |
| 2003/0076815 A1 | 4/2003 | Miller et al. |
| 2003/0078858 A1 | 4/2003 | Angelopoulos et al. |
| 2003/0088676 A1 | 5/2003 | Smith et al. |
| 2003/0105812 A1 | 6/2003 | Flowers, Jr. et al. |
| 2003/0110047 A1 | 6/2003 | Santosuosso |
| 2003/0115251 A1 | 6/2003 | Fredrickson et al. |
| 2003/0126213 A1 | 7/2003 | Betzler |
| 2003/0135569 A1 | 7/2003 | Khakoo et al. |
| 2003/0137939 A1 | 7/2003 | Dunning et al. |
| 2003/0158722 A1 | 8/2003 | Lord |
| 2003/0163525 A1 | 8/2003 | Hendriks et al. |
| 2003/0163697 A1 | 8/2003 | Pabla et al. |
| 2003/0172145 A1 | 9/2003 | Nguyen |
| 2003/0174707 A1 | 9/2003 | Grob et al. |
| 2003/0177186 A1 | 9/2003 | Goodman et al. |
| 2003/0177422 A1 | 9/2003 | Tararoukhine et al. |
| 2003/0187650 A1 | 10/2003 | Moore et al. |
| 2003/0202480 A1 | 10/2003 | Swami |
| 2003/0214955 A1 | 11/2003 | Kim |
| 2003/0217171 A1 | 11/2003 | Von Stuermer et al. |
| 2003/0217318 A1 | 11/2003 | Choi |
| 2003/0220121 A1 | 11/2003 | Konishi et al. |
| 2004/0005877 A1 | 1/2004 | Vaananen |
| 2004/0024879 A1 | 2/2004 | Dingman et al. |
| 2004/0034776 A1 | 2/2004 | Fernando et al. |
| 2004/0034793 A1 | 2/2004 | Yuan |
| 2004/0039781 A1 | 2/2004 | LaVallee et al. |
| 2004/0044517 A1 | 3/2004 | Palmquist |
| 2004/0052234 A1 | 3/2004 | Ameigeiras et al. |
| 2004/0068567 A1 | 4/2004 | Moran et al. |
| 2004/0100973 A1 | 5/2004 | Prasad |
| 2004/0103212 A1 | 5/2004 | Takeuchi et al. |
| 2004/0128554 A1 | 7/2004 | Maher, III et al. |
| 2004/0133689 A1 | 7/2004 | Vasisht |
| 2004/0139225 A1 | 7/2004 | Takahashi |
| 2004/0139228 A1 | 7/2004 | Takeda et al. |
| 2004/0139230 A1 | 7/2004 | Kim |
| 2004/0143678 A1 | 7/2004 | Chari et al. |
| 2004/0148434 A1 | 7/2004 | Matsubara et al. |
| 2004/0153858 A1 | 8/2004 | Hwang |
| 2004/0158471 A1 | 8/2004 | Davis et al. |
| 2004/0162871 A1 | 8/2004 | Pabla et al. |
| 2004/0203834 A1 | 10/2004 | Mahany |
| 2004/0213184 A1 | 10/2004 | Hu et al. |
| 2004/0228279 A1 | 11/2004 | Midtun et al. |
| 2004/0240399 A1 | 12/2004 | Corrao et al. |
| 2004/0249953 A1 | 12/2004 | Fernandez et al. |
| 2004/0260952 A1 | 12/2004 | Newman et al. |
| 2004/0267527 A1 | 12/2004 | Creamer et al. |
| 2004/0267938 A1 | 12/2004 | Shoroff et al. |
| 2004/0268257 A1 | 12/2004 | Mudusuru |
| 2005/0004982 A1 | 1/2005 | Vernon et al. |
| 2005/0008024 A1 | 1/2005 | Newpol et al. |
| 2005/0033843 A1 | 2/2005 | Shahi et al. |
| 2005/0033985 A1 | 2/2005 | Xu et al. |
| 2005/0050227 A1 | 3/2005 | Michelman |
| 2005/0071481 A1 | 3/2005 | Danieli |
| 2005/0086309 A1 | 4/2005 | Galli et al. |
| 2005/0091407 A1 | 4/2005 | Vaziri et al. |
| 2005/0105524 A1 | 5/2005 | Stevens et al. |
| 2005/0119005 A1 | 6/2005 | Segal et al. |
| 2005/0120073 A1 | 6/2005 | Cho |
| 2005/0130650 A1 | 6/2005 | Creamer et al. |
| 2005/0132009 A1 | 6/2005 | Solie |
| 2005/0136911 A1 | 6/2005 | Csapo et al. |
| 2005/0138119 A1 | 6/2005 | Saridakis |
| 2005/0138128 A1 | 6/2005 | Baniel et al. |
| 2005/0143105 A1 | 6/2005 | Okamoto |
| 2005/0144288 A1 | 6/2005 | Liao |
| 2005/0187781 A1 | 8/2005 | Christensen |
| 2005/0187957 A1 | 8/2005 | Kramer et al. |
| 2005/0195802 A1 | 9/2005 | Klein et al. |
| 2005/0198499 A1 | 9/2005 | Salapaka et al. |
| 2005/0201357 A1 | 9/2005 | Poyhonen |
| 2005/0208947 A1 | 9/2005 | Bahl |
| 2005/0220017 A1 | 10/2005 | Brand et al. |
| 2005/0246193 A1 | 11/2005 | Roever et al. |
| 2005/0249196 A1 | 11/2005 | Ansari et al. |
| 2005/0254440 A1 | 11/2005 | Sorrell |
| 2005/0270992 A1 | 12/2005 | Sanzgiri et al. |
| 2005/0286519 A1 | 12/2005 | Ravikumar et al. |

| | | | |
|---|---|---|---|
| 2006/0002355 A1 | 1/2006 | Baek et al. | |
| 2006/0062180 A1 | 3/2006 | Sayeedi et al. | |
| 2006/0072506 A1 | 4/2006 | Sayeedi et al. | |
| 2006/0120375 A1 | 6/2006 | Ravikumar et al. | |
| 2006/0121902 A1 | 6/2006 | Jagadeesan et al. | |
| 2006/0121986 A1 | 6/2006 | Pelkey et al. | |
| 2006/0148516 A1 | 7/2006 | Reddy et al. | |
| 2006/0168643 A1 | 7/2006 | Howard et al. | |
| 2006/0171534 A1 | 8/2006 | Baughman | |
| 2006/0182100 A1 | 8/2006 | Li et al. | |
| 2006/0183476 A1 | 8/2006 | Morita et al. | |
| 2006/0187926 A1 | 8/2006 | Imai | |
| 2006/0195402 A1 | 8/2006 | Malina et al. | |
| 2006/0203750 A1 | 9/2006 | Ravikumar et al. | |
| 2006/0205436 A1 | 9/2006 | Liu et al. | |
| 2006/0218624 A1 | 9/2006 | Ravikumar et al. | |
| 2006/0230166 A1 | 10/2006 | Philyaw | |
| 2006/0246903 A1 | 11/2006 | Kong et al. | |
| 2006/0258289 A1 | 11/2006 | Dua | |
| 2007/0016921 A1 | 1/2007 | Levi et al. | |
| 2007/0019545 A1 | 1/2007 | Alt et al. | |
| 2007/0025270 A1 | 2/2007 | Sylvain | |
| 2007/0049314 A1* | 3/2007 | Balachandran et al. | 455/518 |
| 2007/0078785 A1 | 4/2007 | Bush et al. | |
| 2007/0082671 A1 | 4/2007 | Feng et al. | |
| 2007/0110043 A1 | 5/2007 | Girard | |
| 2007/0111794 A1 | 5/2007 | Hogan et al. | |
| 2007/0116224 A1 | 5/2007 | Burke et al. | |
| 2007/0130256 A1 | 6/2007 | Moore et al. | |
| 2007/0136459 A1 | 6/2007 | Roche et al. | |
| 2007/0165629 A1 | 7/2007 | Chaturvedi et al. | |
| 2007/0190987 A1 | 8/2007 | Vaananen | |
| 2007/0206563 A1 | 9/2007 | Silver et al. | |
| 2007/0253435 A1 | 11/2007 | Keller et al. | |
| 2007/0260359 A1 | 11/2007 | Benson et al. | |
| 2007/0274276 A1 | 11/2007 | Laroia et al. | |
| 2007/0297430 A1 | 12/2007 | Nykanen et al. | |
| 2008/0005328 A1 | 1/2008 | Shively et al. | |
| 2008/0019285 A1 | 1/2008 | John et al. | |
| 2008/0032695 A1 | 2/2008 | Zhu et al. | |
| 2008/0069105 A1 | 3/2008 | Costa et al. | |
| 2008/0080392 A1 | 4/2008 | Walsh et al. | |
| 2008/0091813 A1 | 4/2008 | Bodlaender | |
| 2008/0123685 A1 | 5/2008 | Varma et al. | |
| 2008/0130639 A1 | 6/2008 | Costa-Requena et al. | |
| 2008/0168440 A1 | 7/2008 | Regnier et al. | |
| 2008/0192756 A1 | 8/2008 | Damola et al. | |
| 2008/0235362 A1 | 9/2008 | Kjesbu et al. | |
| 2008/0235511 A1 | 9/2008 | O'Brien et al. | |
| 2008/0250408 A1 | 10/2008 | Tsui et al. | |
| 2008/0273541 A1 | 11/2008 | Pharn | |
| 2008/0320096 A1 | 12/2008 | Szeto | |
| 2009/0003322 A1 | 1/2009 | Isumi | |
| 2009/0006076 A1 | 1/2009 | Jindal | |
| 2009/0052399 A1 | 2/2009 | Silver et al. | |
| 2009/0055473 A1 | 2/2009 | Synnergren | |
| 2009/0088150 A1 | 4/2009 | Chaturvedi et al. | |
| 2009/0136016 A1 | 5/2009 | Gornoi et al. | |
| 2009/0156217 A1 | 6/2009 | Bajpai | |
| 2009/0182815 A1 | 7/2009 | Czechowski et al. | |
| 2009/0192976 A1 | 7/2009 | Spivack et al. | |
| 2009/0234967 A1 | 9/2009 | Yu et al. | |
| 2009/0240821 A1 | 9/2009 | Juncker et al. | |
| 2009/0257433 A1* | 10/2009 | Mutikainen et al. | 370/392 |
| 2009/0300673 A1 | 12/2009 | Bachet et al. | |
| 2009/0327516 A1 | 12/2009 | Amishima et al. | |
| 2010/0011108 A1 | 1/2010 | Clark et al. | |
| 2010/0011111 A1 | 1/2010 | Vizaei | |
| 2010/0049980 A1 | 2/2010 | Barriga et al. | |
| 2010/0057853 A1* | 3/2010 | Xu et al. | 709/204 |
| 2010/0077023 A1 | 3/2010 | Eriksson | |
| 2010/0098233 A1* | 4/2010 | Mang et al. | 379/208.01 |
| 2010/0107205 A1 | 4/2010 | Foti | |
| 2010/0223047 A1 | 9/2010 | Christ | |
| 2010/0279670 A1 | 11/2010 | Ghai et al. | |
| 2010/0299150 A1 | 11/2010 | Fein et al. | |
| 2010/0299313 A1 | 11/2010 | Orsini et al. | |
| 2010/0312832 A1 | 12/2010 | Allen et al. | |
| 2010/0312897 A1 | 12/2010 | Allen et al. | |
| 2011/0040836 A1 | 2/2011 | Allen et al. | |
| 2011/0099612 A1 | 4/2011 | Lee et al. | |
| 2011/0122864 A1* | 5/2011 | Cherifi et al. | 370/352 |
| 2011/0145687 A1 | 6/2011 | Grigsby et al. | |
| 2011/0314134 A1 | 12/2011 | Foti | |
| 2012/0263144 A1 | 10/2012 | Nix | |

FOREIGN PATENT DOCUMENTS

| | | |
|---|---|---|
| EP | 1638275 A2 | 3/2006 |
| EP | 1848163 A1 | 10/2007 |
| EP | 1988697 A1 | 11/2008 |
| EP | 1988698 A1 | 11/2008 |
| JP | 2005-94600 | 4/2005 |
| JP | 2007-043598 | 2/2007 |
| KR | 10-2005-0030548 | 3/2005 |
| WO | WO 2004/063843 | 7/2004 |
| WO | WO 2005/009019 | 1/2005 |
| WO | WO 03/079635 | 9/2005 |
| WO | 2006064047 A1 | 6/2006 |
| WO | WO 2006/075677 A1 | 7/2006 |

OTHER PUBLICATIONS

Chathapuram, "Security in Peer-To-Peer Networks", Aug. 8. 2001, XP002251813.

International Search Report and Written Opinion of the International Searching Authority from PCT/IB2005/000821, dated Aug. 5, 2005.

International Search Report and Written Opinion of the International Searching Authority from PCT/US2006/032791, dated Dec. 18, 2006.

International Search Report and Written Opinion of the International Searching Authority from PCT/US2006/040312, dated Mar. 2, 2007.

International Search Report and Written Opinion of the International Searching Authority from PCT/US2006/047841, dated Sep. 12, 2008.

International Search Report and Written Opinion of the International Searching Authority from PCT/US2007/002424, dated Aug. 14, 2007.

International Search Report and Written Opinion of the International Searching Authority from PCT/US2007/068820, dated Jun. 11, 2008.

International Search Report and Written Opinion of the International Searching Authority from PCT/US2007/068821, dated Jun. 14, 2008.

International Search Report and Written Opinion of the International Searching Authority from PCT/US2007068823, dated Jun. 1, 2008.

Jeff Tyson, "How Instant Messaging Works", www.verizon.com/learningcenter, Mar. 9, 2005.

Rory Bland, et al,"P2P Routing" Mar. 2002.

Rosenberg, "STUN- Simple Traversal of UDP Through NAT", Sep. 2002, XP015005058.

Salman A. Baset, et al, "An Analysis of the Skype Peer-To-Peer Internet Telephony Protocol", Department of Computer Science, Columbia University, New York, NY, USA, Sep. 15, 2004.

Singh et al., "Peer-to Peer Internet Telephony Using SIP", Department of Computer Science, Columbia University, Oct. 31, 2004, XP-002336408.

Sinha, S. and Oglieski, A., A TCP Tutorial, Nov. 1998 (Date posted on Internet: Apr. 19, 2001) [Retrieved from the Internet <URL:http//www.ssfnet.org/Exchange/tcp/tcpTutorialNotes.html>].

Pejman Khadivi, Terence D. Todd and Dongmei Zhao, "Handoff trigger nodes for hybrid IEEE 802.11 WLAN/cellular networks," Proc. Of IEEE International Conference on Quality of Service in Heterogeneous Wired/Wireless Networks, pp. 164-170, Oct. 18, 2004.

International Search Report and Written Opinion of the International Searching Authority from PCT/US2008/078142, dated Mar. 27, 2009.

International Search Report and Written Opinion of the International Searching Authority from PCT/US2008/084950, dated Apr. 27, 2009.

Hao Wang, Skype VoIP service-architecture and comparison, In: INFOTECH Seminar Advanced Communication Services (ASC), 2005, pp. 4, 7, 8.

Seta, N.; Miyajima, H.; Zhang, L;; Fujii, T., "All-SIP Mobility: Session Continuity on Handover in Heterogeneous Access Environment," Vehicular Technology Conference, 2007. VTC 2007-Spring. IEEE 65th, Apr. 22-25, 2007, pp. 1121-1126.

International Search Report and Written Opinion of the International Searching Authority from PCT/US2008/075141, dated Mar. 5, 2009.

Qian Zhang; Chuanxiong Guo; Zihua Guo; Wenwu Zhu, "Efficient mobility management for vertical handoff between WWAN and WLAN," Communications Magazine, IEEE, vol. 41. issue 11, Nov. 2003, pp. 102-108.

Isaacs, Ellen et al., "Hubbub: A sound-enhanced mobile instant messenger that supports awareness and opportunistic interactions," Proceedings of the SIGCHI Conference on Human Factors in Computing Systems; vol. 4, Issue No. 1; Minneapolis, Minnesota; Apr. 20-25, 2002; pp. 179-186.

PCT: International Preliminary Report on Patentability of PCT/US2008/075141; Mar. 9, 2010; 5 pgs.

PCT: International Preliminary Report on Patentability of PCT/US2007/068820; Dec. 31, 2008; 8 pgs.

PCT: International Preliminary Report on Patentability of PCT/US2007/068823; Nov. 27, 2008; 8 pgs.

PCT: International Preliminary Report on Patentability of PCT/US2006/047841; Nov. 6, 2008; 7 pgs.

PCT: International Preliminary Report on Patentability of PCT/US2007/002424; Aug. 7, 2008; 6 pgs.

PCT: International Preliminary Report on Patentability of PCT/US2006/040312; May 2, 2008; 5 pgs.

PCT: International Preliminary Report on Patentability of PCT/IB2005/000821; Oct. 19, 2006; 10 pgs.

PCT: International Search Report and Written Opinion for PCT/US2011/024870; Oct. 26, 2011; 12 pages.

J. Rosenberg et al. "Session Traversal Utilities for NAT (STUN)", draft—ietf—behave—rtc3489bis-06, Mar. 5, 2007.

PCT: International Search Report and Written Opinion for PCT/US2011/028685; Nov. 9, 2011; 10 pages.

PCT: International Search Report and Written Opinion for PCT/US2011/029954; Nov. 24, 2011; 8 pages.

PCT: International Search Report and Written Opinion for PCT/US2011/024891; Nov. 25, 2011; 9 pages.

PCT: International Search Report and Written Opinion for PCT/US2011/031245; Dec. 26, 2011; 13 pages.

Wireless Application Protocol—Wireless Transport Layer Security Specification, Version Feb. 18, 2000, Wireless Application Forum, Ltd. 2000; 99 pages.

PCT: International Search Report and Written Opinion for PCT/US2011/040864 (counterpart application); Feb. 17, 2012; 8 pages.

PCT: International Preliminary Report on Patentability of PCT/US2008/084950; Jun. 1, 2010; 5 pgs.

PCT: International Search Report and Written Opinion for PCT/US2011/031246; Dec. 27, 2011; 8 pages.

PCT: International Search Report and Written Opinion for PCT/US2011/041565; Jan. 5, 2012; 7 pages.

Balamurugan Karpagavinayagam et al. (Monitoring Architecture for Lawful Interception in VoIP Networks, ICIMP 2007, Aug. 24, 2008).

Blanchet et al; "IPv6 Tunnel Broker with the Tunnel Setup Protocol (TSP)"; May 6, 2008; IETF; IETF draft of RFC 5572, draftblanchet-v6ops-tunnelbroker-tsp-04; pp. 1-33.

Cooper et al; "NAT Traversal for dSIP"; Feb. 25, 2007; IETF; IETF draft draft-matthews-p2psip-dsip-nat traversal-00; pp. 1-23.

Cooper et al; "The Effect of NATs on P2PSIP Overlay Architecture"; IETF; IETF draft draft-matthews-p2psip-nats-and-overlays-01.txt; pp. 1-20, Mar. 4, 2007.

Dunigan, Tom, "Almost TCP over UDP (atou)," last modified Jan. 12, 2004; retrieved on Jan. 18, 2011 from <www.csm.ornl.gov/~dunigan/net100/atou.html> 18 pgs.

J. Rosenberg et al., SIP: Session Initiation Protocol (Jun. 2008) retrieved at http://tools.ietforg/html/rfc3261. Relevant pages provided.

NiceLog User's Manual 385A0114-08 Rev. A2, Mar. 2004.

PCT: International Preliminary Report on Patentability of PCT/US2011/024870; Aug. 30, 2012; 7 pgs.

PCT: International Preliminary Report on Patentability of PCT/US2011/024891; Aug. 30, 2012; 6 pgs.

PCT: International Preliminary Report on Patentability of PCT/US2011/028685; Oct. 4, 2012; 6 pgs.

PCT: International Preliminary Report on Patentability of PCT/US2011/029954; Oct. 11, 2012; 5 pgs.

PCT: International Preliminary Report on Patentability of PCT/US2011/031245; Oct. 26, 2012; 9 pgs.

PCT: International Preliminary Report on Patentability of PCT/US2011/031246; Nov. 8, 2012; 5 pgs.

PCT: International Search Report and Written Opinion for PCT/US2011/049000; Mar. 27, 2012; 10 pages.

PCT: International Search Report and Written Opinion for PCT/US2011/051877; Apr. 13, 2012; 7 pages.

PCT: International Search Report and Written Opinion for PCT/US2011/055101; May 22, 2012; 9 pages.

PCT: International Search Report and Written Opinion for PCT/US2012/046026; Oct. 18, 2012; 6 pages.

Philippe Bazot et al., Developing SIP and IP Multimedia Subsystem (IMS) Applications (Feb. 5, 2007) retrieved at redbooks IBM form No. SG24-7255-00. Relevant pages provided.

RFC 5694 ("Peer-to-Peer (P2P) Architecture: Definition, Taxonomies, Examples, and Applicability", Nov. 2009).

Rosenberg, J; "Interactive Connectivity Establishment (ICE): A Protocol for Network Address Translator (NAT) Traversal for Offer/Answer Protocols"; Oct. 29, 2007; I ETF; I ETF draft of RFC 5245, draft-ietf-mmusic-ice-19; pp. 1-120.

Srisuresh et al; "State of Peer-to-Peer(P2P) Communication Across Network Address Translators(NATs)"; Nov. 19, 2007; I ETF; I ETFdraft for RFC 5128, draft-ietf-behave-p2p-state-06.txt; pp. 1-33.

T. Dierks & E. Rescorla, The Transport Layer Security (TLS) Protocol (Ver. 1.2, Aug. 2008) retrieved tools.ietf.org/htmllrfc5246. Relevant pages provided.

WISPA: Wireless Internet Service Providers Association; WISPA-CS-IPNA-2.0; May 1, 2009.

PCT: International Preliminary Report on Patentability of PCT/US2011/040864; Jan. 3, 2013; 6 pgs.

* cited by examiner

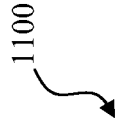

Fig. 11

| Terminating NAT type / Originating NAT type | No NAT | Full Cone | Restricted Cone | Port Restricted Cone | Symmetric |
|---|---|---|---|---|---|
| No NAT | Direct | Direct | Reflect | Reflect | Reflect Port Capture |
| Full Cone | Direct | Direct | Reflect | Reflect | Reflect Port Capture |
| Restricted Cone | Direct | Direct | Fake Packet Reflect | Fake Packet Reflect | Fake Packet Reflect Port Capture |
| Port Restricted Cone | Direct | Direct | Fake Packet Reflect | Fake Packet Reflect | All signaling reflected / All media direct |
| Symmetric | Port Capture | Port Capture | Reflect Fake Packet Port Capture | All signaling reflected / All media direct | All signaling/ media reflected |

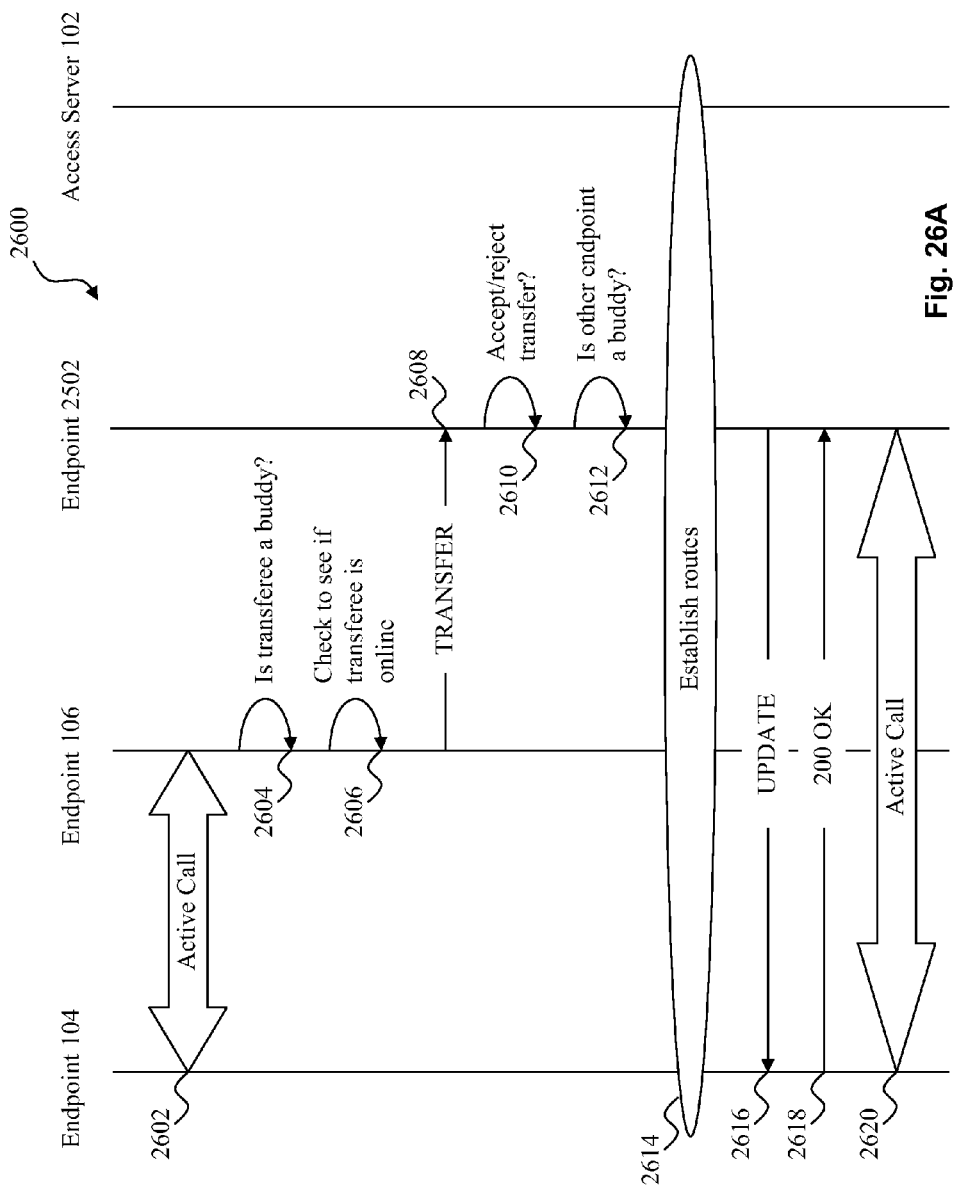

SYSTEM AND METHOD FOR TRANSFERRING A CALL BETWEEN ENDPOINTS IN A HYBRID PEER-TO-PEER NETWORK

INCORPORATION BY REFERENCE

This application incorporates by reference in their entirety U.S. Pat. No. 7,570,636, filed on Aug. 30, 2005, and entitled SYSTEM AND METHOD FOR TRAVERSING A NAT DEVICE FOR PEER-TO-PEER HYBRID COMMUNICATIONS, and U.S. patent application Ser. No. 12/705,925, filed on Feb. 15, 2010, and entitled SYSTEM AND METHOD FOR STRATEGIC ROUTING IN A PEER-TO-PEER ENVIRONMENT.

BACKGROUND

Current packet-based communication networks may be generally divided into peer-to-peer networks and client/server networks. Traditional peer-to-peer networks support direct communication between various endpoints without the use of an intermediary device (e.g., a host or server). Each endpoint may initiate requests directly to other endpoints and respond to requests from other endpoints using credential and address information stored on each endpoint. However, because traditional peer-to-peer networks include the distribution and storage of endpoint information (e.g., addresses and credentials) throughout the network on the various insecure endpoints, such networks inherently have an increased security risk. While a client/server model addresses the security problem inherent in the peer-to-peer model by localizing the storage of credentials and address information on a server, a disadvantage of client/server networks is that the server may be unable to adequately support the number of clients that are attempting to communicate with it. As all communications (even between two clients) must pass through the server, the server can rapidly become a bottleneck in the system.

Accordingly, what is needed are a system and method that addresses these issues.

BRIEF DESCRIPTION OF THE DRAWINGS

For a more complete understanding, reference is now made to the following description taken in conjunction with the accompanying Drawings in which:

FIG. 11 is a table illustrating various NAT types and illustrative embodiments of processes that may be used to traverse each NAT type within the system of FIG. 10.

FIG. 26A is a sequence diagram illustrating one embodiment of a message sequence that may occur when a call is being transferred between endpoints within the environment of FIG. 25 when all the endpoints are buddies.

DETAILED DESCRIPTION

Figure 1:
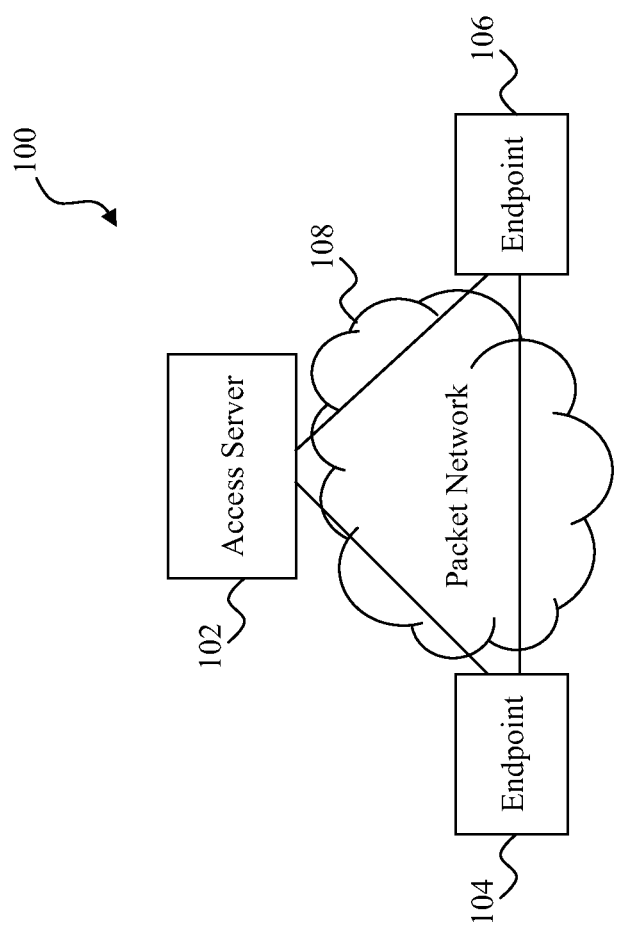
FIG. 1 is a simplified network diagram of one embodiment of a hybrid peer-to-peer system.

The present disclosure is directed to a system and method for peer-to-peer hybrid communications. It is understood that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, one embodiment of a peer-to-peer hybrid system 100 is illustrated. The system 100 includes an access server 102 that is coupled to endpoints 104 and 106 via a packet network 108. Communication between the access server 102, endpoint 104, and endpoint 106 is accomplished using predefined and publicly available (i.e., non-proprietary) communication standards or protocols (e.g., those defined by the Internet Engineering Task Force (IETF) or the International Telecommunications Union-Telecommunications Standard Sector (ITU-T)). For example, signaling communications (e.g., session setup, management, and teardown) may use a protocol such as the Session Initiation Protocol (SIP), while actual data traffic may be communicated using a protocol such as the Real-time Transport Protocol (RTP). As will be seen in the following examples, the use of standard protocols for communication enables the endpoints 104 and 106 to communicate with any device that uses the same standards. The communications may include, but are not limited to, voice calls, instant messages, audio and video, emails, and any other type of resource transfer, where a resource represents any digital data. In the following description, media traffic is generally based on the user datagram protocol (UDP), while authentication is based on the transmission control protocol/internet protocol (TCP/IP). However, it is understood that these are used for purposes of example and that other protocols may be used in addition to or instead of UDP and TCP/IP.

Connections between the access server 102, endpoint 104, and endpoint 106 may include wireline and/or wireless communication channels. In the following description, it is understood that the term "direct" means that there is no endpoint or access server in the communication channel(s) between the endpoints 104 and 106, or between either endpoint and the access server. Accordingly, the access server 102, endpoint 104, and endpoint 106 are directly connected even if other devices (e.g., routers, firewalls, and other network elements) are positioned between them. In addition, connections to endpoints, locations, or services may be subscription based, with an endpoint only having access if the endpoint has a current subscription. Furthermore, the following description may use the terms "user" and "endpoint" interchangeably, although it is understood that a user may be using any of a plurality of endpoints. Accordingly, if an endpoint logs in to the network, it is understood that the user is logging in via the endpoint and that the endpoint represents the user on the network using the user's identity.

The access server 102 stores profile information for a user, a session table to track what users are currently online, and a routing table that matches the address of an endpoint to each online user. The profile information includes a "buddy list" for each user that identifies other users ("buddies") that have previously agreed to communicate with the user. Online users on the buddy list will show up when a user logs in, and buddies who log in later will directly notify the user that they are online (as described with respect to FIG. 4). The access server 102 provides the relevant profile information and routing table to each of the endpoints 104 and 106 so that the endpoints can communicate directly with one another. Accordingly, in the present embodiment, one function of the access server 102 is to serve as a storage location for information needed by an endpoint in order to communicate with other endpoints and as a temporary storage location for requests, voicemails, etc., as will be described later in greater detail.

Figure 2A:
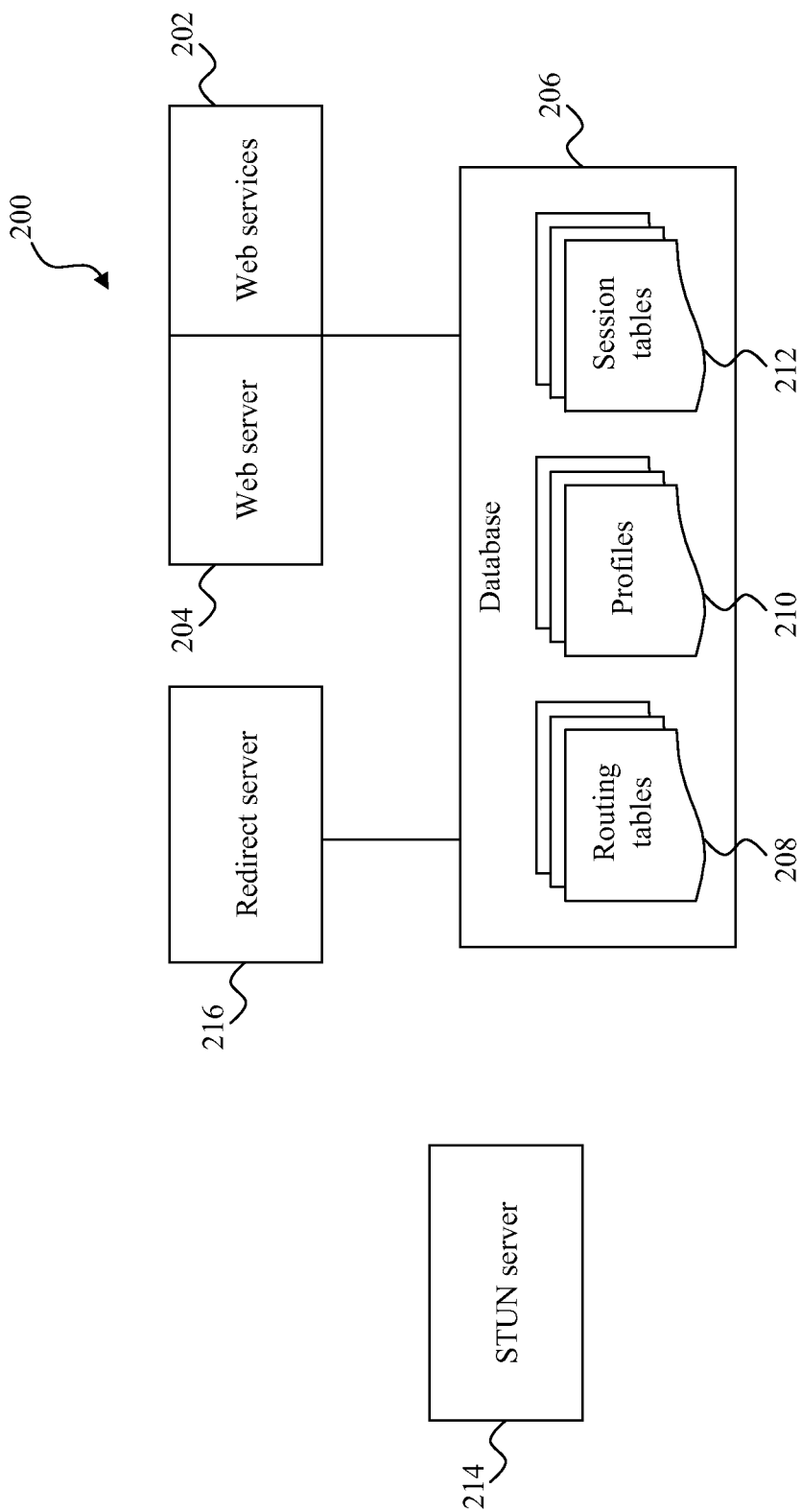
FIG. 2a illustrates one embodiment of an access server architecture that may be used within the system of FIG. 1.

With additional reference to FIG. 2a, one embodiment of an architecture 200 for the access server 102 of FIG. 1 is illustrated. The architecture 200 includes functionality that may be provided by hardware and/or software, and that may be combined into a single hardware platform or distributed among multiple hardware platforms. For purposes of illustration, the access server in the following examples is described as a single device, but it is understood that the term applies equally to any type of environment (including a distributed environment) in which at least a portion of the functionality attributed to the access server is present.

In the present example, the architecture includes web services 202 (e.g., based on functionality provided by XML, SOAP, .NET, MONO), web server 204 (using, for example, Apache or IIS), and database 206 (using, for example, mySQL or SQLServer) for storing and retrieving routing tables 208, profiles 210, and one or more session tables 212. Functionality for a STUN (Simple Traversal of UDP through NATs (Network Address Translation)) server 214 is also present in the architecture 200. As is known, STUN is a protocol for assisting devices that are behind a NAT firewall or router with their packet routing. The architecture 200 may also include a redirect server 216 for handling requests originating outside of the system 100. One or both of the STUN server 214 and redirect server 216 may be incorporated into the access server 102 or may be a standalone device. In the present embodiment, both the server 204 and the redirect server 216 are coupled to the database 206.

Figure 2B:
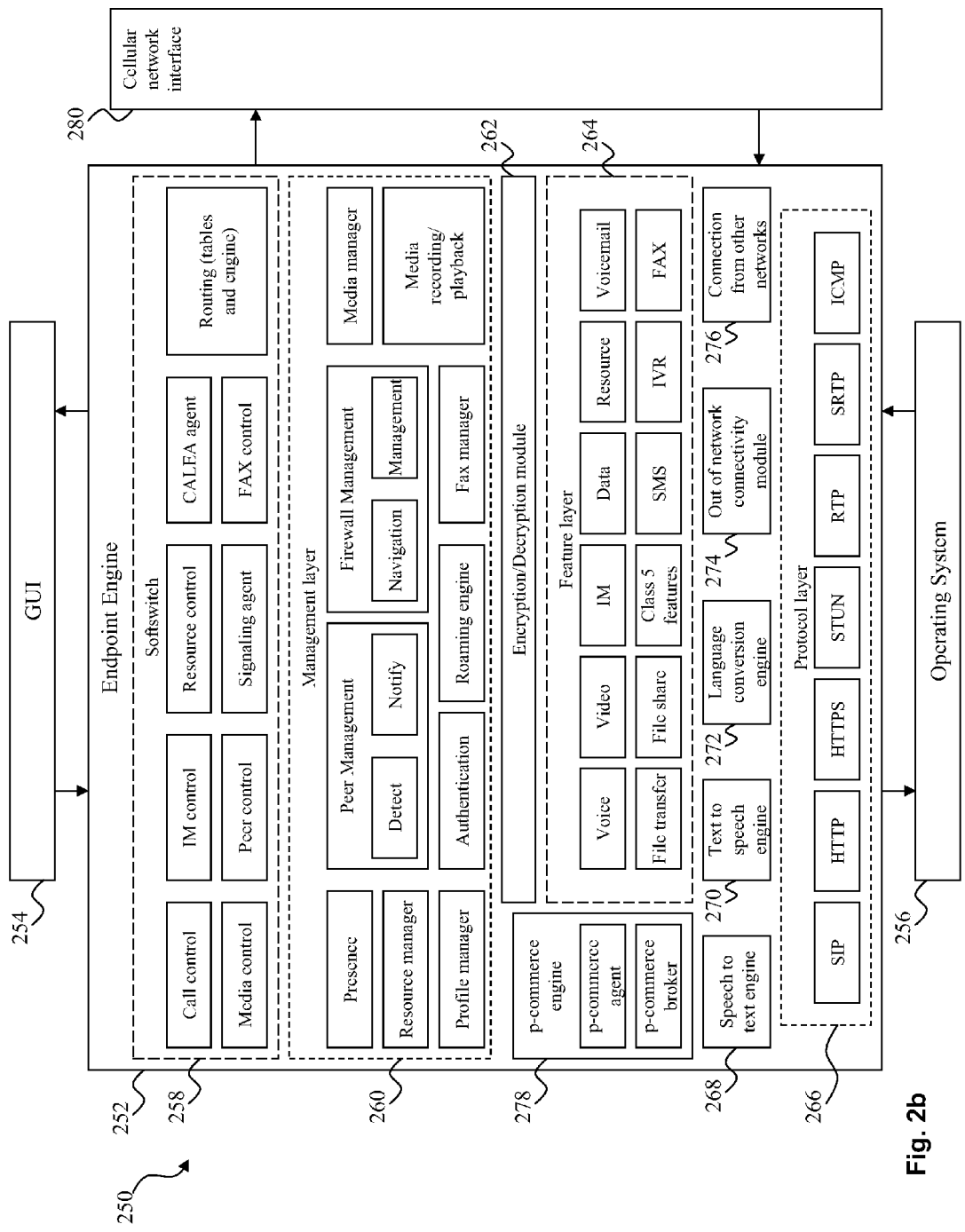
FIG. 2b illustrates one embodiment of an endpoint architecture that may be used within the system of FIG. 1.

Referring to FIG. 2b, one embodiment of an architecture 250 for the endpoint 104 (which may be similar or identical to the endpoint 106) of FIG. 1 is illustrated. It is understood that that term "endpoint" may refer to many different devices having some or all of the described functionality, including a computer, a VoIP telephone, a personal digital assistant, a cellular phone, or any other device having an IP stack upon which the needed protocols may be run. Such devices generally include a network interface, a controller coupled to the network interface, a memory coupled to the controller, and instructions executable by the controller and stored in the memory for performing the functions described in the present application. Data needed by an endpoint may also be stored in the memory. The architecture 250 includes an endpoint engine 252 positioned between a graphical user interface (GUI) 254 and an operating system 256. The GUI 254 provides user access to the endpoint engine 252, while the operating system 256 provides underlying functionality, as is known to those of skill in the art.

The endpoint engine 252 may include multiple components and layers that support the functionality required to perform the operations of the endpoint 104. For example, the endpoint engine 252 includes a softswitch 258, a management layer 260, an encryption/decryption module 262, a feature layer 264, a protocol layer 266, a speech-to-text engine 268, a text-to-speech engine 270, a language conversion engine 272, an out-of-network connectivity module 274, a connection from other networks module 276, a p-commerce (e.g., peer commerce) engine 278 that includes a p-commerce agent and a p-commerce broker, and a cellular network interface module 280.

Each of these components/layers may be further divided into multiple modules. For example, the softswitch 258 includes a call control module, an instant messaging (IM) control module, a resource control module, a CALEA (Communications Assistance to Law Enforcement Act) agent, a media control module, a peer control module, a signaling agent, a fax control module, and a routing module.

The management layer 260 includes modules for presence (i.e., network presence), peer management (detecting peers and notifying peers of being online), firewall management (navigation and management), media management, resource management, profile management, authentication, roaming, fax management, and media playback/recording management.

The encryption/decryption module 262 provides encryption for outgoing packets and decryption for incoming packets. In the present example, the encryption/decryption module 262 provides application level encryption at the source, rather than at the network. However, it is understood that the encryption/decryption module 262 may provide encryption at the network in some embodiments.

The feature layer 264 provides support for various features such as voice, video, IM, data, voicemail, file transfer, file sharing, class 5 features, short message service (SMS), interactive voice response (IVR), faxes, and other resources. The protocol layer 266 includes protocols supported by the endpoint, including SIP, HTTP, HTTPS, STUN, RTP, SRTP, and ICMP. It is understood that these are examples only, and that fewer or more protocols may be supported.

The speech-to-text engine 268 converts speech received by the endpoint (e.g., via a microphone or network) into text, the text-to-speech engine 270 converts text received by the endpoint into speech (e.g., for output via a speaker), and the language conversion engine 272 may be configured to convert inbound or outbound information (text or speech) from one language to another language. The out-of-network connectivity module 274 may be used to handle connections between the endpoint and external devices (as described with respect to FIG. 12), and the connection from other networks module 276 handles incoming connection attempts from external devices. The cellular network interface module 280 may be used to interact with a wireless network.

Figure 2C:
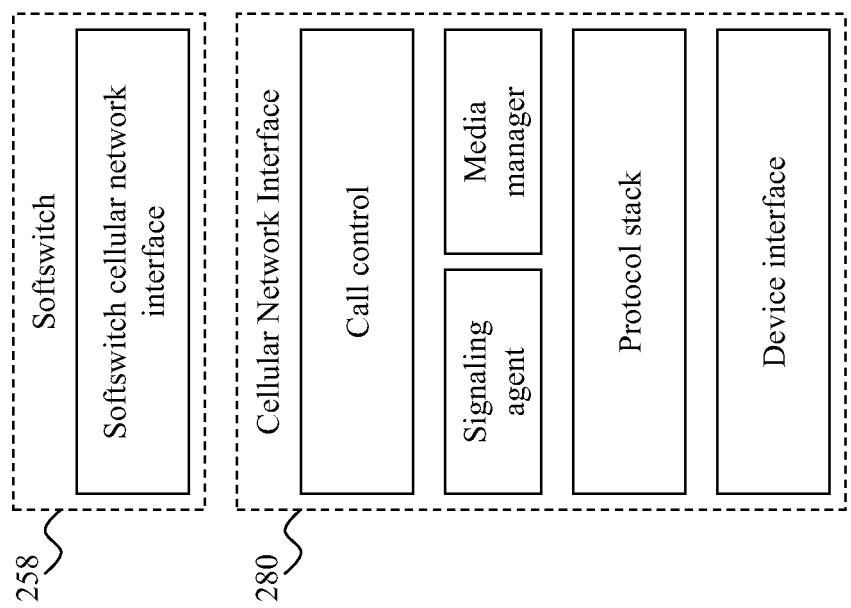
FIG. 2c illustrates one embodiment of components within the endpoint architecture of FIG. 2b that may be used for cellular network connectivity.

With additional reference to FIG. 2c, the cellular network interface module 280 is illustrated in greater detail. Although not shown in FIG. 2b, the softswitch 258 of the endpoint architecture 250 includes a cellular network interface for communication with the cellular network interface module 280. In addition, the cellular network interface module 280 includes various components such as a call control module, a signaling agent, a media manager, a protocol stack, and a device interface. It is noted that these components may correspond to layers within the endpoint architecture 250 and may be incorporated directly into the endpoint architecture in some embodiments.

Figure 2E:
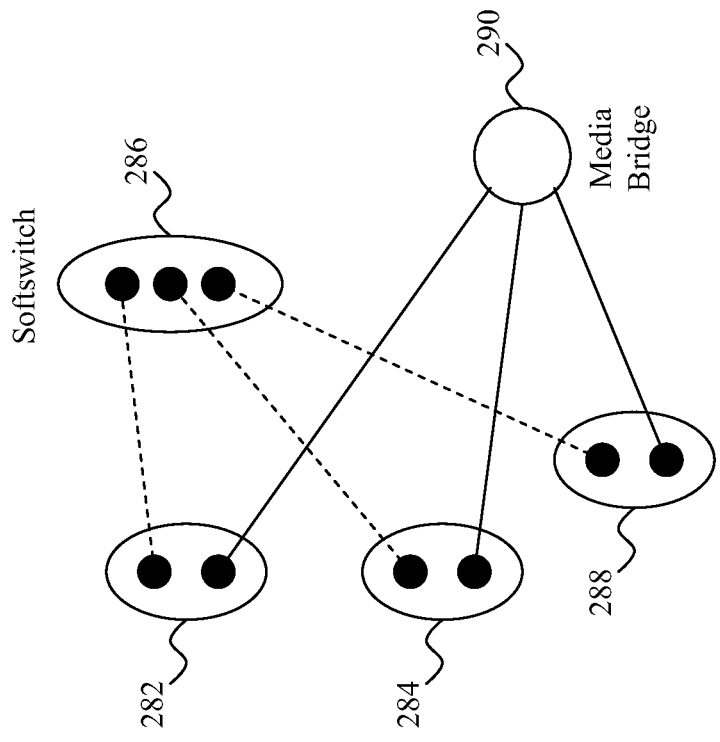
FIG. 2e illustrates a traditional softswitch configuration with three endpoints and a media bridge.
Figure 2D:
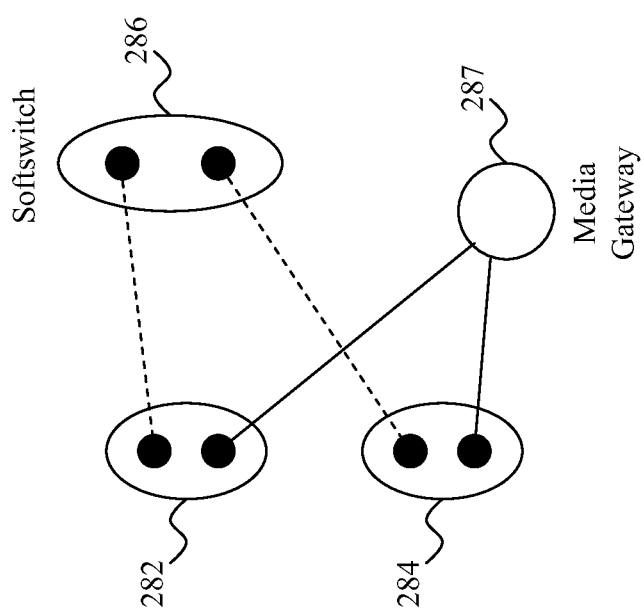
FIG. 2d illustrates a traditional softswitch configuration with two endpoints.

Referring to FIG. 2d, a traditional softswitch architecture is illustrated with two endpoints 282 and 284, neither of which includes a softswitch. In the present example, an external softswitch 286 maintains a first signaling leg (dotted line) with the endpoint 282 and a second signaling leg (dotted line) with the endpoint 284. The softswitch 286 links the two legs to pass signaling information between the endpoints 282 and 284. Media traffic (solid lines) may be transferred between the endpoints 282 and 284 via a media gateway 287.

With additional reference to FIG. 2e, the traditional softswitch architecture of FIG. 2d is illustrated with a third endpoint 288 that also does not include a softswitch. The external softswitch 286 now maintains a third signaling leg (dotted line) with the endpoint 288. In the present example, a conference call is underway. However, as none of the endpoints includes a softswitch, a media bridge 290 connected to each endpoint is needed for media traffic. Accordingly, each endpoint has at most two concurrent connections—one with the softswitch for signaling and another with the media bridge for media traffic.

Figure 2G:
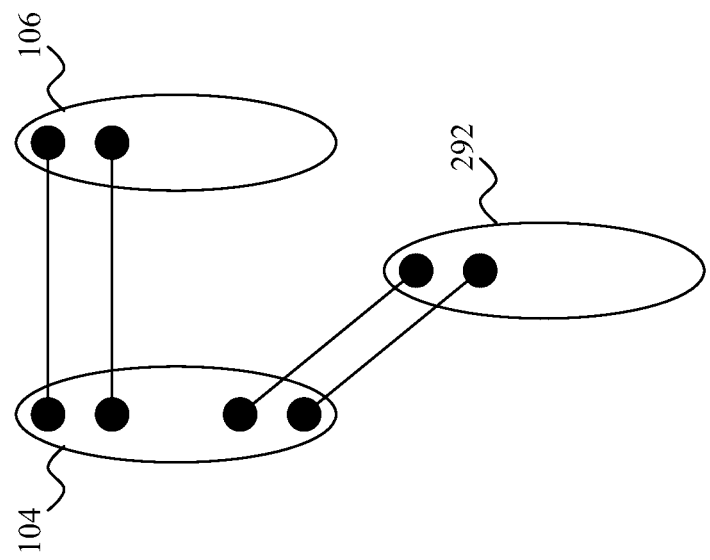
FIG. 2g illustrates one embodiment of the present disclosure with three endpoints, each of which includes a softswitch.
Figure 2F:
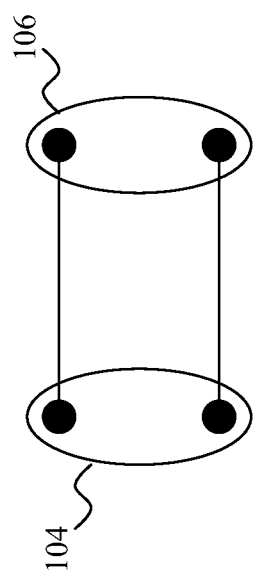
FIG. 2f illustrates one embodiment of the present disclosure with two endpoints, each of which includes a softswitch.

Referring to FIG. 2f, in one embodiment, unlike the traditional architecture of FIGS. 2d and 2e, two endpoints (e.g., the endpoints 104 and 106 of FIG. 1) each include a softswitch (e.g., the softswitch 258 of FIG. 2b). Each endpoint is able to establish and maintain both signaling and media traffic connections (both virtual and physical legs) with the other endpoint. Accordingly, no external softswitch is needed, as this model uses a distributed softswitch method to handle communications directly between the endpoints.

With additional reference to FIG. 2g, the endpoints 104 and 106 are illustrated with another endpoint 292 that also contains a softswitch. In this example, a conference call is underway with the endpoint 104 acting as the host. To accomplish this, the softswitch contained in the endpoint 104 enables the endpoint 104 to support direct signaling and media traffic connections with the endpoint 292. The endpoint 104 can then forward media traffic from the endpoint 106 to the endpoint 292 and vice versa. Accordingly, the endpoint 104 may support multiple connections to multiple endpoints and, as in FIG. 2f, no external softswitch is needed.

Referring again to FIG. 2b, in operation, the softswitch 258 uses functionality provided by underlying layers to handle connections with other endpoints and the access server 102, and to handle services needed by the endpoint 104. For example, as is described below in greater detail with respect to FIGS. 3a and 3b, incoming and outgoing calls may utilize multiple components within the endpoint architecture 250.

Figure 3A:
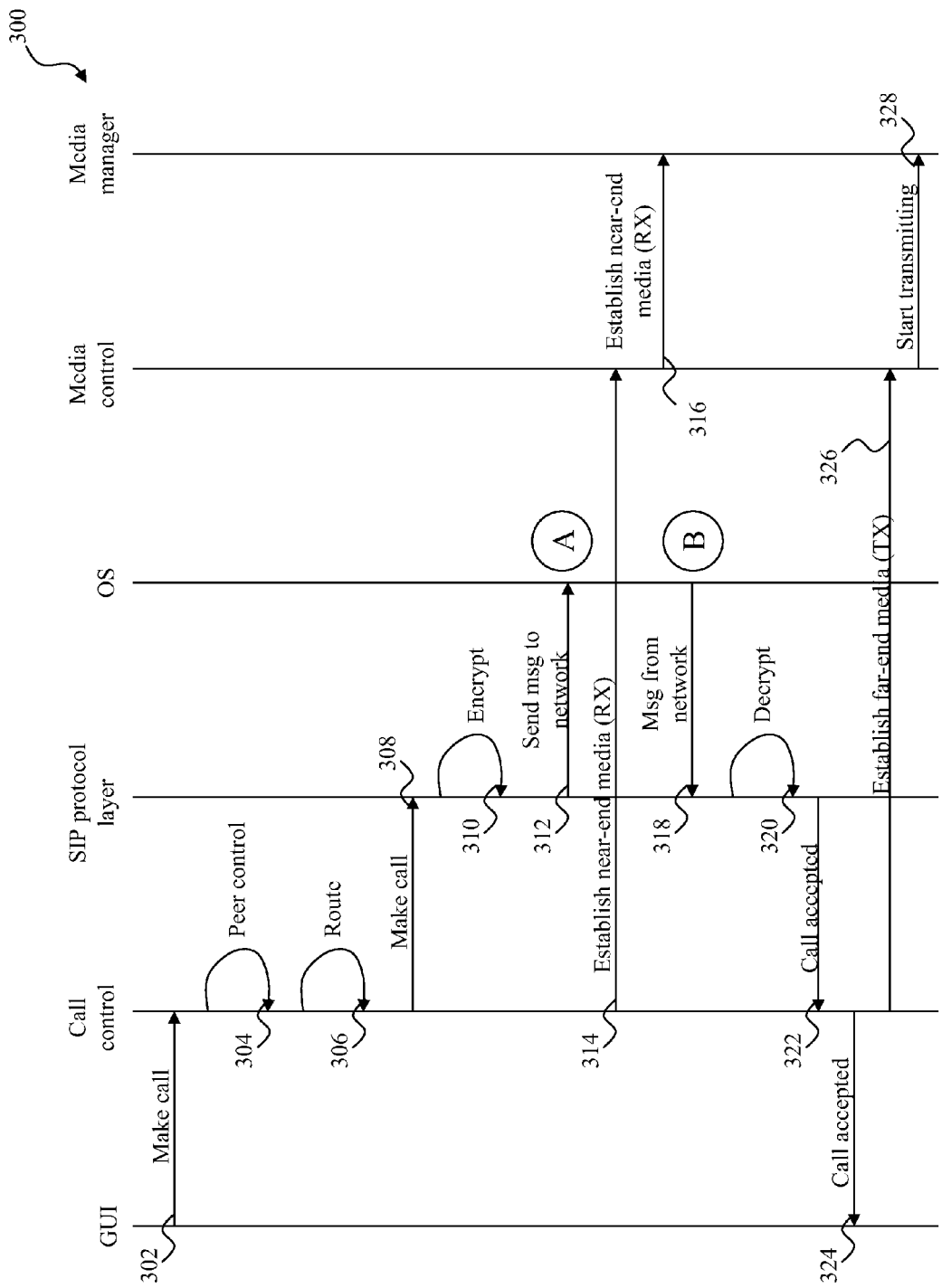
FIG. 3a is a sequence diagram illustrating the interaction of various components of FIG. 2b when placing a call.

Referring to FIG. 3a, a sequence diagram 300 illustrates an exemplary process by which the endpoint 104 may initiate a call to the endpoint 106 using various components of the architecture 250. Prior to step 302, a user (not shown) initiates a call via the GUI 254. In step 302, the GUI 254 passes a message to the call control module (of the softswitch 258) to make the call. The call control module contacts the peer control module (softswitch 258) in step 304, which detects the peer (if not already done), goes to the routing table (softswitch 258) for the routing information, and performs similar operations. It is understood that not all interactions are illustrated. For example, the peer control module may utilize the peer management module (of the management layer 260) for the peer detection. The call control module then identifies a route for the call in step 306, and sends message to the SIP protocol layer (of the protocol layer 266) to make the call in step 308. In step 310, the outbound message is encrypted (using the encryption/decryption module 262) and the message is sent to the network via the OS 256 in step 312.

After the message is sent and prior to receiving a response, the call control module instructs the media control module (softswitch 258) to establish the needed near-end media in step 314. The media control module passes the instruction to the media manager (of the management layer 260) in step 316, which handles the establishment of the near-end media.

Figure 3B:
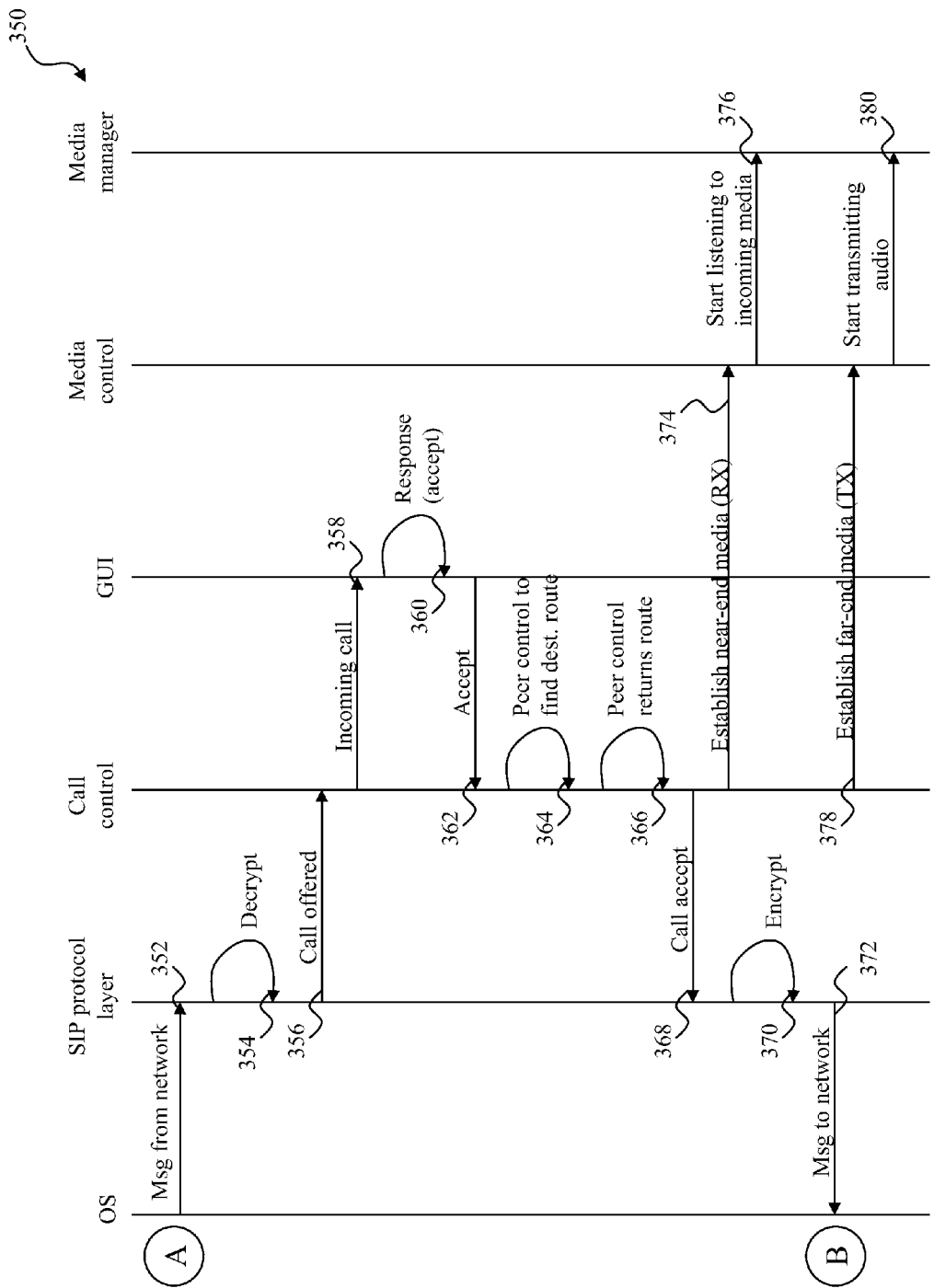
FIG. 3b is a sequence diagram illustrating the interaction of various components of FIG. 2b when receiving a call.

With additional reference to FIG. 3b, the message sent by the endpoint 104 in step 312 (FIG. 3a) is received by the endpoint 106 and passed from the OS to the SIP protocol layer in step 352. The message is decrypted in step 354 and the call is offered to the call control module in step 356. The call control module notifies the GUI of an incoming call in step 358 and the GUI receives input identifying whether the call is accepted or rejected (e.g., by a user) in step 360. In the present example, the call is accepted and the GUI passes the acceptance to the call control module in step 362. The call control module contacts the peer control module in step 364, which identifies a route to the calling endpoint and returns the route to the call control module in step 366. In steps 368 and 370, the call control module informs the SIP protocol layer that the call has been accepted and the message is encrypted using the encryption/decryption module. The acceptance message is then sent to the network via the OS in step 372.

In the present example, after the call control module passes the acceptance message to the SIP protocol layer, other steps may occur to prepare the endpoint 106 for the call. For example, the call control module instructs the media control module to establish near-end media in step 374, and the media control module instructs the media manager to start listening to incoming media in step 376. The call control module also instructs the media control module to establish far-end media (step 378), and the media control module instructs the media manager to start transmitting audio in step 380.

Returning to FIG. 3a, the message sent by the endpoint 106 (step 372) is received by the OS and passed on to the SIP protocol layer in step 318 and decrypted in step 320. The message (indicating that the call has been accepted) is passed to the call control module in step 322 and from there to the GUI in step 324. The call control module then instructs the media control module to establish far-end media in step 326, and the media control module instructs the media manager to start transmitting audio in step 328.

The following figures are sequence diagrams that illustrate various exemplary functions and operations by which the access server 102 and the endpoints 104 and 106 may communicate. It is understood that these diagrams are not exhaustive and that various steps may be excluded from the diagrams to clarify the aspect being described.

Figure 4:
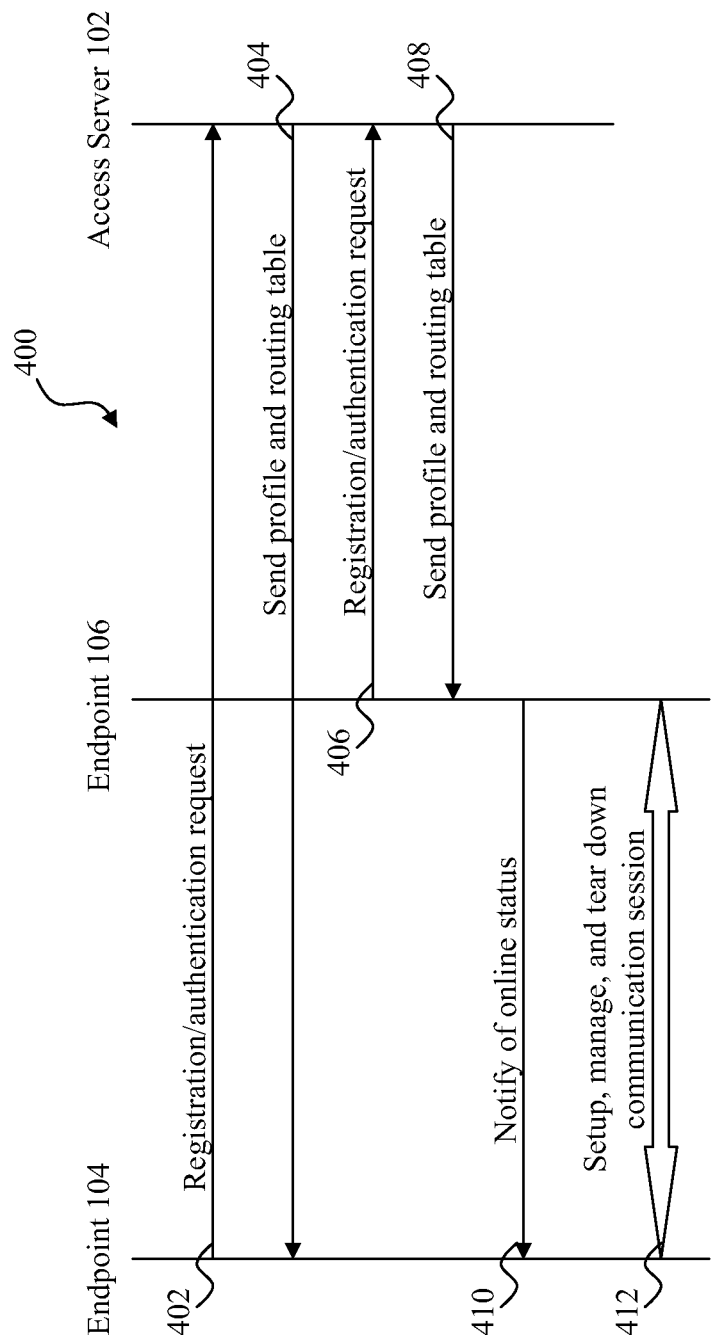
FIG. 4 is a sequence diagram illustrating an exemplary process by which an endpoint of FIG. 1 may be authenticated and communicate with another endpoint.

Referring to FIG. 4 (and using the endpoint 104 as an example), a sequence diagram 400 illustrates an exemplary process by which the endpoint 104 may authenticate with the access server 102 and then communicate with the endpoint 106. As will be described, after authentication, all communication (both signaling and media traffic) between the endpoints 104 and 106 occurs directly without any intervention by the access server 102. In the present example, it is understood that neither endpoint is online at the beginning of the sequence, and that the endpoints 104 and 106 are "buddies." As described above, buddies are endpoints that have both previously agreed to communicate with one another.

In step 402, the endpoint 104 sends a registration and/or authentication request message to the access server 102. If the endpoint 104 is not registered with the access server 102, the access server will receive the registration request (e.g., user ID, password, and email address) and will create a profile for the endpoint (not shown). The user ID and password will then be used to authenticate the endpoint 104 during later logins. It is understood that the user ID and password may enable the user to authenticate from any endpoint, rather than only the endpoint 104.

Upon authentication, the access server 102 updates a session table residing on the server to indicate that the user ID currently associated with the endpoint 104 is online. The access server 102 also retrieves a buddy list associated with the user ID currently used by the endpoint 104 and identifies which of the buddies (if any) are online using the session table. As the endpoint 106 is currently offline, the buddy list will reflect this status. The access server 102 then sends the profile information (e.g., the buddy list) and a routing table to the endpoint 104 in step 404. The routing table contains address information for online members of the buddy list. It is understood that steps 402 and 404 represent a make and break connection that is broken after the endpoint 104 receives the profile information and routing table.

In steps 406 and 408, the endpoint 106 and access server 102 repeat steps 402 and 404 as described for the endpoint 104. However, because the endpoint 104 is online when the endpoint 106 is authenticated, the profile information sent to the endpoint 106 will reflect the online status of the endpoint 104 and the routing table will identify how to directly contact it. Accordingly, in step 410, the endpoint 106 sends a message directly to the endpoint 104 to notify the endpoint 104 that the endpoint 106 is now online. This also provides the endpoint 104 with the address information needed to communicate directly with the endpoint 106. In step 412, one or more communication sessions may be established directly between the endpoints 104 and 106.

Figure 5:
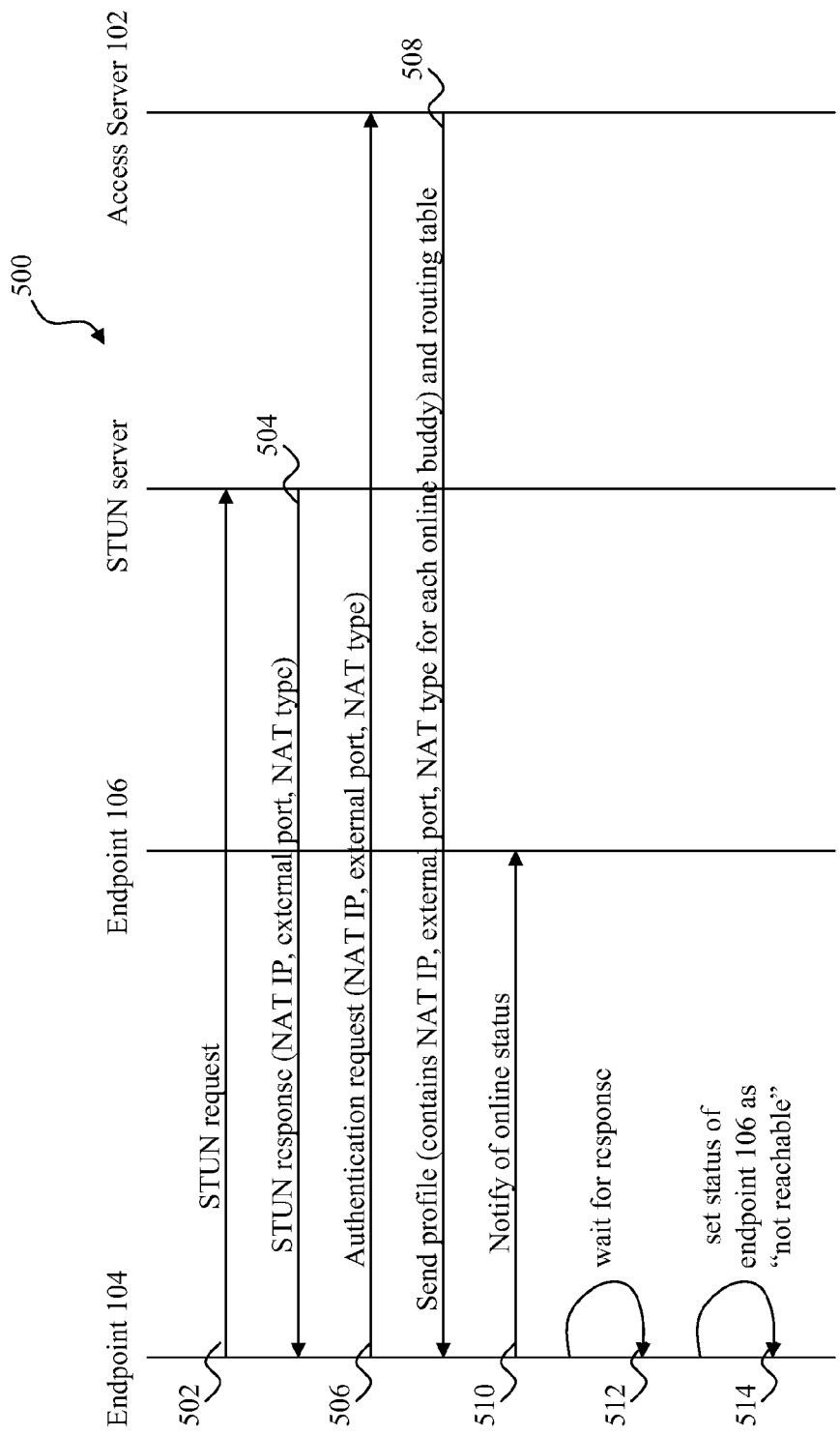
FIG. 5 is a sequence diagram illustrating an exemplary process by which an endpoint of FIG. 1 may determine the status of another endpoint.

Referring to FIG. 5, a sequence diagram 500 illustrates an exemplary process by which authentication of an endpoint (e.g., the endpoint 104) may occur. In addition, after authentication, the endpoint 104 may determine whether it can communicate with the endpoint 106. In the present example, the endpoint 106 is online when the sequence begins.

In step 502, the endpoint 104 sends a request to the STUN server 214 of FIG. 2. As is known, the STUN server determines an outbound IP address (e.g., the external address of a device (i.e., a firewall, router, etc.) behind which the endpoint 104 is located), an external port, and a type of NAT used by the device. The type of NAT may be, for example, full cone, restricted cone, port restricted cone, or symmetric, each of which is discussed later in greater detail with respect to FIG. 10. The STUN server 214 sends a STUN response back to the endpoint 104 in step 504 with the collected information about the endpoint 104.

In step 506, the endpoint 104 sends an authentication request to the access server 102. The request contains the information about endpoint 104 received from the STUN server 214. In step 508, the access server 102 responds to the request by sending the relevant profile and routing table to the endpoint 104. The profile contains the external IP address, port, and NAT type for each of the buddies that are online.

In step 510, the endpoint 104 sends a message to notify the endpoint 106 of its online status (as the endpoint 106 is already online) and, in step 512, the endpoint 104 waits for a response. After the expiration of a timeout period within which no response is received from the endpoint 106, the endpoint 104 will change the status of the endpoint 106 from "online" (as indicated by the downloaded profile information) to "unreachable." The status of a buddy may be indicated on a visual buddy list by the color of an icon associated with each buddy. For example, when logging in, online buddies may be denoted by a blue icon and offline buddies may be denoted by a red icon. If a response to a notify message is received for a buddy, the icon representing that buddy may be changed from blue to green to denote the buddy's online status. If no response is received, the icon remains blue to indicate that the buddy is unreachable. Although not shown, a message sent from the endpoint 106 and received by the endpoint 104 after step 514 would indicate that the endpoint 106 is now reachable and would cause the endpoint 104 to change the status of the endpoint 106 to online Similarly, if the endpoint 104 later sends a message to the endpoint 106 and receives a response, then the endpoint 104 would change the status of the endpoint 106 to online.

It is understood that other embodiments may implement alternate NAT traversal techniques. For example, a single payload technique may be used in which TCP/IP packets are used to traverse a UDP restricted firewall or router. Another example includes the use of a double payload in which a UDP packet is inserted into a TCP/IP packet. Furthermore, it is understood that protocols other than STUN may be used. For example, protocols such as Internet Connectivity Establishment (ICE) or Traversal Using Relay NAT (TURN) may be used.

Figure 6:
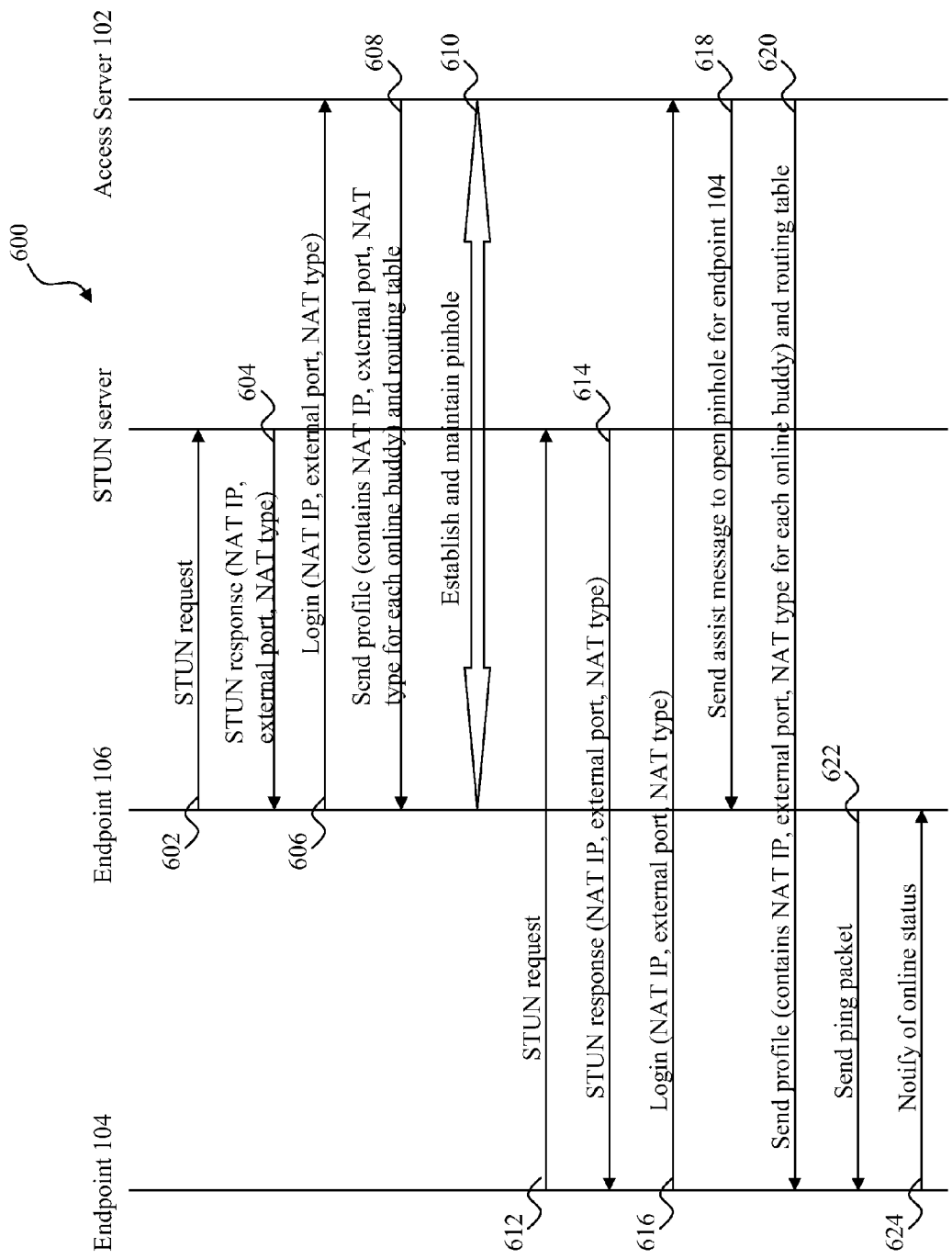
FIG. 6 is a sequence diagram illustrating an exemplary process by which an access server of FIG. 1 may aid an endpoint in establishing communications with another endpoint.

Referring to FIG. 6, a sequence diagram 600 illustrates an exemplary process by which the access server 102 may aid the endpoint 104 in establishing communications with the endpoint 106 (which is a buddy). After rendering aid, the access server 102 is no longer involved and the endpoints may communicate directly. In the present example, the endpoint 106 is behind a NAT device that will only let a message in (towards the endpoint 106) if the endpoint 106 has sent a message out. Unless this process is bypassed, the endpoint 104 will be unable to connect to the endpoint 106. For example, the endpoint 104 will be unable to notify the endpoint 106 that it is now online.

In step 602, the endpoint 106 sends a request to the STUN server 214 of FIG. 2. As described previously, the STUN server determines an outbound IP address, an external port, and a type of NAT for the endpoint 106. The STUN server 214 sends a STUN response back to the endpoint 106 in step 604 with the collected information about the endpoint 106. In step 606, the endpoint 106 sends an authentication request to the access server 102. The request contains the information about endpoint 106 received from the STUN server 214. In step 608, the access server 102 responds to the request by sending the relevant profile and routing table to the endpoint 106. In the present example, the access server 102 identifies the NAT type associated with the endpoint 106 as being a type that requires an outbound packet to be sent before an inbound packet is allowed to enter. Accordingly, the access server 102 instructs the endpoint 106 to send periodic messages to the access server 102 to establish and maintain a pinhole through the NAT device. For example, the endpoint 106 may send a message prior to the timeout period of the NAT device in order to reset the timeout period. In this manner, the pinhole may be kept open indefinitely.

In steps 612 and 614, the endpoint 104 sends a STUN request to the STUN server 214 and the STUN server responds as previously described. In step 616, the endpoint 104 sends an authentication request to the access server 102. The access server 102 retrieves the buddy list for the endpoint 104 and identifies the endpoint 106 as being associated with a NAT type that will block communications from the endpoint 104. Accordingly, in step 618, the access server 102 sends an assist message to the endpoint 106. The assist message instructs the endpoint 106 to send a message to the endpoint 104, which opens a pinhole in the NAT device for the endpoint 104. For security purposes, as the access server 102 has the STUN information for the endpoint 104, the pinhole opened by the endpoint 106 may be specifically limited to the endpoint associated with the STUN information. Furthermore, the access server 102 may not request such a pinhole for an endpoint that is not on the buddy list of the endpoint 106.

The access server 104 sends the profile and routing table to the endpoint 104 in step 620. In step 622, the endpoint 106 sends a message (e.g., a ping packet) to the endpoint 104. The endpoint 104 may then respond to the message and notify the endpoint 106 that it is now online. If the endpoint 106 does not receive a reply from the endpoint 104 within a predefined period of time, it may close the pinhole (which may occur simply by not sending another message and letting the pinhole time out). Accordingly, the difficulty presented by the NAT device may be overcome using the assist message, and communications between the two endpoints may then occur without intervention by the access server 102.

Figure 7:
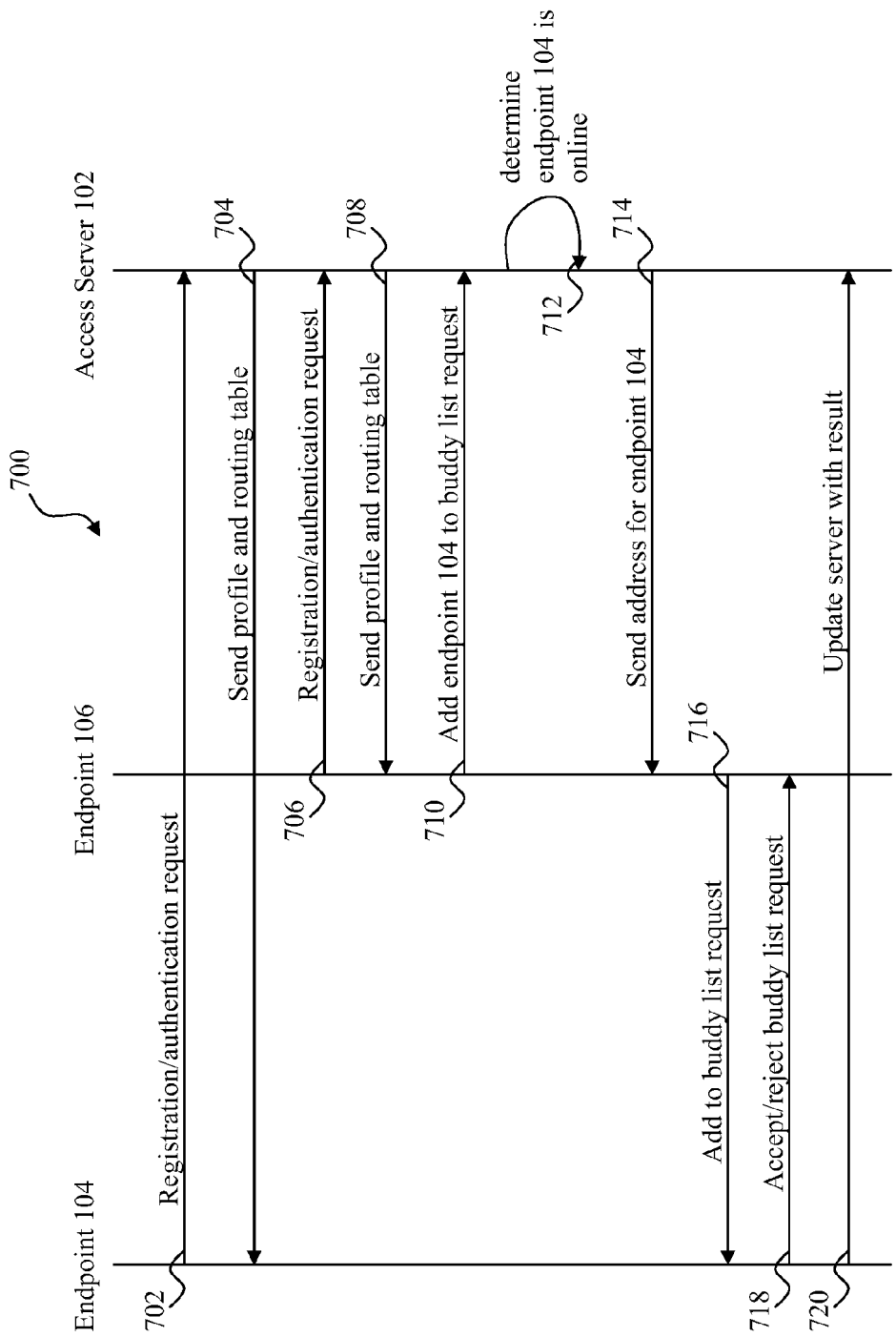
FIG. 7 is a sequence diagram illustrating an exemplary process by which an endpoint of FIG. 1 may request that it be added to the buddy list of another endpoint that is currently online.

Referring to FIG. 7, a sequence diagram 700 illustrates an exemplary process by which the endpoint 106 may request that it be added to the endpoint 104's buddy list. In the present example, the endpoints 104 and 106 both remain online during the entire process.

In step 702, the endpoint 104 sends a registration and/or authentication request message to the access server 102 as described previously. Upon authentication, the access server 102 updates a session table residing on the server to indicate that the user ID currently associated with the endpoint 104 is online. The access server 102 also retrieves a buddy list associated with the user ID currently used by the endpoint 104 and identifies which of the buddies (if any) are online using the session table. As the endpoint 106 is not currently on the buddy list, it will not be present. The access server 102 then sends the profile information and a routing table to the endpoint 104 in step 704.

In steps 706 and 708, the endpoint 106 and access server 102 repeat steps 702 and 704 as described for the endpoint 104. The profile information sent by the access server 102 to the endpoint 106 will not include the endpoint 104 because the two endpoints are not buddies.

In step 710, the endpoint 106 sends a message to the access server 102 requesting that the endpoint 104 be added to its buddy list. The access server 102 determines that the endpoint 104 is online (e.g., using the session table) in step 712 and sends the address for the endpoint 104 to the endpoint 106 in step 714. In step 716, the endpoint 106 sends a message directly to the endpoint 104 requesting that the endpoint 106 be added to its buddy list. The endpoint 104 responds to the endpoint 106 in step 718 with either permission or a denial, and the endpoint 104 also updates the access server 102 with the response in step 720. For example, if the response grants permission, then the endpoint 104 informs the access server 102 so that the access server can modify the profile of both endpoints to reflect the new relationship. It is understood that various other actions may be taken. For example, if the endpoint 104 denies the request, then the access server 102 may not respond to another request by the endpoint 106 (with respect to the endpoint 104) until a period of time has elapsed.

It is understood that many different operations may be performed with respect to a buddy list. For example, buddies may be deleted, blocked/unblocked, buddy status may be updated, and a buddy profile may be updated. For block/unblock, as well as status and profile updates, a message is first sent to the access server 102 by the endpoint requesting the action (e.g., the endpoint 104). Following the access server 102 update, the endpoint 104 sends a message to the peer being affected by the action (e.g., the endpoint 106).

Buddy deletion may be handled as follows. If the user of the endpoint 104 wants to delete a contact on a buddy list currently associated with the online endpoint 106, the endpoint 104 will first notify the access server 102 that the buddy is being deleted. The access server 102 then updates the profile of both users so that neither buddy list shows the other user as a buddy. Note that, in this instance, a unilateral action by one user will alter the profile of the other user. The endpoint 104 then sends a message directly to the endpoint 106 to remove the buddy (the user of the endpoint 104) from the buddy list of the user of endpoint 106 in real time. Accordingly, even though the user is online at endpoint 106, the user of the endpoint 104 will be removed from the buddy list of the endpoint 106.

Figure 8:
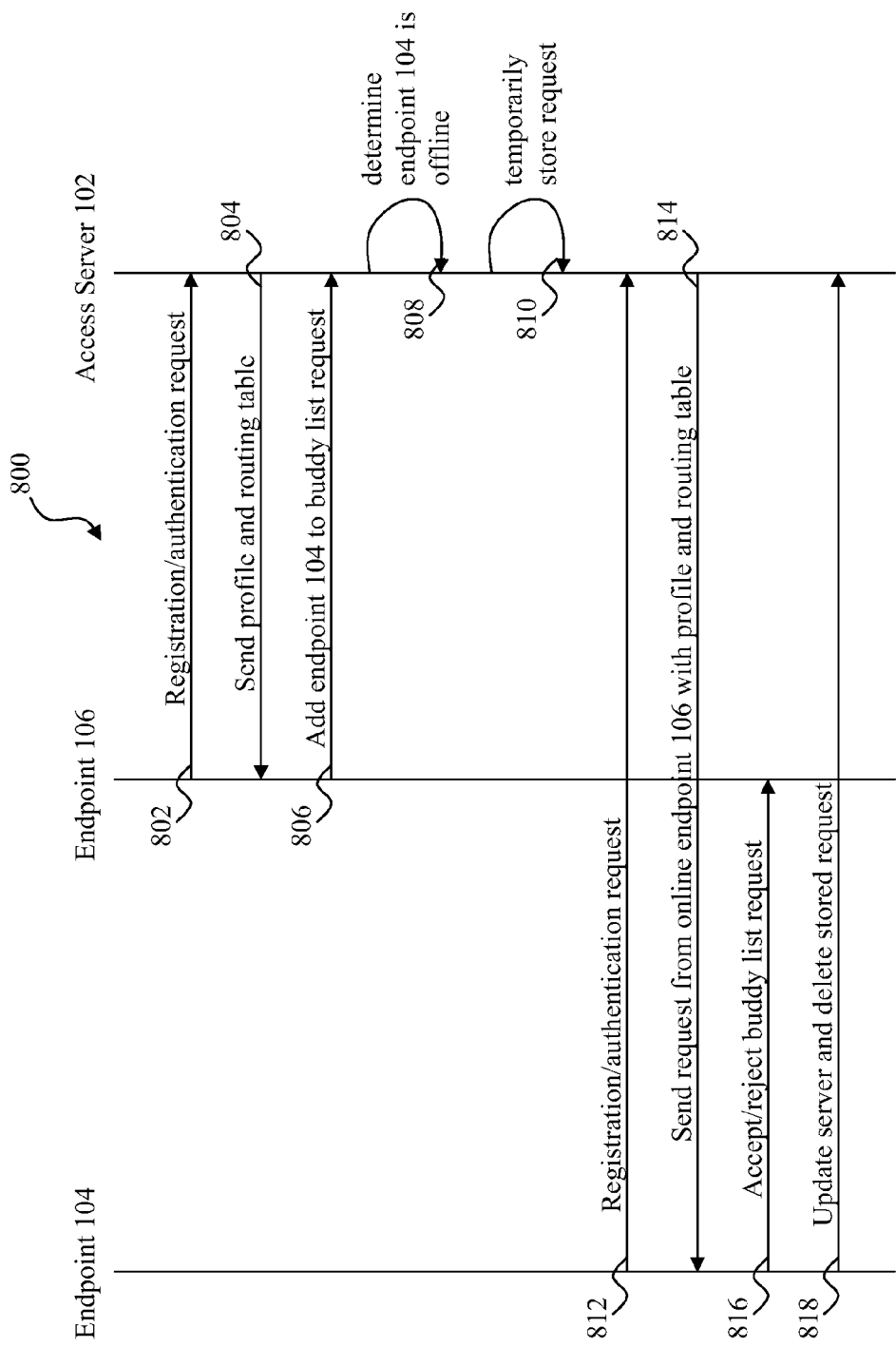
FIG. 8 is a sequence diagram illustrating an exemplary process by which an endpoint of FIG. 1 may request that it be added to the buddy list of another endpoint that is currently offline.

Referring to FIG. 8, a sequence diagram 800 illustrates an exemplary process by which the endpoint 106 may request that it be added to the endpoint 104's buddy list. In the present example, the endpoint 104 is not online until after the endpoint 106 has made its request.

In step 802, the endpoint 106 sends a registration and/or authentication request message to the access server 102 as described previously. Upon authentication, the access server 102 updates a session table residing on the server to indicate that the user ID currently associated with the endpoint 106 is online. The access server 102 also retrieves a buddy list associated with the user ID currently used by the endpoint 106 and identifies which of the buddies (if any) are online using the session table. The access server 102 then sends the profile information and a routing table to the endpoint 106 in step 804.

In step 806, the endpoint 106 sends a message to the access server 102 requesting that the endpoint 104 be added to its buddy list. The access server 102 determines that the endpoint 104 is offline in step 808 and temporarily stores the request message in step 810. In steps 812 and 814, the endpoint 104 and access server 102 repeat steps 802 and 804 as described for the endpoint 106. However, when the access server 102 sends the profile information and routing table to the endpoint 104, it also sends the request by the endpoint 106 (including address information for the endpoint 106).

In step 816, the endpoint 104 responds directly to the endpoint 106 with either permission or a denial. The endpoint 104 then updates the access server 102 with the result of the response in step 818 and also instructs the access server to delete the temporarily stored request.

Figure 9:
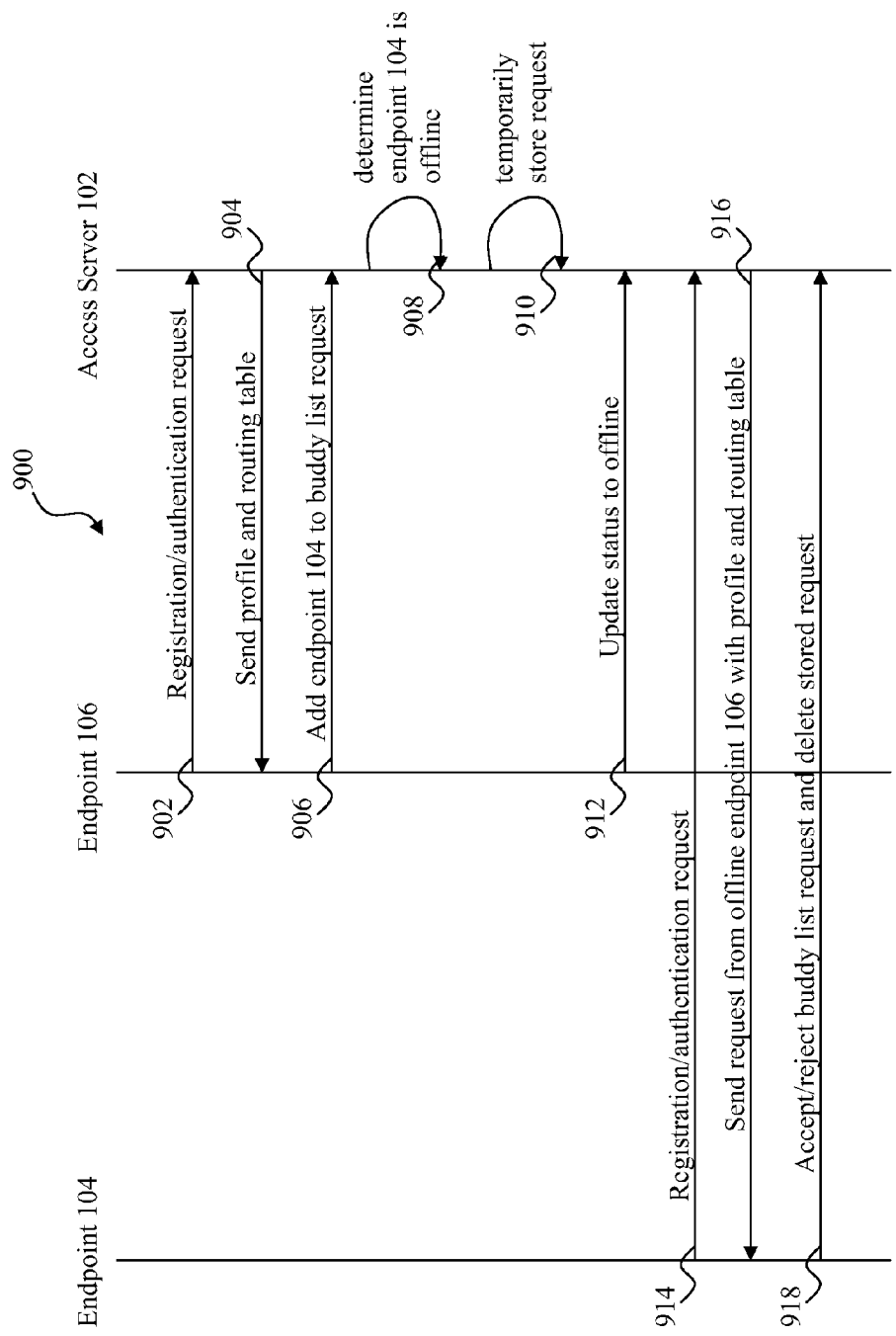
FIG. 9 is a sequence diagram illustrating an exemplary process by which an endpoint of FIG. 1 may request that it be added to the buddy list of another endpoint that is currently offline before it too goes offline.

Referring to FIG. 9, a sequence diagram 900 illustrates an exemplary process by which the endpoint 106 may request that it be added to the endpoint 104's buddy list. In the present example, the endpoint 104 is not online until after the endpoint 106 has made its request, and the endpoint 106 is not online to receive the response by endpoint 104.

In step 902, the endpoint 106 sends a registration and/or authentication request message to the access server 102 as described previously. Upon authentication, the access server 102 updates a session table residing on the server to indicate that the user ID currently associated with the endpoint 106 is online. The access server 102 also retrieves a buddy list associated with the user ID currently used by the endpoint 106 and identifies which of the buddies (if any) are online using the session table. The access server 102 then sends the profile information and a routing table to the endpoint 106 in step 904.

In step 906, the endpoint 106 sends a message to the access server 102 requesting that the endpoint 104 be added to its buddy list. The access server 102 determines that the endpoint 104 is offline in step 908 and temporarily stores the request message in step 910. In step 912, the endpoint 106 notifies the access server 102 that it is going offline.

In steps 914 and 916, the endpoint 104 and access server 102 repeat steps 902 and 904 as described for the endpoint 106. However, when the access server 102 sends the profile information and routing table to the endpoint 104, it also sends the request by the endpoint 106. Endpoint 104 sends its response to the access server 102 in step 918 and also instructs the access server to delete the temporarily stored request. After the endpoint 106's next authentication process, its profile information will include endpoint 104 as a buddy (assuming the endpoint 104 granted permission).

Figure 10:
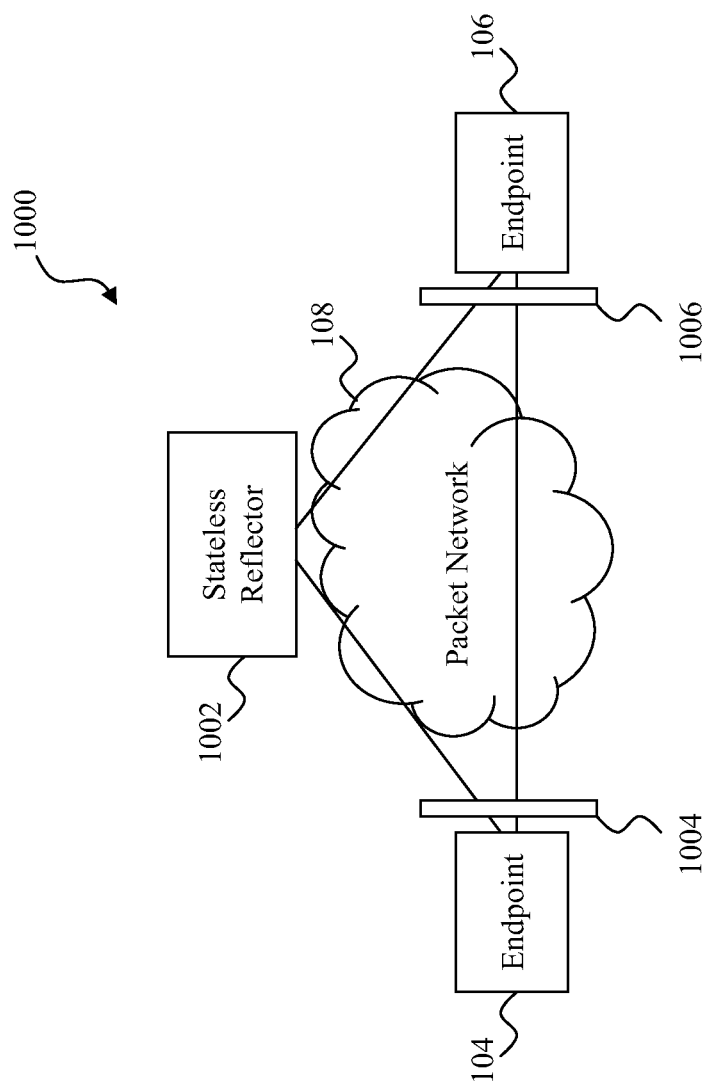
FIG. 10 is a simplified diagram of another embodiment of a peer-to-peer system that includes a stateless reflector that may aid an endpoint in traversing a NAT device to communicate with another endpoint.

Referring to FIG. 10, in one embodiment, a system 1000 includes a stateless reflector 1002 and two endpoints 104 and 106, such as the endpoints 104 and 106 described with respect to the preceding figures. In the present example, each of the endpoints 104 and 106 are behind a device 1004, 1006, respectively, that monitors and regulates communication with its respective endpoint. Each device 1004, 1006 in the present example is a firewall having NAT technology. As described previously, a NAT device may present an obstacle in establishing a peer-to-peer connection because it may not allow unsolicited messages (e.g., it may require a packet to be sent out through the NAT device before allowing a packet in). For example, the NAT device 1006 positioned between the endpoint 106 and network 108 may only let a message in (towards the endpoint 106) if the endpoint 106 has sent a message out. Unless the NAT device's status is shifted from not soliciting messages from the endpoint 104 to soliciting messages from the endpoint 104, the endpoint 104 will be unable to connect to the endpoint 106. For example, the endpoint 104 will be unable to notify the endpoint 106 that it is now online.

As will be described below in greater detail, the stateless reflector 1002 is configured to receive one or more packets from an endpoint and reflect the packet to another endpoint after modifying information within the packet. This reflection process enables the endpoints 104 and 106 to communicate regardless of the presence and type of the NAT devices 1004 and 1006. The stateless reflector 1002 is stateless because state information (e.g., information relating to how an endpoint is to connect with other endpoints) is stored by the endpoints, as described previously. Accordingly, the stateless reflector 1002 processes header information contained within a packet without access to other information about the network or endpoints, such as the database 206 of FIG. 2a. Although only one stateless reflector 1002 is illustrated in FIG. 10, it is understood that multiple stateless reflectors may be provided, and that the endpoints 104 and 106 may each use a different stateless reflector. For example, an endpoint may be configured to use a particular stateless reflector or may select a stateless reflector based on location, NAT type, etc.

Although each endpoint 104, 106 is shown with a separate NAT device 1004, 1006, it is understood that multiple endpoints may be connected to the network 108 via a single NAT device. For example, a LAN may access the network 108 via a single NAT device, and all communications between the endpoints connected to the LAN and the network 108 must pass through the NAT device. However, communications between the endpoints within the LAN itself may occur directly, as previously described, because the endpoints are not communicating through the NAT device. Furthermore, if one of the endpoints 104 or 106 does not have a NAT device, then communications with that endpoint may occur directly as described above even if the endpoints are not in the same network.

Each NAT device 1004 and 1006 includes an internal IP address (on the side coupled to the endpoint 104 for the NAT device 1004 and the side coupled to the endpoint 106 for the NAT device 1006) and an external IP address (on the side coupled to the network 108 for both NAT devices). Each connection is also associated with an internal port and an external port. Therefore, each connection includes both internal IP address/port information and external IP address/port information.

Generally, a NAT device may be defined as full cone, restricted cone, port restricted cone, or symmetric. A full cone NAT is one where all requests from the same internal IP address and port are mapped to the same external IP address and port. Therefore, any external host can send a packet to the internal host by sending a packet to the mapped external address.

A restricted cone NAT is one where all requests from the same internal IP address and port are mapped to the same external IP address and port. Unlike a full cone NAT, an external host can send a packet to the internal host only if the internal host has previously sent a packet to the external host's IP address.

A port restricted cone NAT is like a restricted cone NAT, but the restriction includes port numbers. More specifically, an external host can send a packet with source IP address X and source port P to the internal host only if the internal host has previously sent a packet to the external host at IP address X and port P.

A symmetric NAT is one where all requests from the same internal IP address and port to a specific destination IP address and port are mapped to the same external IP address and port. If the same host sends a packet with the same source address and port, but to a different destination, a different mapping is used. Only the external host that receives a packet can send a UDP packet back to the internal host.

Referring to FIG. 11, a table 1100 illustrates one embodiment of a communication structure that may be used to traverse one or both of the NAT devices 1004 and 1006 of FIG. 10. The table 1100 provides five possible types for the NAT devices 1004 and 1006: no NAT, full cone, restricted cone, port restricted cone, and symmetric. It is understood that "no NAT" may indicate that no device is there, that a device is there but does not include NAT functionality, or that a device is there and any NAT functionality within the device has been disabled. Either of the NAT devices 1004 and 1006 may be on the originating side of the communication or on the terminating side. For purposes of convenience, the endpoint 104 is the originating endpoint and the endpoint 106 is the terminating endpoint, and the NAT device 1004 is the originating NAT device and the NAT device 1006 is the terminating NAT device. It is understood that the terms "endpoint" and "NAT device" may be used interchangeably in some situations. For example, sending a packet to the endpoint 106 generally involves sending a packet to the NAT device 1006, which then forwards the packet to the endpoint 106 after performing the network address translation. However, the following discussion may simply refer to sending a packet to the endpoint 106 and it will be understood that the packet must traverse the NAT device 1006.

As illustrated by the table 1100, there are twenty-five possible pairings of NAT types and establishing communication between different NAT types may require different steps. For purposes of convenience, these twenty-five pairings may be grouped based on the required steps. For example, if the originating NAT type is no NAT, full cone, restricted cone, or port restricted cone, then the originating NAT can establish communication directly with a terminating NAT type of either no NAT or full cone.

If the originating NAT type is no NAT or full cone, then the originating NAT can establish communications with a terminating NAT type of either restricted cone or port restricted cone only after using the stateless reflector 1002 to reflect a packet. This process is described below with respect to FIG. 12.

Figure 12:
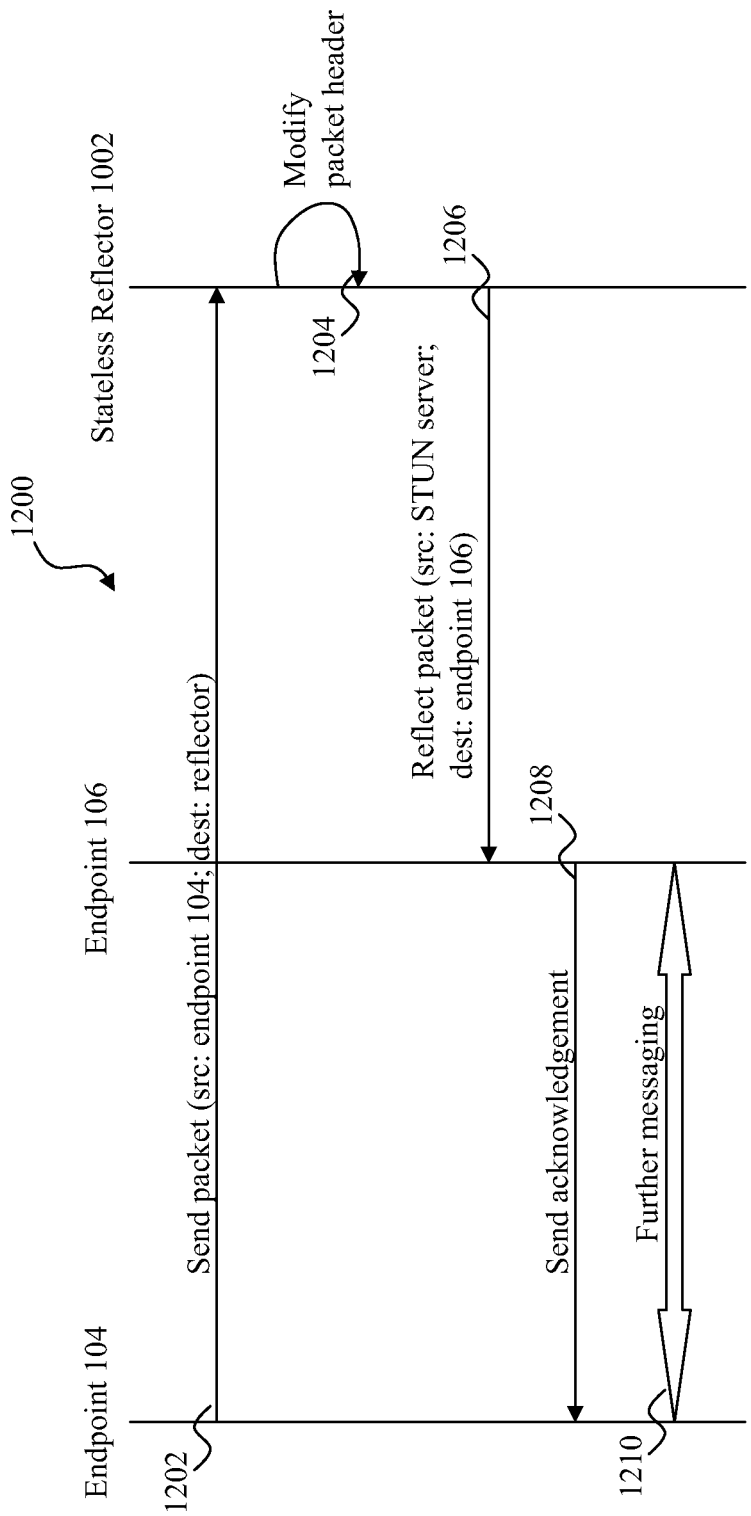
FIG. 12 is a sequence diagram illustrating one embodiment of a process from the table of FIG. 11 in greater detail.

Referring to FIG. 12, the endpoint 104 wants to inform the endpoint 106, which is already logged on, that the endpoint 104 has logged on. The NAT device 1004 is either a no NAT or a full cone type and the NAT device 1006 is either a restricted cone or a port restricted cone type. Accordingly, the endpoint 104 wants to send a message to the endpoint 106, but has not received a message from the endpoint 106 that would allow the endpoint 104 to traverse the NAT device 1006.

Although not shown in FIG. 12, prior to or during authentication, the endpoints 104 and 106 both sent a request to a STUN server (e.g., the STUN server 214 of FIG. 2) (not shown in FIG. 10). The STUN server determined an outbound IP address, an external port, and a type of NAT for the endpoints 104 and 106 (in this example, for the NAT devices 1004 and 1006). The STUN server 214 then sent a STUN response back to the endpoints 104 and 106 with the collected information. The endpoints 104 and 106 then sent an authentication request to an access server (e.g., the access server 102 of FIG. 1) (not shown in FIG. 10). The request contains the information about endpoints 104 and 106 received from the STUN server 214. The access server 102 responds to the requests by sending the relevant profile and routing table to the endpoints 104 and 106. In addition, each NAT device 1004 and 1006 may have a pinhole to the STUN server 214.

In the present example, the NAT device 1004 has an external address/port of 1.1.1.1:1111 and the NAT device 1006 has an external address/port of 2.2.2.2:2222. The STUN server 214 has an address/port of 3.3.3.3:3333 and the stateless reflector has an address/port of 4.4.4.4:4444. It is understood that the STUN server and/or stateless reflector 1002 may have multiple addresses/ports.

Figure 13:
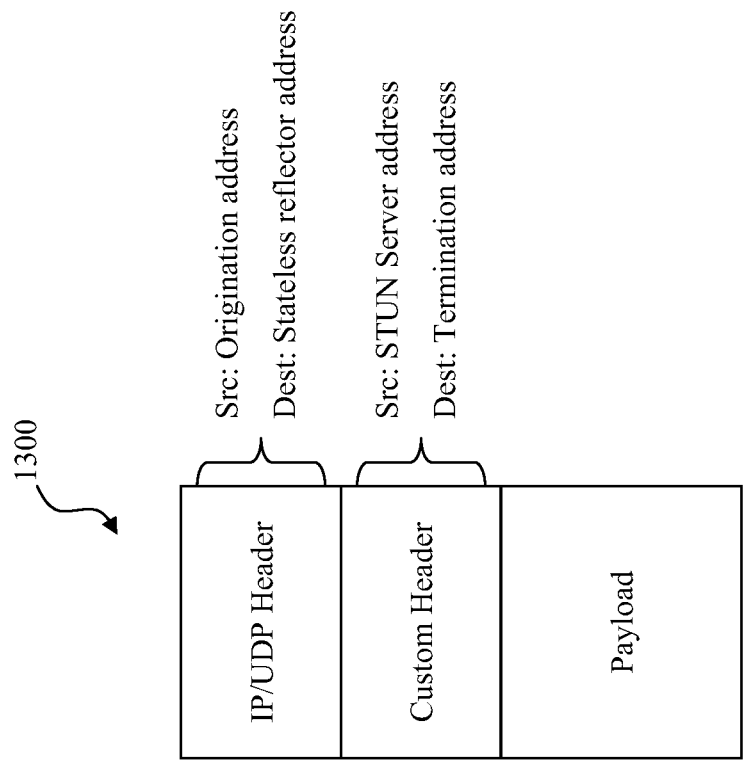
FIG. 13 illustrates one embodiment of a modified packet that may be used within the process of FIG. 12.

Referring to FIG. 12 and with additional reference to FIG. 13, in step 1202, the endpoint 104 sends a packet to the stateless reflector 1002. The packet contains header information identifying the source as the endpoint 104 (or rather, the external IP address of the NAT device 1004) and the destination as the stateless reflector 1002. The packet also contains custom or supplemental header information identifying the source as the STUN server 214 and the destination as the endpoint 106. Accordingly, the IP/UDP header of the packet sent from the endpoint 104 (via the NAT device 1004) identifies its source as 1.1.1.1:1111 and its destination as 4.4.4.4: 4444.

In step 1204, the stateless reflector 1002 modifies the packet header by replacing the IP/UDP header with the source and destination from the custom header. In the present example, the stateless reflector 1002 will modify the IP/UDP header to identify the packet's source as 3.3.3.3:3333 and its destination as 2.2.2.2:2222. Identifying the packet's source as the STUN server 214 enables the stateless reflector 1002 to send the packet through the pinhole in the NAT device 1006 that was created when the endpoint 106 logged on. After modifying the header, the stateless reflector 1002 sends the packet to the endpoint 106 via the NAT device 1006 in step 1206.

In step 1208, the endpoint 106 sends an acknowledgement (e.g., a 200 OK) directly to the endpoint 104. The address of the endpoint 104 is contained within the payload of the packet. The endpoint 106 is able to send the acknowledgement directly because the NAT device 1004 is either a no NAT or a full cone type. Because the endpoint 106 has opened a pinhole through the restricted or port restricted NAT device 1006 to the endpoint 104 by sending a message to the endpoint 104, the endpoint 104 is now able to communicate directly with the endpoint 106, as indicated by step 1210.

Referring again to table 1100 of FIG. 11, if the originating NAT type is either a no NAT type or a full cone type, then the originating NAT can establish communications with a terminating NAT type that is symmetric only after using the stateless reflector 1002 to reflect a packet and then performing a port capture. This process is described below with respect to FIG. 14.

Figure 14:
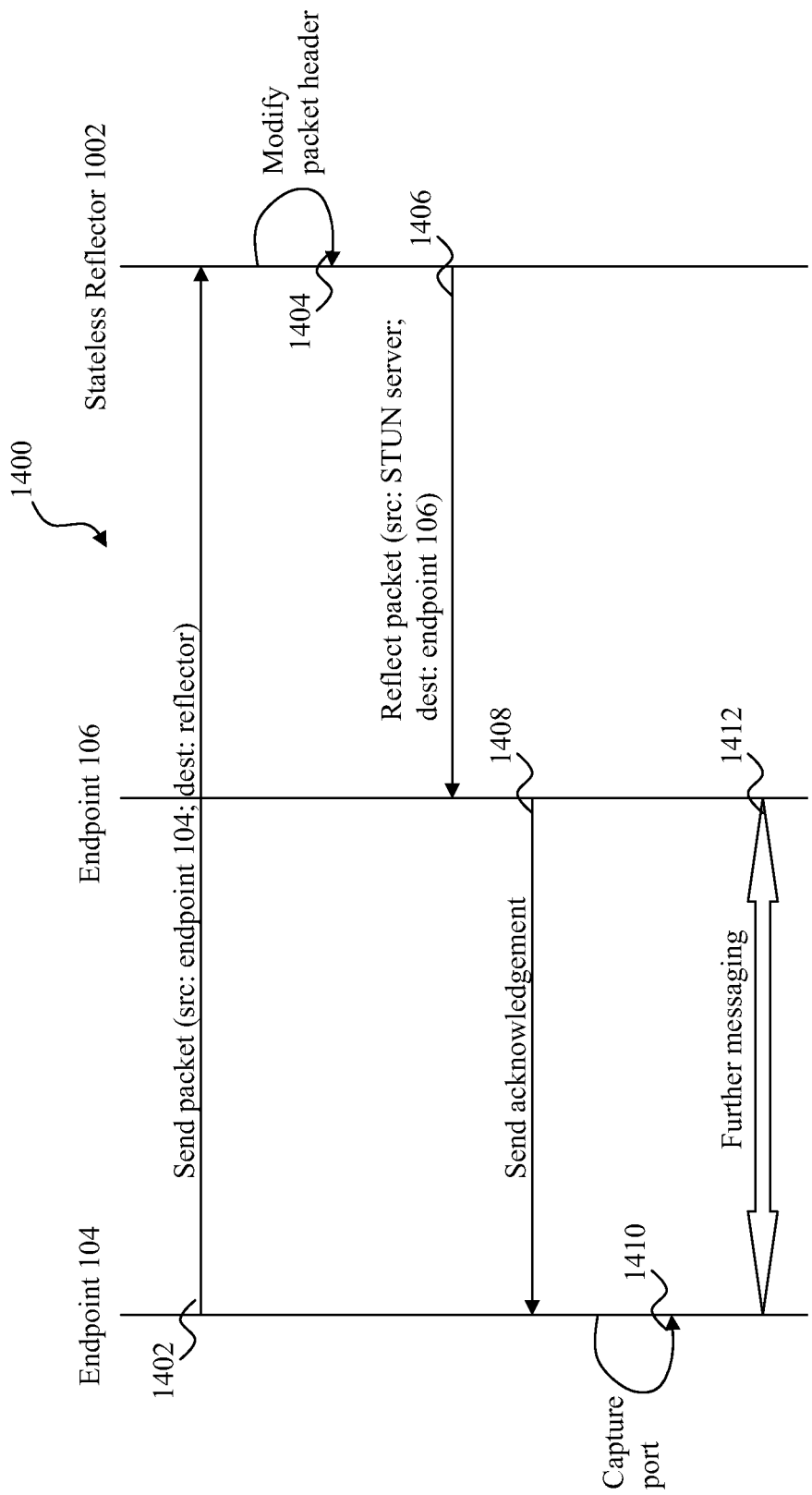
FIGS. 14-18 are sequence diagrams that each illustrate an embodiment of a process from the table of FIG. 11 in greater detail.

Referring to FIG. 14, steps 1402, 1404, 1406, and 1408 are similar to the reflection process described with respect to FIG. 12, and will not be described in detail in the present example. Because the terminating NAT type is symmetric, the originating NAT needs the port of the terminating NAT in order to send packets through the NAT device 1006. Accordingly, in step 1410, the endpoint 104 will capture the external port used by the NAT device 1006 to send the acknowledgement in step 1408. This port, along with the address of the NAT device 1006, may then be used when communicating with the endpoint 106, as indicated by step 1412.

Referring again to table 1100 of FIG. 11, if the originating NAT type is either a restricted cone type or a port restricted cone type, then the originating NAT can establish communications with a terminating NAT type that is either restricted or port restricted by using a fake packet and then using the stateless reflector 1002 to reflect a packet. This process is described below with respect to FIG. 15.

Figure 15:
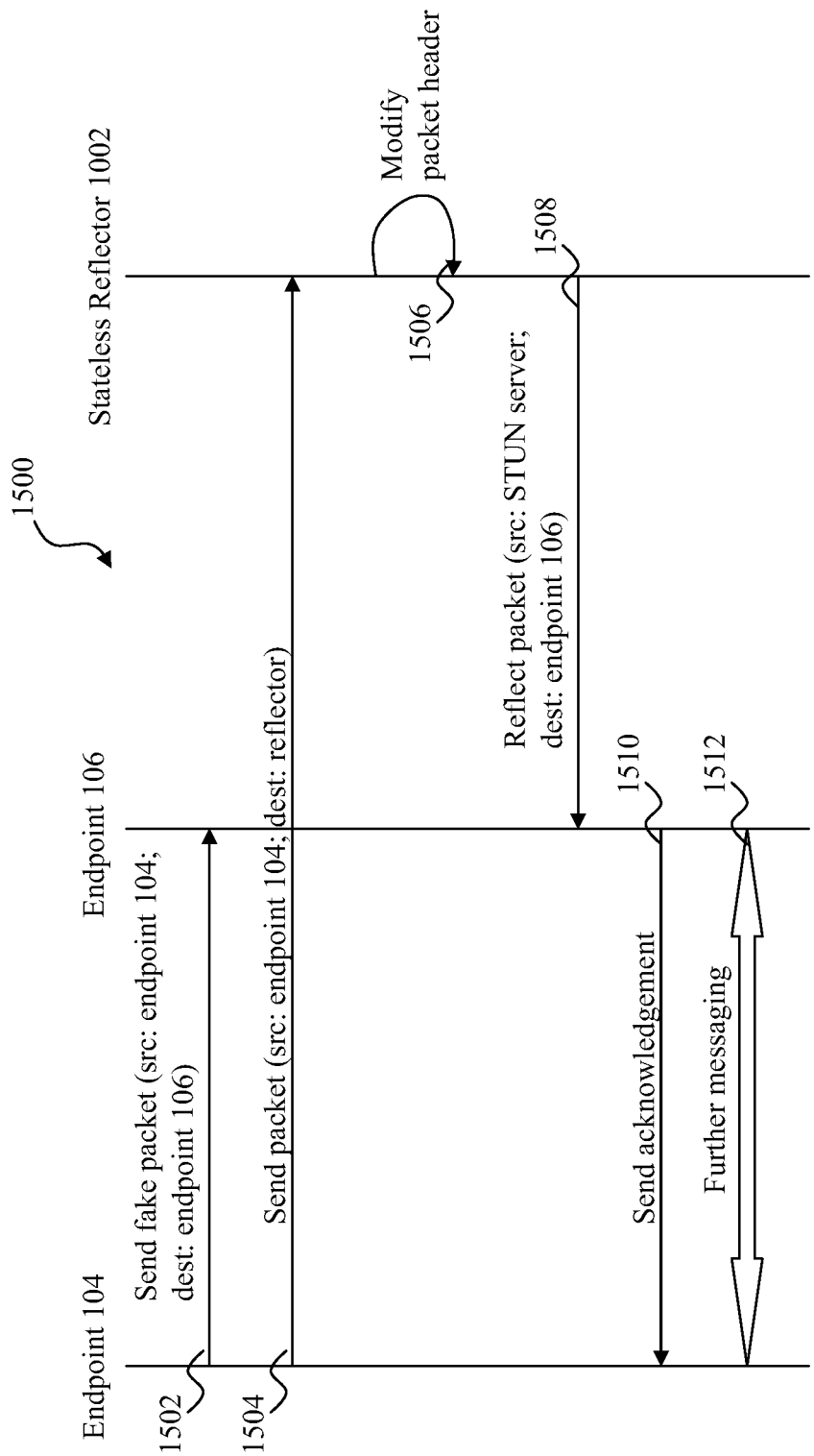

Referring to FIG. 15, in step 1502, the endpoint 104 sends a fake packet to the endpoint 106. Because the originating NAT type is a restricted cone type or a port restricted cone type, the fake packet opens a pinhole to the terminating NAT that will allow a response from the terminating NAT to penetrate the originating NAT. After sending the fake packet, the sequence 1500 proceeds with steps 1504, 1506, 1508, and 1510, which are similar to the reflection process described with respect to FIG. 12, and will not be described in detail in the present example. The endpoints 104 and 106 may then communicate directly, as indicated by step 1512.

Referring again to table 1100 of FIG. 11, if the originating NAT type is a symmetric type, then the originating NAT can establish communications with a terminating NAT type that is either no NAT or full cone after a port capture occurs. This process is described below with respect to FIG. 16.

Figure 16:
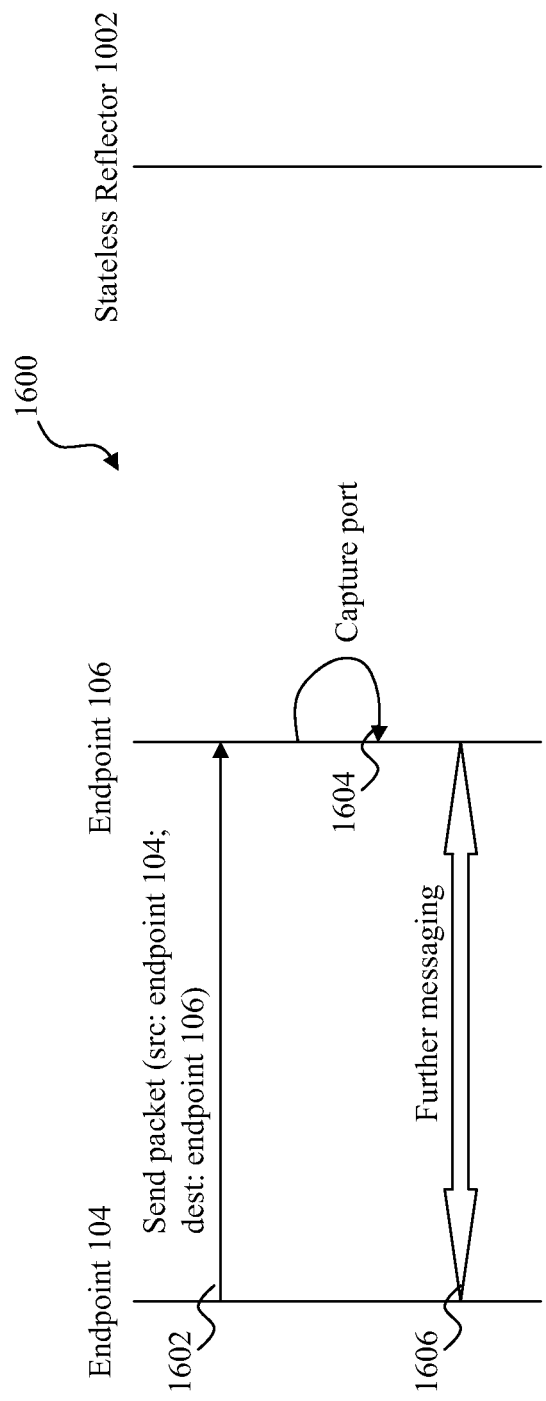

Referring to FIG. 16, in step 1602, the endpoint 104 (symmetric NAT type) sends a message to the endpoint 106. In step 1604, the endpoint 106 captures the external port used by the NAT device 1004 in sending the message. This port, along with the address of the NAT device 1004, may then be used when communicating with the endpoint 104 directly, as indicated by step 1606.

Referring again to table 1100 of FIG. 11, if the originating NAT type is a restricted cone type, then the originating NAT can establish communications with a terminating NAT type that is symmetric by using a fake packet, reflecting a packet using the stateless reflector 1002, and then performing a port capture. This process is described below with respect to FIG. 17.

Figure 17:
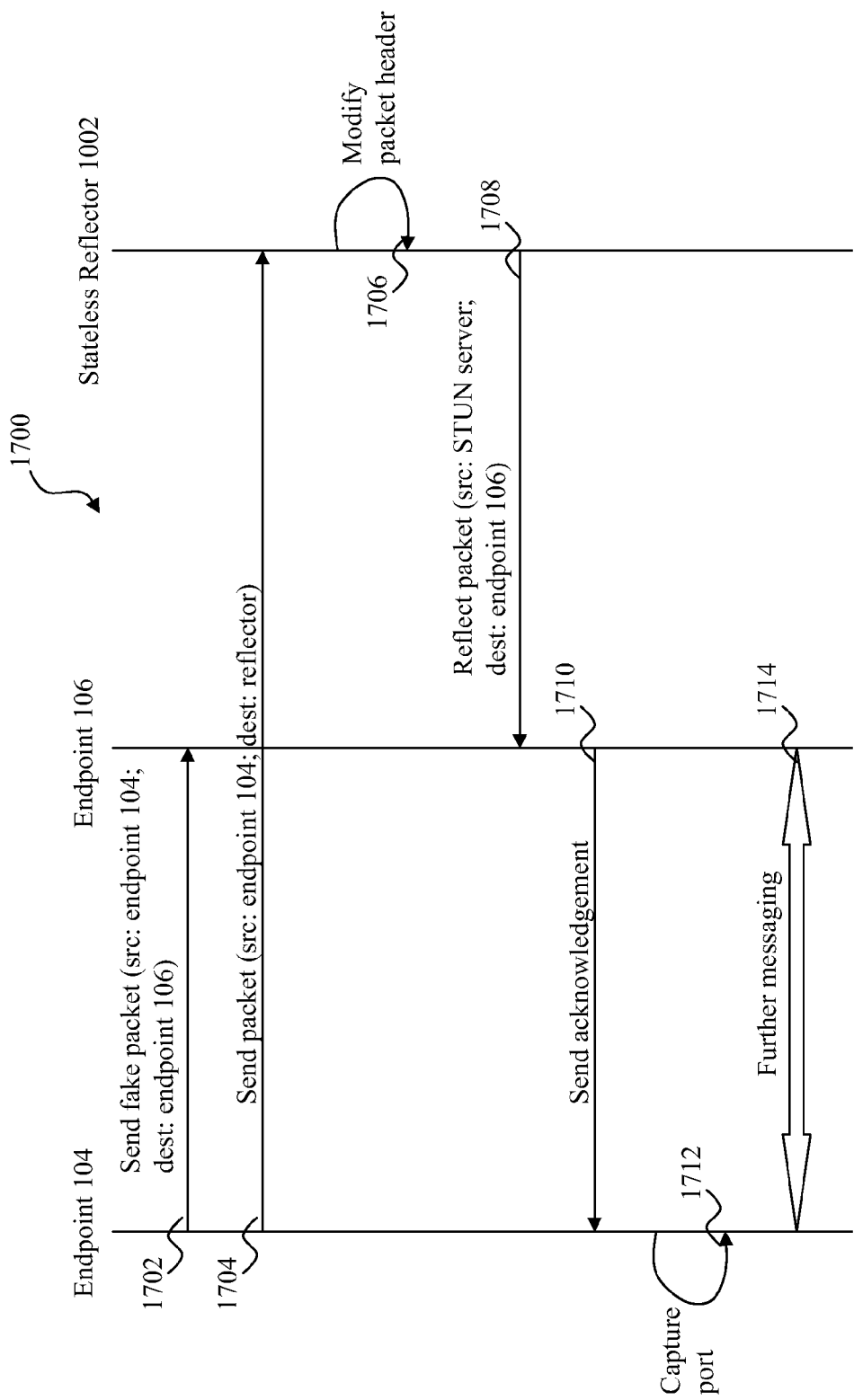

Referring to FIG. 17, in step 1702, the endpoint 104 sends a fake packet to the endpoint 106. Because the originating NAT type is a restricted cone type, the fake packet opens a pinhole to the terminating NAT that will allow a response from the terminating NAT to penetrate the originating NAT. After sending the fake packet, the sequence 1700 proceeds with steps 1704, 1706, 1708, and 1710, which are similar to the reflection process described with respect to FIG. 12, and will not be described in detail in the present example. In step 1712, the endpoint 104 captures the external port used by the NAT device 1006 in sending the acknowledgement in step 1710. This port, along with the address of the NAT device 1006, may then be used when communicating with the endpoint 106 directly, as indicated by step 1714.

Referring again to table 1100 of FIG. 11, if the originating NAT type is a symmetric type, then the originating NAT can establish communications with a terminating NAT type that is a restricted cone type by using a reflect, a fake packet, and a port capture. This process is described below with respect to FIG. 18.

Figure 18:
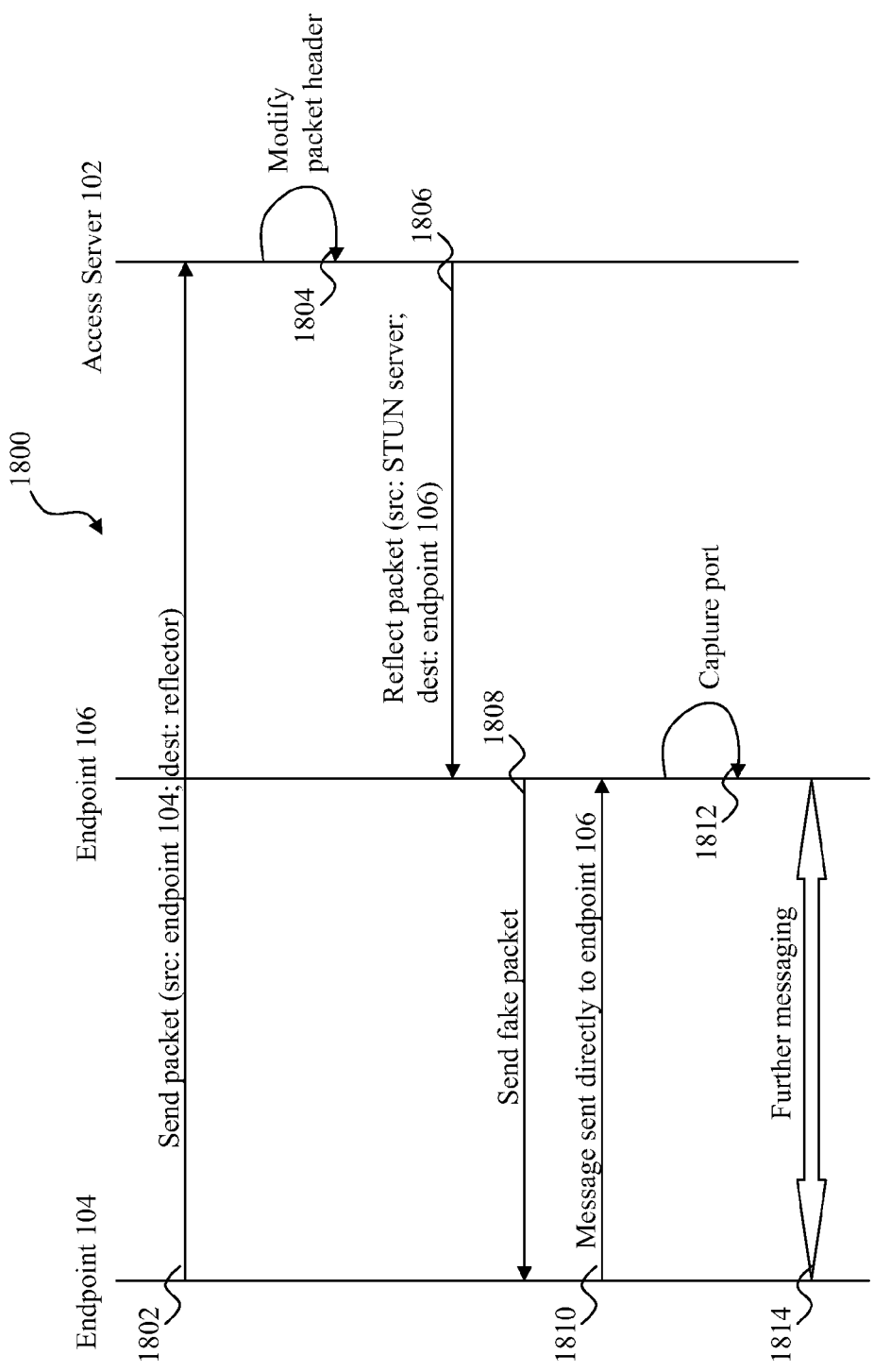

Referring to FIG. 18, steps 1802, 1804, and 1806 are similar to the reflection process described with respect to FIG. 12, and will not be described in detail in the present example. In step 1808, in response to the reflected message from the endpoint 104, the endpoint 106 sends a fake packet to the endpoint 104. Because the terminating NAT type is a restricted cone type, the fake packet opens a pinhole to the endpoint 104 to allow messages from the endpoint 104 to traverse the NAT device 1006. Accordingly, in step 1810, the endpoint 104 can send the next message directly to the endpoint 106 through the pinhole. In step 1812, the endpoint 106 captures the external port used by the NAT device 1004 to send the message in step 1810. This port, along with the address of the NAT device 1004, may then be used by the endpoint 106 when communicating directly with the endpoint 104, as indicated by step 1814.

Referring again to table 1100 of FIG. 11, if the originating NAT type is a symmetric type and the terminating NAT type is a port restricted cone, or if the originating NAT type is a port restricted cone and the terminating NAT type is symmetric, then all signaling between the two NAT devices is relayed via the stateless reflector 1002, while media is transferred via peer-to-peer, as described previously. If both the originating and terminating NAT types are symmetric, then all signaling and media are relayed via the stateless reflector 1002.

Accordingly, the peer-to-peer communications described herein may be achieved regardless of the NAT type that may be used by an endpoint. The stateless reflector 1002 need not know the information for each client, but instead reflects various packets based on information contained within the packet that is to be reflected. Both the custom header and payload may be encrypted for security purposes. However, the stateless reflector 1002 may only be able to decrypt the custom header and the payload itself may only be decrypted by the terminating endpoint. This enables the stateless reflector 1002 to perform the reflection functionality while maintaining the security of the payload itself. As described above, not all processes for traversing a NAT device may use the stateless reflector 1002.

Figure 19A:
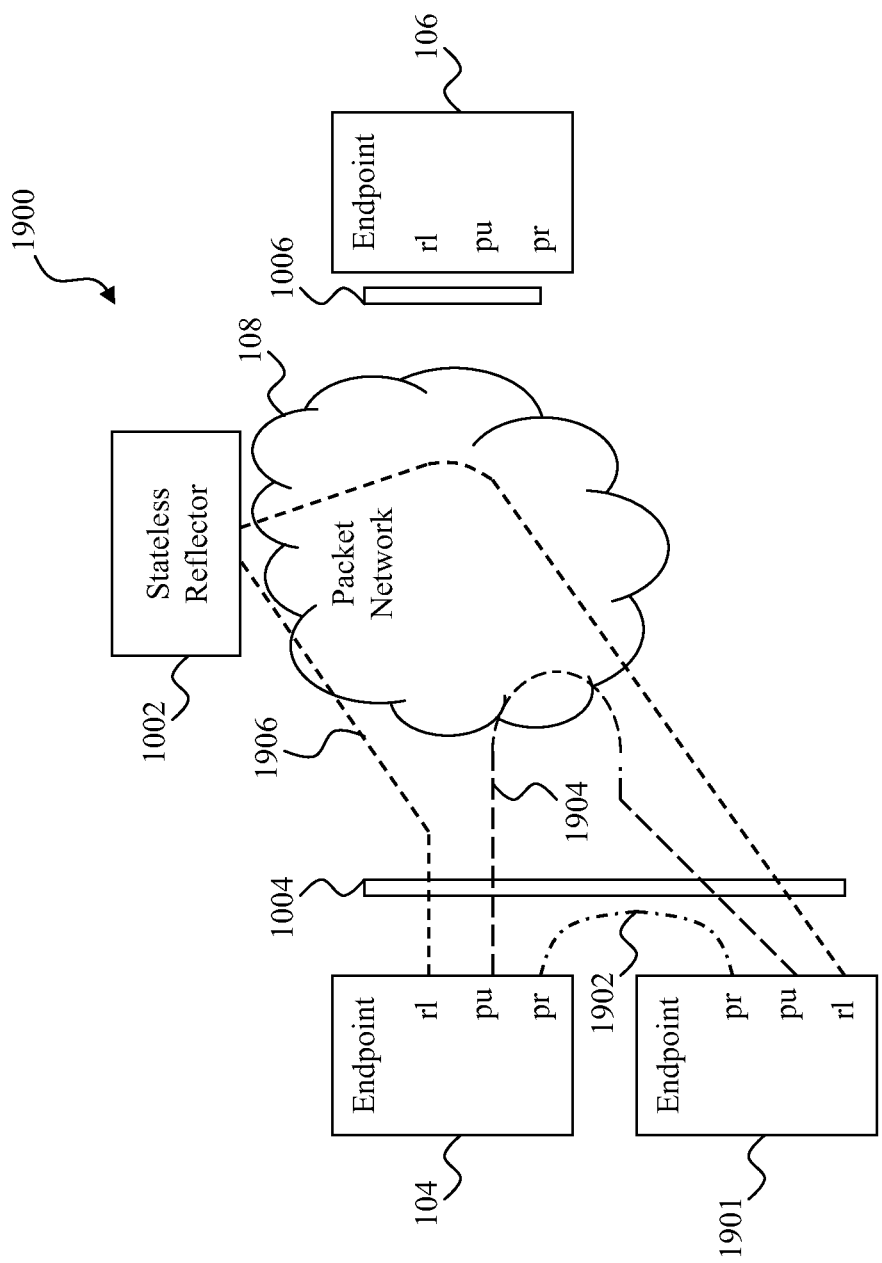
FIGS. 19A and 19B are simplified diagrams of another embodiment of a peer-to-peer system that includes multiple possible routes between endpoints.
Figure 19B:
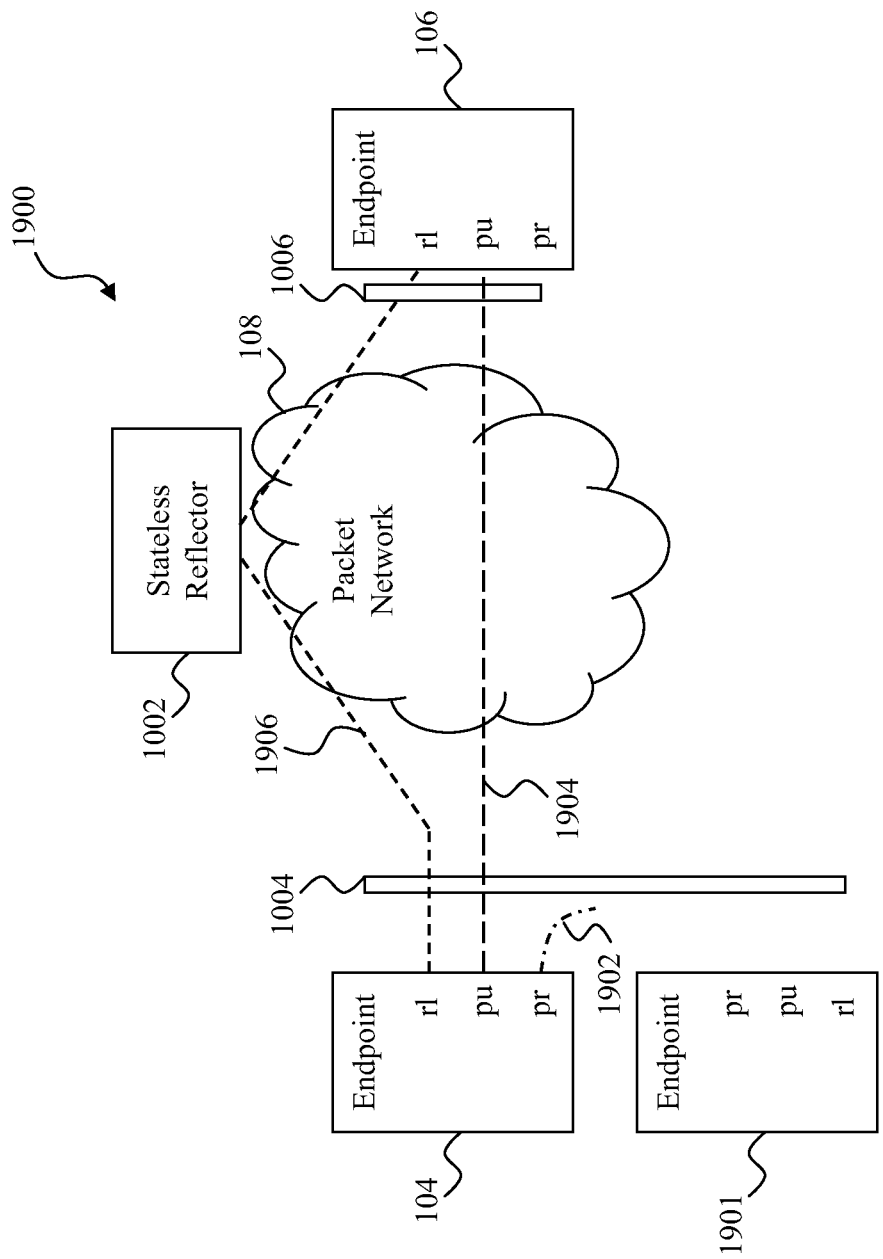

Referring to FIGS. 19A and 19B, in another embodiment, a peer-to-peer environment 1900 includes the two endpoints 104 and 106, the two NAT devices 1004 and 1006, and the stateless reflector 1002 of FIG. 10, and another endpoint 1901. Also illustrated are three possible routes between endpoints: a private (pr) route 1902, a public (pu) route 1904, and a reflected (rl) route 1906. FIG. 19A illustrates the routes 1902, 1904, and 1906 between the endpoint 104 and the endpoint 1901, and FIG. 19B illustrates the routes between the endpoint 104 and the endpoint 106. As will be discussed below in detail, the endpoints 104, 106, and 1901 may contain logic that allows one of the three routes 1902, 1904, and 1906 to be selected in a dynamic and flexible manner rather than relying on the rule-based system described above.

A rule-based system may be fairly inflexible, as such a system generally has a clear set of rules that are defined for various NAT situations and the current relationship between the two endpoints is handled according to those rules. Network configuration changes and other modifications may require revisions to the rules, which is not convenient and may prevent the endpoints from communicating until the rules are revised. Accordingly, in some embodiments, the flexibility described below may enable the endpoints 104, 106, and 1901 to adapt to new network configurations without requiring updated rules as would be required in a strictly rule-based system. In still other embodiments, the logic within the endpoints 104, 106, and 1901 may be updated to handle new network configurations, which also provides flexibility not found in strictly rule-based systems.

Each endpoint 104, 106, and 1901 may include one or more virtual interfaces for communication with other endpoints. In the present example, there are three virtual interfaces including a private virtual interface corresponding to the private route 1902, a public virtual interface corresponding to the public route 1904, and a relay virtual interface corresponding to the relay route 1906. It is understood that the term "virtual interface" is used only for purposes of description to clarify that there are multiple possible routes. Accordingly, the term "virtual interface" need not denote separate physical network interfaces on an endpoint, but may use a single physical network interface.

As described above, each endpoint 104, 106, and 1901 is generally associated with two IP address/port pairs. The first IP address/port pair may be the local (i.e., private) IP address/port information that represents each of the endpoints 104, 106, and 1901 in the network that is "inside" the corresponding NAT device 1004 or 1006. For example, the first IP address/port pair for the endpoint 104 may be the physical address assigned to the endpoint 104 by the corresponding NAT device 1004. This first IP address/port pair corresponds to the private virtual interface and may provide access via the private route to the endpoint 104 by endpoints in the same local network (e.g., the endpoint 1901). The second IP address/port pair may be the public IP address/port information that represents each of the endpoints 104, 106, and 1901 in the network that is "outside" the corresponding NAT device 1004 or 1006. For example, the second IP address/port pair for the endpoint 104 may be the address that is returned to the endpoint 104 by the STUN server as previously described (e.g., the NAT's external IP address/port pair assigned to the endpoint 104). This second IP address/port pair for the endpoint 104 corresponds to the public virtual interface and may provide access via the public route to the endpoint 104 by endpoints both inside and outside the endpoint 104's local network. Each endpoint 104, 106, and 1901 is also aware of the address information of the reflector 1002 as described in previous embodiments, which corresponds to the relay virtual interface of the endpoints. The relay route may be used in (5,4), (4,5), and/or (5,5) conditions according to the table of FIG. 11, where one endpoint must send a packet first, but is unable to do so because the other endpoint must send a packet first.

Figure 20:
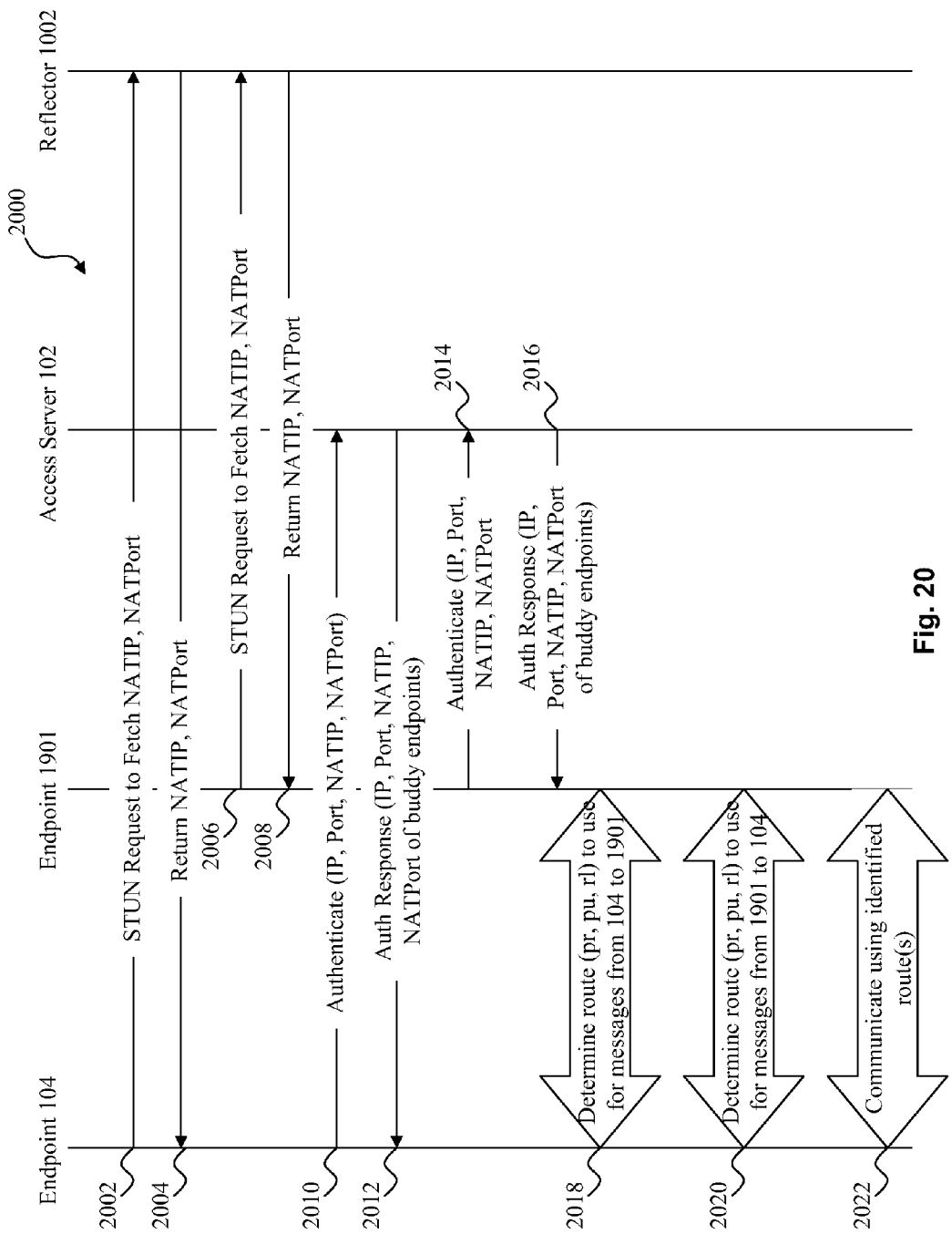
FIG. 20 is a sequence diagram illustrating one embodiment of a process that may be executed by endpoints within the system of FIGS. 19A and 19B.

Referring to FIG. 20, a sequence diagram illustrates one embodiment of a message sequence 2000 that may occur between the endpoints 104 and 1901 of FIG. 19A when identifying which of the routes (i.e., the private route 1902, the public route 1904, and the relay route 1906) will be used for communications. In the present example, the endpoints 104 and 1901 are in a local (i.e., private) network such as an Enterprise network, a local area network (LAN), a virtual LAN (VLAN), or a home network. This local network is isolated from the public network by the NAT device 1004 or a similar network component. Although shown as a single NAT device, it is understood that the NAT device 1004 may be a separate NAT device for each of the endpoints 104 and 1901. In contrast, the endpoint 106 is in a separate network that is only accessible by the endpoints 104 and 1901 via a public network that forms all or part of the packet network 108.

The present example uses a SIP messaging model over UDP, and so accommodates the transaction-based SIP model within connection-less UDP messaging. Because UDP is not transaction based, certain message handling processes may be used to conform to SIP standards, such as discarding multiple messages when the SIP model expects a message belonging to a specific transaction. However, it is understood that the sequence 2000 may be implemented using many different messaging models. In the present example, neither endpoint is online at the beginning of the sequence and the endpoints 104 and 1901 are "buddies." As described above, buddies are endpoints that have both previously agreed to communicate with one another.

In steps 2002 and 2006, the endpoints 104 and 1901, respectively, send STUN requests to obtain their corresponding public IP address/port pairs (NATIP, NATPort). In the present example, the reflector 1002 is serving as a STUN server, but it is understood that the STUN server may be separate from the reflector. The reflector 1002 responds to the STUN requests with the public IP address and port information for each of the endpoints 104 and 1901 in steps 2004 and 2008, respectively.

As the two endpoints 104 and 1901 are not logged in when the present example begins, they must both authenticate with the access server 102. In step 2010, the endpoint 104 sends an authentication request to the access server 102 with its private and public IP address/port pairs. In step 2012, the access server 102 responds to the authentication request and, as described previously, returns information that includes the private and public IP addresses of any buddy endpoints that are currently logged in. However, as the endpoint 1901 has not yet logged in, the information received by the endpoint 104 from the access server 102 will not include any address information for the endpoint 1901.

In step 2014, the endpoint 1901 sends an authentication request to the access server 102 with its private and public IP address/port pairs. In step 2016, the access server 102 responds to the authentication request and, as described previously, returns information that includes the private and public IP addresses of any buddy endpoints that are currently logged in. As the endpoint 104 is currently logged in, the information received by the endpoint 1901 from the access server 102 will include the private and public address information for the endpoint 104. Although not shown, the endpoint 1901 may then send a message to the endpoint 104 informing the endpoint 104 that the endpoint 1901 is currently online. This message may contain the private and public address information of the endpoint 1901. The message may be sent via the three different routes as described below with respect to later messaging, or may be sent via one or more selected routes. For example, the message may only be relayed (i.e., sent via the relay route) due to the high chance of success of that route.

At this point, the endpoint 104 wants to establish a communication session with the endpoint 1901, but does not know which of the three routes (i.e., pr, pu, and rl) should be used. In the previously described rule-based system, the endpoint 1901 would publish its NAT information, which enables the endpoint 104 to determine how to establish a connection. However, in the present example, such information is not published and the endpoint 104 does not know whether the endpoint 1901 is in the same private network as the endpoint 104, whether the endpoint 1901 is only accessible via a public network, whether the endpoint 1901 is behind a NAT device, or, if the endpoint 1901 is behind a NAT device, the settings of the NAT device (full cone, port restricted, etc.). Accordingly, the endpoint 104 needs to dynamically determine which of the three routes to use with the endpoint 1901.

Accordingly, in step 2018, the endpoint 104 interacts with the endpoint 1901 to determine which of the three routes should be used to send messages to the endpoint 1901. Similarly, in step 2020, the endpoint 1901 interacts with the endpoint 104 to determine which of the three routes should be used to send messages to the endpoint 104, which may not be the same route as that used by the endpoint 104 to send messages to the endpoint 1901. Steps 2018 and 2020 are illustrated in greater detail below with respect to FIG. 21. In step 2022, the two endpoints communicate via the determined route(s).

Figure 21:
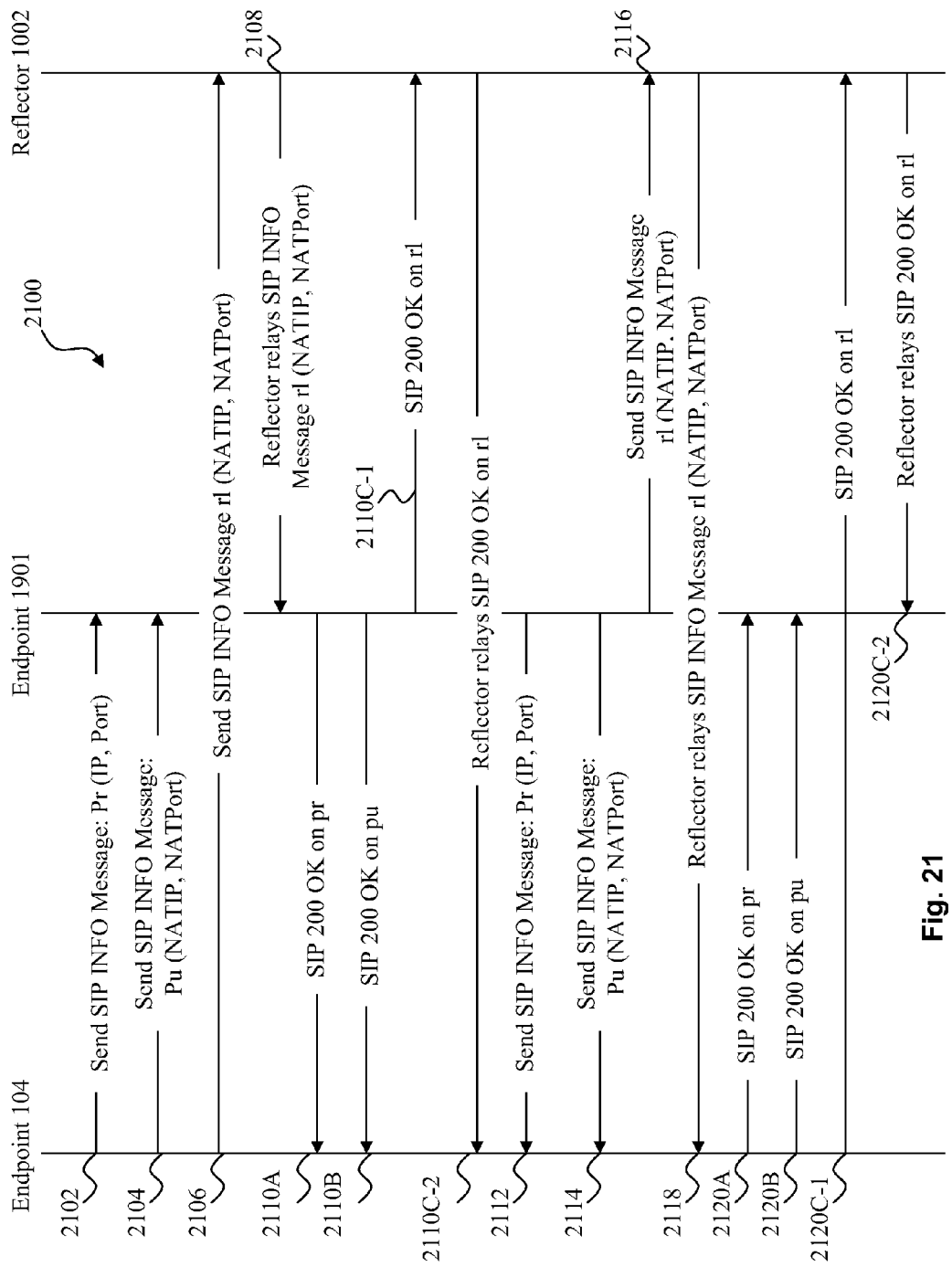
FIG. 21 is a sequence diagram illustrating one embodiment of steps from the sequence diagram of FIG. 20 in greater detail.

Referring to FIG. 21, a sequence diagram illustrates one embodiment of a message sequence 2100 that may occur during steps 2018 and 2020 of FIG. 20 in order to determine which of the routes are to be used. The endpoint 104 may keep a table containing each buddy that is online and the route to be used for that buddy. For example, when the route is unknown, the table may have the information shown in Table 1 below:

TABLE 1

| Buddy Endpoint | Route (send-receive) |
|---|---|
| 1901 | unk-unk |
| X | X |
| X | X |

The endpoint 104 (which is the originating endpoint in the present example) sends out three presence messages in steps 2102, 2104, and 2106. As the current example uses SIP messaging transported via UDP, the message is a SIP INFO message. More specifically, in step 2102, the endpoint 104 sends a SIP INFO message to the private IP address/port pair of the endpoint 1901 (i.e., via the private route) with an identifier such as a 'pr' tag to indicate the route. In step 2104, the endpoint 104 sends a SIP INFO message to the public (NAT) IP address/port pair of the endpoint 1901 (i.e., via the public route) with an identifier such as a 'pu' tag to indicate the route. In step 2106, the endpoint 104 sends a SIP INFO message to the endpoint 1901 via the reflector 1002 (i.e., via the relay route) with an identifier such as an 'rl' tag to indicate the route, which is reflected to the endpoint 1901 in step 2108.

The order in which the messages are sent may vary, but the order follows a hierarchy of desired routes in the present embodiment that places the private route first (i.e., most desirable), the public route next, and the relay route last (i.e., least desirable). However, it is understood that the order in which the messages are sent may vary or, if the endpoint 104 is capable of sending multiple messages simultaneously, the messages may be sent at the same time.

The present example assumes that the endpoint 1901 receives one or more of the messages sent in steps 2102, 2104, and 2106. If more than one message is received, the endpoint 1901 may respond only to the first one received. So, for example, if the message sent via the private route is received before the messages sent via the public and relay routes, the endpoint 1901 will respond only to the private route message and the later messages will be ignored. This reduces network traffic and provides for SIP compliance as the endpoint 104 (from a SIP perspective) expects to receive a single 200 OK message in response to its SIP INFO message. Furthermore, the response message may be sent back along the same route as the presence message to which the response is directed. So a response to the private route message will be sent back along the private route. Accordingly, only one of steps 2110A, 2110B, and 2110C-1 may occur in the present example. Step 2110C-2 is dependent on the occurrence of step 2110C-1 because the response message will not be reflected unless the relay route is used.

The response message returned by the endpoint 1901 is a SIP 200 OK message that may include the tag extracted from the received INFO message to identify which of the routes was successful (e.g., which route carried the message that was received first). For purposes of example, the private route was successful and the table may then be updated as shown in Table 2 below:

TABLE 2

| Buddy Endpoint | Route (send-receive) |
|---|---|
| 1901 | pr-unk |
| X | X |
| X | X |

It is noted that since the private route is successful, the two endpoints 104 and 1901 are in the same private network.

It is understood that the response message (e.g., the SIP 200 OK) may never be received by the endpoint 104. For example, the private route may not be available from the endpoint 1901 to the endpoint 104 due to network configuration settings. Accordingly, if the SIP 200 OK is not received by the endpoint 104, the endpoint 104 may execute a retransmission process that resends the presence messages along the three routes. The resending may occur a set number of times, for a set period of time, or until some other limit is reached. For example, the first set of presence messages may be sent 0.5 seconds after the initial messages are sent, the second set of messages may be sent one second after that, and each additional set of messages may be sent at time periods that are double the previous delay until a total of seven sets of messages are sent. At this time, the endpoint 104 may stop sending messages. If a response is received during the retransmission process, the endpoint 104 will stop retransmitting. However, the response message will generally be received by the endpoint 104.

The outbound SIP INFO messages and the received SIP 200 OK message inform the endpoint 104 of which route to use when sending communications to the endpoint 1901. However, this route may not work in reverse. In other words, just because the endpoint 104 can reach the endpoint 1901 via the private route (to continue the example), it does not necessarily follow that the endpoint 1901 can reach the endpoint 104 using the same route. For example, differences in the configurations of NAT devices or other network differences may mean one endpoint can be reached via a particular route even if the reverse route is not available.

Accordingly, the endpoint 1901 sends out three presence messages in steps 2112, 2114, and 2116. As the current example uses SIP messaging transported via UDP, the message is a SIP INFO message. More specifically, in step 2112, the endpoint 1901 sends a SIP INFO message to the private IP address/port pair of the endpoint 104 (i.e., via the private route). In step 2114, the endpoint 1901 sends a SIP INFO message to the public (NAT) IP address/port pair of the endpoint 104 (i.e., via the public route). In step 2116, the endpoint 1901 sends a SIP INFO message to the endpoint 104 via the reflector 1002 (i.e., via the relay route), which is reflected to the endpoint 104 in step 2118.

The present example assumes that the endpoint 104 receives one or more of the messages sent in steps 2112, 2114, and 2116. If more than one message is received, the endpoint 104 may respond only to the first one received. Accordingly, only one of steps 2120A, 2120B, and 2120C-1 may occur in the present example. Step 2120C-2 is dependent on the occurrence of step 2120C-1 because the response message will not be reflected unless the relay route is used. The response message returned by the endpoint 104 is a SIP 200 OK message that identifies which of the routes was successful (e.g., was received first).

If the first (or only) SIP INFO message received by the endpoint 104 from the endpoint 1901 is received via the same route as that used by the endpoint 104 to send messages to the endpoint 1901 (e.g., the private route), then the communication session is established with messages going both ways on that route. At this point, the table may then be updated as shown in Table 3 below:

TABLE 3

| Buddy Endpoint | Route (send-receive) |
|---|---|
| 1901 | pr-pr |
| X | X |
| X | X |

However, the first (or only) SIP INFO message received by the endpoint 104 from the endpoint 1901 may be received on a different route than that used by the endpoint 104 to send messages to the endpoint 1901. When this occurs, the endpoint 104 flags this as the endpoint 1901 responded to the INFO message via one route but is now communicating via another route. For example, the endpoint 1901 responded on the private route, but is now using the public route. One possibility for this discrepancy is that there is a router or other network device interfering with the return path (i.e., the path used by the endpoint 1901 to send messages to the endpoint 104). Another possibility is that a message went faster one way than another way. For example, while the endpoint 1901 may have received the private message from the endpoint 104 (i.e., the message of step 2102 of FIG. 21) before the other messages, the endpoint 104 may have received the public message from the endpoint 1901 (i.e., the message of step 2114 of FIG. 21) before the public and relay messages.

When this occurs, the endpoint 104 may transition from the private route to the public route. This results in sending and receiving routes of pu-pu as illustrated by Table 4 below:

TABLE 4

| Buddy Endpoint | Route (send-receive) |
|---|---|
| 1901 | pu-pu |
| X | X |
| X | X |

The endpoint 104 may also be configured to confirm that this transition is correct. To confirm the transition, the endpoint 104 executes a confirmation process and sends a confirmation message to the endpoint 1901 on the private route (i.e., the route that the endpoint 104 thinks it should be using to send messages to the endpoint 1901). In the present example, the confirmation message may include a SIP field named MAX_FORWARDS that defines a maximum number of hops that a packet can take before being dropped. The MAX_FORWARDS field has a standard default value of seventy, but the endpoint 104 may set the value to one (i.e., MAX_FORWARDS=1). If the response message from the endpoint 1901 is received by the endpoint 104 and has set the MAX_FORWARDS field to 0, then the endpoint 104 transitions back to the private route and uses that route for sending future messages. This results in different sending and receiving routes as illustrated by Table 5 below:

TABLE 5

| Buddy Endpoint | Route (send-receive) |
|---|---|
| 1901 | pr-pu |
| X | X |
| X | X |

However, if the endpoint 104 does not receive a response message to its confirmation message, it continues using the public route. This results in sending and receiving routes of pu-pu as illustrated by Table 4 above.

Communications between the endpoints 104 and 106 as illustrated in FIG. 19B may follow the same sequence of presence messages and responses as that described above with respect to FIGS. 20 and 21. However, since the endpoints 104 and 106 are in separate networks (i.e., not the same local network), the private route 1902 is not available and the private presence messages will fail to reach their destination. The presence messages may still be sent each way on the private route as the endpoints 104 and 106 do not know the location of the other endpoint, but the messages will be dropped. For example, the NAT devices 1004 and 1006 may both be routers that have an address of 192.168.1.1 in their respective home networks. The NAT device 1004 may assign a private address of 192.168.1.10 to the endpoint 104 and the NAT device 1006 may assign a private address of 192.168.1.15 to the endpoint 106. Although these addresses appear to be in the same local network, they are not. However, as the endpoints 104 and 106 have no way of knowing whether the private addresses are in the same local network until they perform their strategic routing sequences, they may both send their private presence messages along the private route, even though the messages will both fail. Accordingly, the endpoints 104 and 106 will use the public route 1904 and/or the relay route 1906 when communicating.

Figure 22:
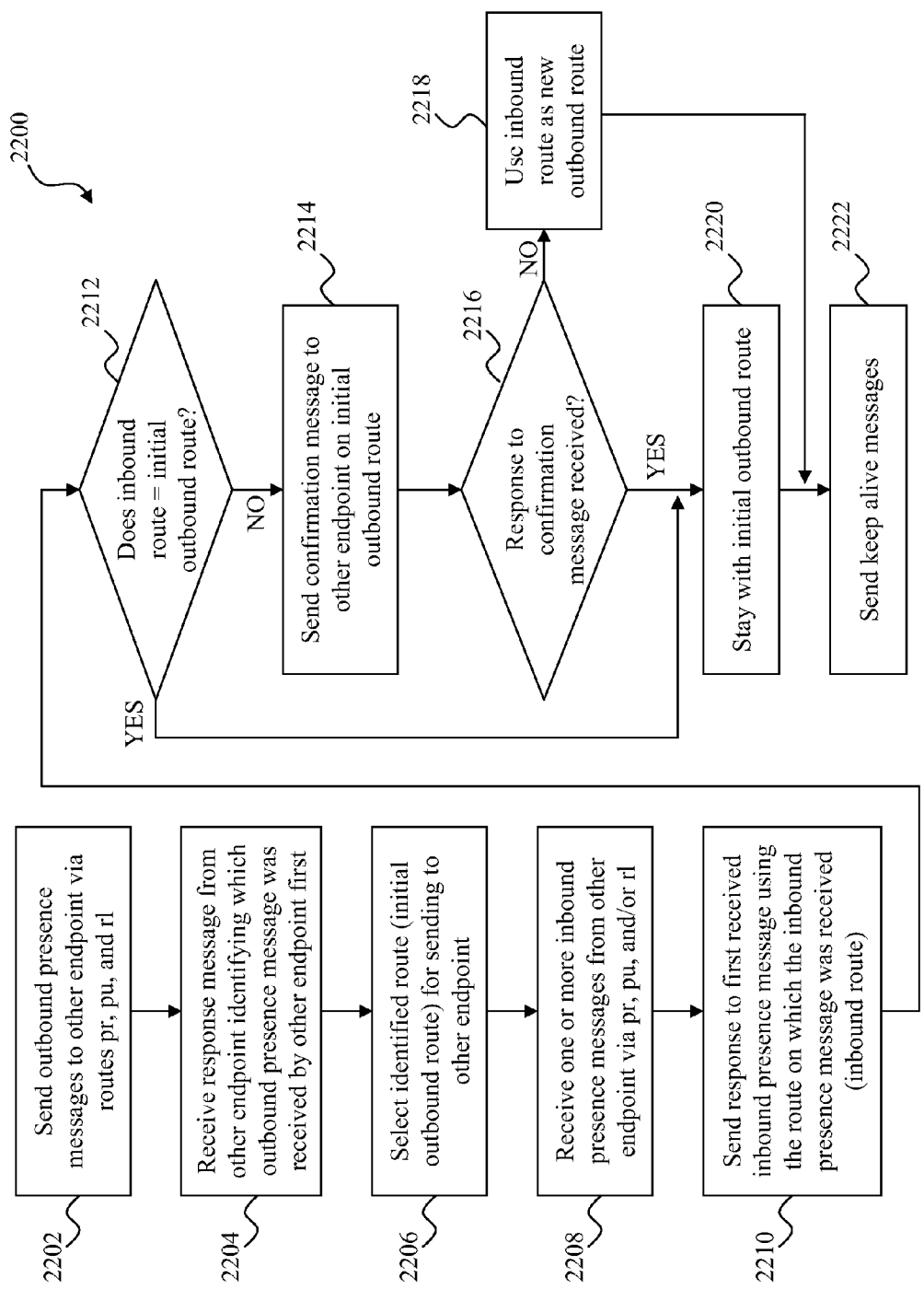
FIG. 22 is a flow chart illustrating one embodiment of a method that may be executed by an endpoint within the system of FIGS. 19A and 19B.

Referring to FIG. 22, a flowchart illustrates one embodiment of a method 2200 that may represent a process by which an endpoint such as the endpoint 104 of FIGS. 19A and 19B establishes a connection with another endpoint as described with respect to FIGS. 20 and 21 above.

In step 2202, the endpoint 104 sends outbound presence messages on the private, public, and relay routes. The presence messages may contain identifiers such as tags or other route indicators, or the receiving endpoint may simply note which virtual interface (i.e., pr, pu, or rl) received a particular presence message and correlate the message with the route upon receipt. In step 2204, the endpoint 104 receives a response message that indicates which of the presence messages was received first. For example, the response message may include the tag from the presence message to identify the route corresponding to the received presence message. In step 2206, the endpoint 104 selects the identified route as the initial outbound route for messages being sent to the other endpoint.

In step 2208, the endpoint receives one or more inbound presence messages from the other endpoint. In step 2210, the endpoint 104 sends a response to the first received inbound presence message.

In step 2212, the endpoint 104 determines whether the inbound route of the message received in step 2210 is the same route as the initial outbound route selected in step 2206. If the routes are the same, the method 2200 continues to step 2220 and uses the initial outbound route to send messages to the other endpoint. If the routes are not the same, the method 2200 moves to step 2214 and sends a confirmation message to the other endpoint using only the initial outbound route. In step 2216, the endpoint 104 determines whether a response to the confirmation message has been received. If no response to the confirmation message has been received, the method 2200 moves to step 2218 and transitions to the inbound route as the new outbound route for messages being sent to the other endpoint. If a response to the confirmation message has been received, the method 2200 continues to step 2220 and uses the initial outbound route to send messages to the other endpoint.

In step 2222, the endpoint 104 may begin sending keep-alive messages to the other endpoint to ensure that the outbound route remains open. For example, one of the networks or NAT devices involved in the established session may undergo a configuration change or a failure while the two endpoints are online, and so an existing route may become unusable. In such a case, the endpoint may detect that the keep-alive messages are failing and so may return to step 2202 to re-establish a valid route. It is noted that the other endpoint may not need to re-establish its outbound route. For example, if the inbound and outbound routes for the endpoint 104 are different, the inbound route may remain valid even though the outbound route is invalid. Accordingly, some steps of the method 2200 may be skipped in some scenarios.

It is noted that many different variations of the method 2200 may exist. For example, the endpoint 104 may transition to the inbound route as the new outbound route if it is determined in step 2212 that the routes are not the same, rather than remaining on the initial outbound route. Then, if a response is received to the confirmation message, the endpoint 104 may transition back to the initial outbound virtual interface. Furthermore, as stated previously, the response message may never be received by the endpoint 104 and so some steps of the method 2200 may not occur or may occur in a different order as there may be no response message available to determine the initial outbound route. It is also noted that some steps of the method 2200 may be performed in a different order than shown. For example, step 2208 may occur before step 2204 depending on network latency and other factors.

Figure 23A:
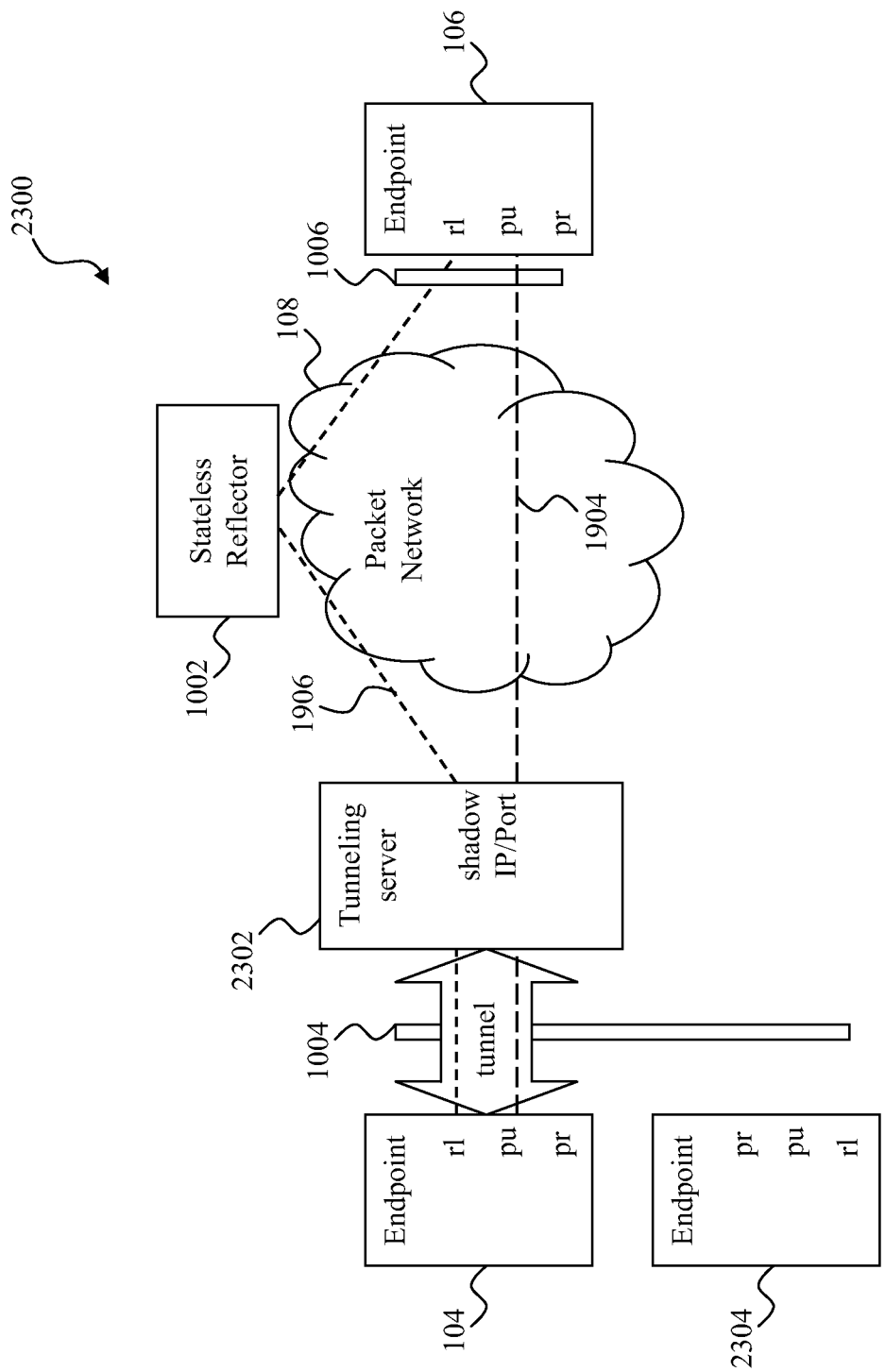
FIGS. 23A and 23B are simplified diagrams of another embodiment of a peer-to-peer system that includes a tunneling server and multiple possible routes between endpoints.
Figure 23B:
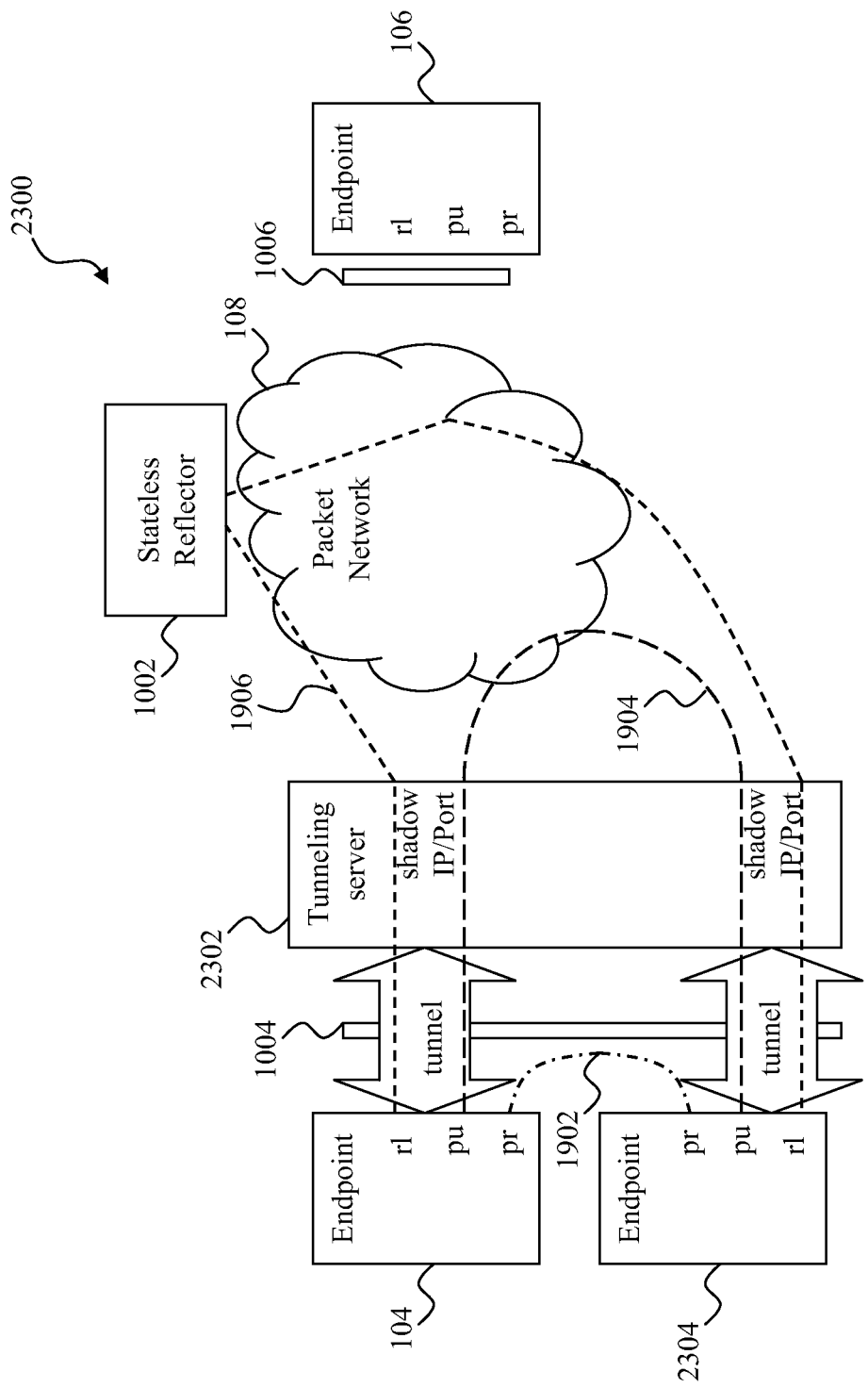

Referring to FIGS. 23A and 23B, in another embodiment, the endpoints 104 and 106, the two NAT devices 1004 and 1006, and the stateless reflector 1002 of FIGS. 19A and 19B are illustrated with a tunneling server or other access device 2302 and another endpoint 2304. The tunneling server 2402 may provide access to other endpoints for an endpoint that does not have UDP access or access to another expected protocol. For example, if the endpoint 104 performs a STUN request and the request fails, the network within which the endpoint 104 is positioned may not support UDP (e.g., the network may be an Enterprise network that has disabled UDP). For purposes of illustration, the endpoints 104 and 2304 are in a private network and not separated by the NAT device 1004, and the endpoint 106 is separated from the endpoint 104 by the NAT devices 1004 and 1006.

Figure 24:
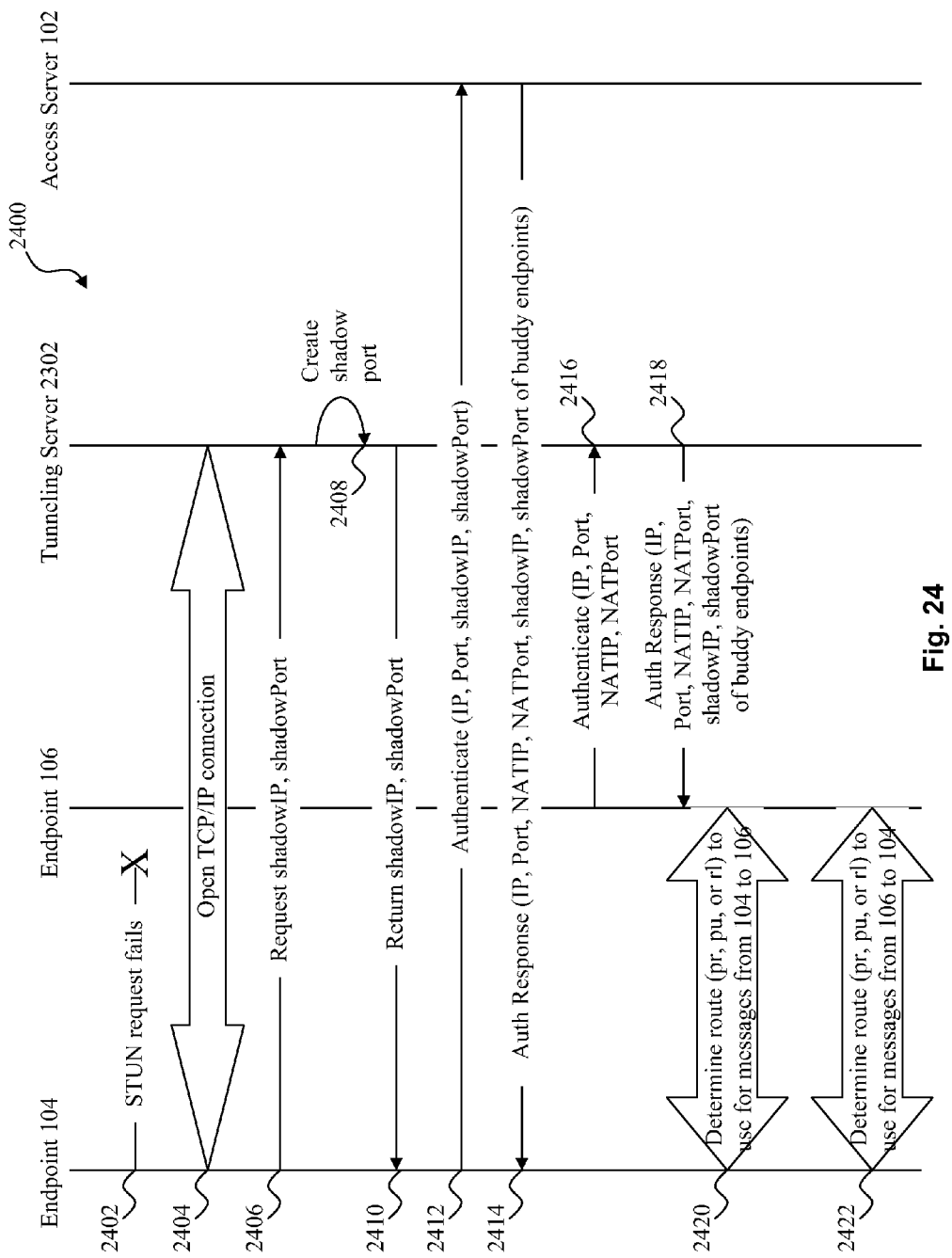
FIG. 24 is a sequence diagram illustrating one embodiment of a process that may be executed by endpoints within the system of FIGS. 23A and 23B.

Referring to FIG. 24, a sequence diagram illustrates one embodiment of a message sequence 2400 that may occur in the environment of FIGS. 23A and 23B to establish a connection between the endpoints 104 and 106. As with the previous discussion of FIG. 20, the endpoints 104 and 106 may each maintain a table, although this is not shown in the present example.

In step 2402, the endpoint 104 sends a STUN request that fails. Based on the failure of the STUN request, the endpoint 104 determines that the network (e.g., the NAT device 1004) has disabled UDP. It is understood that other indicators may be used to determine that UDP is not available. In step 2404, based on the unavailability of UDP, the endpoint 104 opens a TCP/IP connection (i.e., a tunnel) with the tunneling server 2302. This connection may use a port such as port 443 of the NAT device 1004, which is the default TCP port for HTTP Secure (HTTPS) connections using the Transport Layer Security (TLS) or Secure Socket Layer (SSL) protocols. However, it is understood that port 443 is only an example and that other available ports may be used. In step 2406, the endpoint 104 requests a shadow IP address and shadow port on the tunneling server 2302. In step 2408, the tunneling server 2302 creates the shadow IP address and port and returns this information to the endpoint 104 in step 2410.

The shadow IP address and shadow port serve as the public address and port of the endpoint 104 for other endpoints. In other words, the shadow IP address/port replace the NAT IP address/port that would serve as the public contact information for the endpoint 104 in an environment in which UDP is available to the endpoint 104 (e.g., as in FIGS. 19A and 19B). In some embodiments, the shadow IP address/port pairs may be placed on a shadow list as they are provisioned and the shadow list may be available to the access server 102 and/or endpoints. In other embodiments, the access server 102 and/or endpoints may have a list or range of IP addresses/ports that are known to be shadows. In still other embodiments, the knowledge of whether an IP address/port is a shadow is not available to the access server 102 and/or endpoints.

In step 2412, the endpoint 104 authenticates with the access server 102 via the tunnel using its local IP address/port and shadow address/port information. In step 2414, the access server 102 authenticates the endpoint 104 and sends the endpoint 104 the contact information of online buddies, including corresponding private, public, and shadow IP address/port information.

Although not shown in FIG. 24, the endpoint 106 sends a request to a STUN server and receives its public IP address/port information as described with respect to the endpoints 104 and 1901 in FIG. 20. Since the endpoint 106 is successful with its STUN request, it does not need to use the tunneling server 2302. In steps 2416 and 2418, the endpoint 106 authenticates with the access server and receives the private IP address/port and shadow IP address/port of the endpoint 104. As discussed above, the endpoint 106 may or may not know that the endpoint 104 is using a shadow, depending on the particular implementation of the shadow list.

In steps 2420 and 2422, the endpoints 104 and 106 may establish a communication session as described previously with respect to FIGS. 20 and 21. However, the communications between the two endpoints 104 and 106 will use the tunnel between the endpoint 104 and the tunneling server 2302 and the corresponding shadow IP address and port for the endpoint 104.

In embodiments where the endpoint 106 knows that the endpoint 104 is using a shadow, the endpoint 106 may not send a presence message via the private route as the endpoint 106 knows that the private route is not available. In other embodiments, the endpoint 106 may send a presence message via the private route even though the route is not available.

Communications between the endpoints 104 and 2304 as illustrated in FIG. 23B may follow a similar sequence of presence messages and responses as that described above with respect to FIG. 24. However, since the endpoints 104 and 2304 are in the same local network, the private route 1902 is available and the private presence messages may reach their destinations. The endpoint 2304 may not use a relay message to try to reach the endpoint 104, since its failed STUN request will inform the endpoint 2304 that UDP is not available. In order to use the public and relay routes, the endpoint 2304 will create a tunnel with the tunneling server 2303 as described above with respect to the endpoint 104. The public and relay messages may still work via the respective tunnels of the endpoints 104 and 2304.

Figure 25:
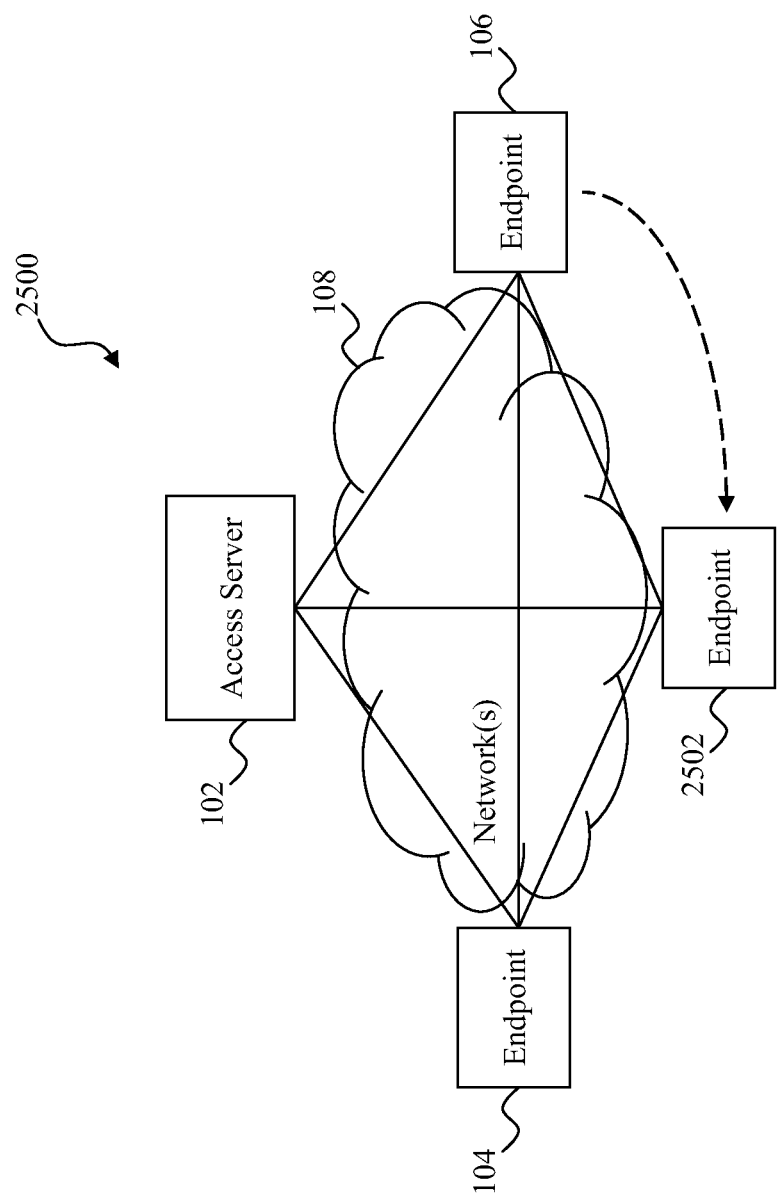
FIG. 25 is a simplified diagram of another embodiment of a peer-to-peer environment in which an endpoint may transfer or forward a call to another endpoint.

Referring to FIG. 25, in another embodiment, an environment 2500 is illustrated in which an endpoint 104 (e.g., the endpoint 104 of FIG. 1) is engaged in a call with another endpoint 106. For purposes of illustration, the term "call" as used in the following disclosure may include the transmission and reception of audio, video, and/or data. While the endpoint 104 is engaged in the call, the endpoint 104 wants to transfer the call to the endpoint 2502.

It is understood that the terms "transfer" and "forward" as used herein refer to moving a call from one endpoint to another. More specifically, a transfer refers to moving an active call from one endpoint to another endpoint (e.g., after the call has been initially answered by the transferring endpoint), while a forward refers to moving an inactive call before the active call has been established (e.g., before the call is answered by the transferring endpoint). So, for example, if a user of the endpoint 104 answers a call and then moves that call to the endpoint 2502, a transfer has occurred. If the user moves the call before it is answered, a forward has occurred. Although the trigger may be different (e.g., before or after an active call is established), it is understood that transferring and forwarding may be handled in a substantially similar or identical manner. Accordingly, although the following examples generally refer to transferring a call, it is understood that the examples may also be applicable to forwarding a call and the term "transfer" may be used interchangeably with the term "forward." Furthermore, if the endpoint 104 is "engaged" in a call, the call may be active or inactive.

As is known, a switch takes care of the call transfer/forward process in conventional telephone systems. However, there is no central switching mechanism in the hybrid peer-to-peer network of FIG. 25. Accordingly, as described below, the endpoints 104, 106, and 2502 need to communicate in order to handle call transferring/forwarding in the peer-to-peer network.

Referring to FIG. 26A, a sequence diagram illustrates one embodiment of a message sequence 2600 that may occur in the environment 2500 of FIG. 25 when a session is transferred from the endpoint 106 to the endpoint 2502. In step 2602, the endpoints 104 and 106 are involved in an active call (although it could be inactive in some embodiments) and the endpoint 106 wants to transfer the call to the endpoint 2502, which will move the call to the endpoints 104 and 2502. At the end of this process, the endpoint 106 will no longer be involved in the call. Accordingly, the endpoint 106 must communicate the transfer request and the endpoints 104, 106, and 2502 must communicate with one another in order to accomplish the transfer in the hybrid peer-to-peer network of FIG. 25.

As described previously, the hybrid peer-to-peer network places limits on communications between endpoints that are not buddies. In a call transfer or call forwarding situation, it is possible that two endpoints involved in the transfer or forwarding process may not be buddies. Endpoints may check on buddy status at certain stages in the process and may involve the access server 102 if needed to help resolve any communication problems that may stem from the lack of a buddy relationship. In the present example, the endpoints 104, 106, and 2502 are all buddies and so barriers due to the non-existence of buddy relationships are not present. Later examples will describe scenarios in which various endpoints are not buddies.

Accordingly, in step 2604, the endpoint 106 determines whether the endpoint 2502 is a buddy. In the present example, the endpoints 106 and 2502 are buddies and so may communicate freely as previously described. In step 2606, the endpoint 106 determines whether the endpoint 2502 is online. If not, the call may end or the endpoint 106 may retain control of the call or transfer the call to an available endpoint. However, in the present example, the endpoint 2502 is online.

In step 2608, the endpoint 106 sends a transfer request in the form of one or more messages to the endpoint 2502. The transfer request may contain various types of information, including the other party in the call (i.e., the endpoint 104) and other information such as media type. It is understood that the transfer request contains any information needed by the endpoint 2502 in accepting the transfer from the endpoint 106. In step 2610, the endpoint 2502 may determine whether to accept or reject the transfer request. It is understood that the accept/reject process may take many different forms. For example, the endpoint 2502 may indicate the incoming request by ringing, by displaying a text message that may or may not indicate a call transfer request, or by any other appropriate means. In the present example, the endpoint 2502 accepts the transfer request.

Although not shown, the acceptance of the transfer request may result in a message sent from the endpoint 2502 to the endpoint 106 indicating that the transfer is accepted. At this time, the endpoint 106 may remove itself from the call entirely. In other embodiments, the endpoint 106 may maintain at least a minimum level of involvement until the call is successfully re-established between the endpoints 104 and 2502. This allows the endpoint 106 to maintain the call if the endpoints 104 and 2502 fail to complete the transfer. Accordingly, the involvement of the endpoint 106 may vary depending on the particular implementation of the transfer/forward process. For example, the transfer/forward process may operate to mimic the functionality provided by a switch from a user's perspective (e.g., to achieve the same behavior in the peer-to-peer hybrid network as provided by a switch in a conventional telephone system) or may provide additional functionality that is not present in conventional telephone systems. This additional behavior may be visible to a user (e.g., a flashing light, text, or another indicator informing the user that the transfer process is underway but not complete) or may operate in the background without the user being aware of it.

In step 2612, the endpoint 2502 determines whether the endpoint 104 identified in the transfer request is a buddy. In the present example, the endpoint 104 is a buddy of the endpoint 2502. In step 2614, the endpoints 104 and 2502 establish one or more communication routes as described previously in the present application. For example, the endpoints 104 and 2502 may identify outgoing and incoming routes from available private, public, and relay routes. This process may include performing STUN requests (not shown) and sending messages to each other in order to select one or more of the routes as previously described.

In step 2616, the endpoint 2502 sends an update message to the endpoint 104. In the present example, the update message is the SIP signaling message UPDATE, but it is understood that many different messages may be sent to initiate the update. The UPDATE message may include information needed to establish the call. In step 2618, the endpoint 104 sends a message in response to the UPDATE, such as a 200 OK. In step 2620, an active call exists between the endpoints 104 and 2502 and the endpoint 106 has ended any involvement in the call.

Figure 26B:
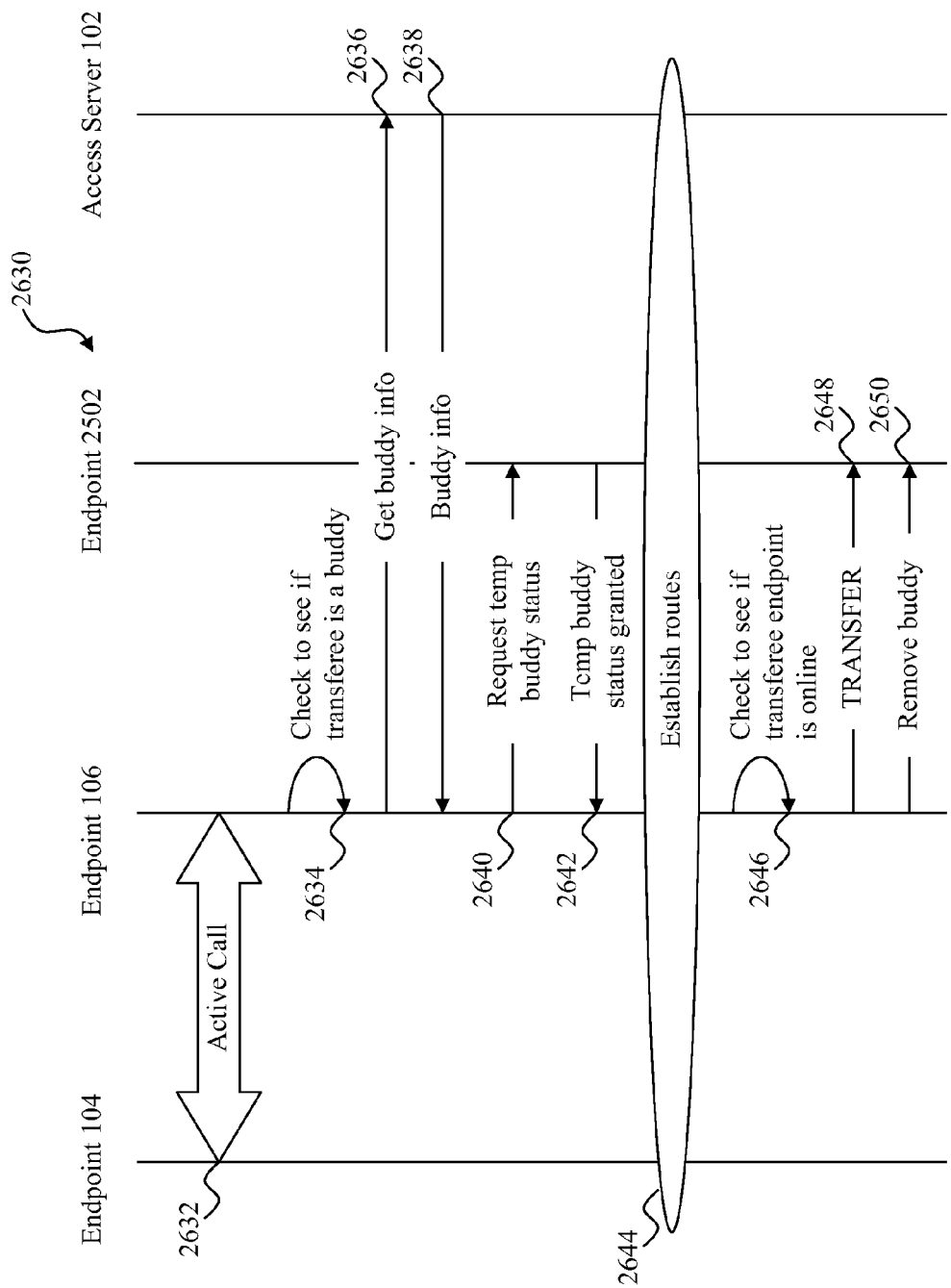
FIG. 26B is a sequence diagram illustrating one embodiment of a message sequence that may occur when a call is being transferred between endpoints within the environment of FIG. 25 when at least two of the endpoints are not buddies.

Referring to FIG. 26B, a sequence diagram illustrates one embodiment of a message sequence 2630 that may occur in the environment 2500 of FIG. 25 when a session is transferred from the endpoint 106 to the endpoint 2502. In step 2632, the endpoints 104 and 106 are involved in an active call (although it could be inactive in some embodiments) and the endpoint 106 wants to transfer the call to the endpoint 2502, which will move the call to the endpoints 104 and 2502. At the end of this process, the endpoint 106 will no longer be involved in the call. Accordingly, the endpoint 106 must communicate the transfer request and the endpoints 104, 106, and 2502 must communicate with one another in order to accomplish the transfer in the hybrid peer-to-peer network of FIG. 25.

In step 2634, the endpoint 106 determines whether the endpoint 2502 is a buddy. As described previously, various endpoints involved in a call transfer/forwarding process may or may not be buddies. As this affects the ability of the endpoints to communicate as needed, the endpoints may determine whether a particular endpoint is a buddy as needed. In the present example, the endpoints 106 and 2502 are not buddies and so may not communicate freely. For example, the endpoint 106 does not have permission to communicate with the endpoint 2502 and so may not send a transfer request to the endpoint 2502. Furthermore, as the endpoint 106 may obtain address information for buddies based on the login process or when contacted by a buddy that has just logged in, the endpoint 106 may not even have the address information needed to communicate with the endpoint 2502.

Accordingly, in step 2636, the endpoint 106 contacts the access server 102 and requests the contact information for the endpoint 2502. In step 2638, the access server 102 responds with the requested information. In step 2640, the endpoint 106 sends a request to the endpoint 2502 for temporary buddy status. This request may differ from previously described requests for a buddy relationship in that this request may specifically represent a request for a temporary relationship. For example, a regular buddy request may simply request a buddy relationship. A temporary buddy request may indicate not only that a temporary buddy relationship is being requested, but may also include such information as why the request is being made. For example, the request may include information that the endpoint 104 wants to transfer a call. The request may contain additional levels of detail, such as the other party in the call (i.e., the endpoint 104). In other embodiments, the request may simply indicate the desire for a temporary buddy relationship without any other information.

Such temporary buddy requests may be automatically granted by the endpoint 2502 or may require user action. For example, in an enterprise environment, call transfer/forwarding may be a needed function with calls routinely being transferred within the enterprise. In such a system, assuming the endpoints are not automatically buddies with all other endpoints within the enterprise, the endpoints may be configured to automatically accept temporary buddy requests from other endpoints within the enterprise. This enables calls to be transferred/forwarded more readily than would a situation where each request would have to be acted upon by a user. The user may still accept or reject the transfer, but not the temporary buddy request. However, in an environment where not all users are trusted (i.e., at a public/consumer level or across businesses), it may not be desirable to automatically accept temporary buddy requests. Accordingly, the behavior of the endpoint 2502 with respect to incoming temporary buddy requests may be modified based on any number of factors (e.g., security and/or efficiency).

The access server 102 may or may not be informed of the temporary buddy status. As described previously with respect to a normal buddy relationship, when a buddy relationship is established between two endpoints, the access server 102 is notified so that it can update the information associated with each endpoint (e.g., to let an endpoint know which buddies are online when the endpoint logs in). However, due to the nature of the temporary buddy relationship established for call transfer/forwarding, there may be no need for the access server 102 to be aware of the relationship. Accordingly, the endpoints may not notify the access server 102 that the temporary relationship has been established. In other embodiments, the access server 102 may be notified. In such cases, the access server 102 may not update the profiles of the endpoints with the temporary buddy relationship. In still other embodiments, the access server 102 may update the profiles to aid in re-establishing the call if one of the endpoints loses access or otherwise has problems with the call.

In the present example, the endpoint 2502 accepts the temporary buddy request and responds with a message in step 2642 indicating the acceptance. In other embodiments, a specific message may not be returned, but the next step 2644 may be initiated by the endpoint 2502 and may represent acceptance of the temporary buddy request.

In step 2644, the endpoints 106 and 2502 establish one or more communication routes as described previously. For example, the endpoints 106 and 2502 may identify outgoing and incoming routes from available private, public, and relay routes. This process may include performing STUN requests (not shown) and sending messages to each other in order to select one or more of the routes as previously described.

In step 2646, the endpoint 106 determines whether the endpoint 2502 is online. In the present example, the online presence of the endpoint 2502 at this point may trigger the transfer. Accordingly, in step 2648, the endpoint 106 sends a transfer request to the endpoint 2502. The sequence may then continue as described with respect to FIG. 26A with the exception of step 2650, in which the endpoint 106 sends a message to the endpoint 2502 to remove the endpoint 106 as a temporary buddy.

Figure 26C:
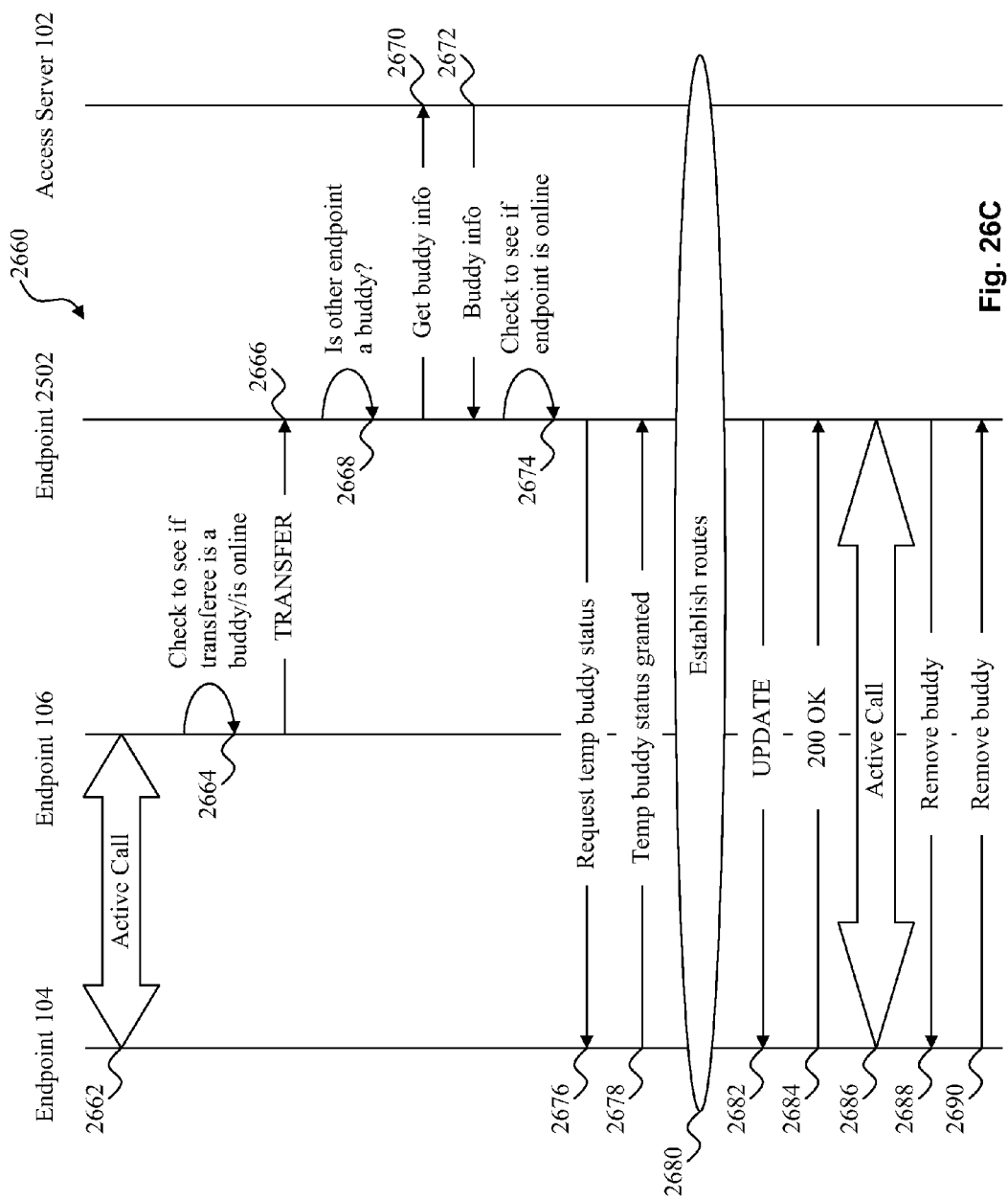
FIG. 26C is a sequence diagram illustrating another embodiment of a message sequence that may occur when a call is being transferred between endpoints within the environment of FIG. 25 when at least two of the endpoints are not buddies.

Referring to FIG. 26C, a sequence diagram illustrates one embodiment of a message sequence 2660 that may occur in the environment 2500 of FIG. 25 when a session is transferred from the endpoint 106 to the endpoint 2502. In step 2662, the endpoints 104 and 106 are involved in an active call (although it could be inactive in some embodiments) and the endpoint 106 wants to transfer the call to the endpoint 2502, which will move the call to the endpoints 104 and 2502. At the end of this process, the endpoint 106 will no longer be involved in the call. Accordingly, the endpoint 106 must communicate the transfer request and the endpoints 104, 106, and 2502 must communicate with one another in order to accomplish the transfer in the hybrid peer-to-peer network of FIG. 25.

In step 2664, the endpoint 106 determines whether the endpoint 2502 is a buddy and online. It is understood that step 2664 may actually be multiple steps as described previously. In the present example, the endpoint 2502 is both a buddy and online. Accordingly, in step 2666, the endpoint 106 sends a transfer request to the endpoint 2502.

In step 2668, the endpoint 2502 determines whether the endpoint 104 is a buddy. In the present example, the endpoints 104 and 2502 are not buddies and so may not communicate freely. Accordingly, in step 2670, the endpoint 2502 contacts the access server 102 and requests the contact information for the endpoint 104. In step 2672, the access server 102 responds with the requested information. In step 2674, the endpoint 2502 determines whether the endpoint 104 is online. If so, in step 2676, the endpoint 2502 sends a request to the endpoint 104 for temporary buddy status as described previously with respect to step 2640 of FIG. 26B.

In the present example, the endpoint 104 accepts the temporary buddy request and responds with a message in step 2678 indicating the acceptance. In step 2680, the endpoints 104 and 2502 establish one or more communication routes as described previously. For example, the endpoints 104 and 2502 may identify outgoing and incoming routes from available private, public, and relay routes. This process may include performing STUN requests (not shown) and sending messages to each other in order to select one or more of the routes as previously described.

In step 2682, the endpoint 2502 sends an update message to the endpoint 104. In the present example, the update message is the SIP signaling message UPDATE and may include information needed to establish the call. In step 2684, the endpoint 104 sends a message in response to the UPDATE, such as a 200 OK. In step 2686, an active call exists between the endpoints 104 and 2502 and the endpoint 106 has ended any involvement in the call. In steps 2688 and 2690, the endpoints 104 and 2502 send messages to remove the temporary buddy status. It is understood that both endpoints need not send such a message in some embodiments.

Figure 27:
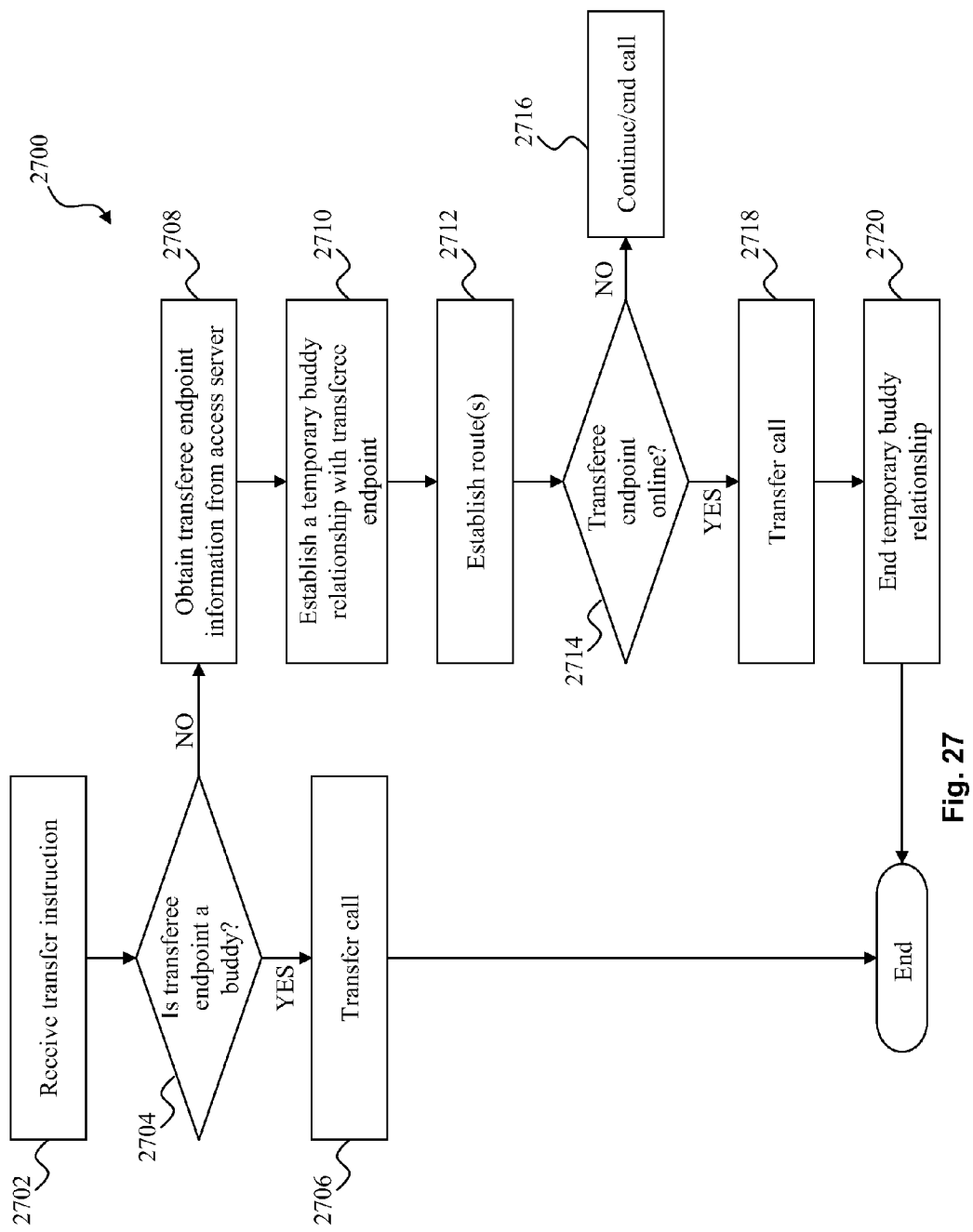
FIG. 27 is a flow chart illustrating one embodiment of a method that may be executed by an endpoint that is transferring the call within the environment of FIG. 25.

Referring to FIG. 27, a flow chart illustrates one embodiment of a method 2700 that may be used by the endpoint 106 to transfer a call within the environment of FIG. 25. The method 2700 may be used in both call transfers and call forwarding.

In step 2702, the endpoint 106 receives a transfer instruction indicating that the call is to be transferred. For example, the endpoint 106 may receive user input indicating that the user wants to transfer the call to a particular endpoint (e.g., the endpoint 2502). In step 2704, a determination is made as to whether the transferee endpoint (e.g., the endpoint 2502) is a buddy. If the endpoint 2502 is a buddy, the call is transferred from the endpoint 106 to the endpoint 2502 in step 2706. For example, a message may be sent from the endpoint 106 to the endpoint 2502 to transfer the call. The method 2700 then ends.

If the endpoint 2502 is not a buddy as determined in step 2704, the method 2700 moves to step 2708. In step 2708, the endpoint 106 obtains information corresponding to the endpoint 2502 from the access server 102. For example, the endpoint 106 may send a request message to the access server 102 and receive a response containing address/port information for the endpoint 2502. This information enables the endpoint 106 to directly contact the endpoint 2502. Accordingly, in step 2710, the endpoint 106 establishes a temporary buddy relationship with the endpoint 2502. For example, the endpoint 106 may send a temporary buddy request to the endpoint 2502 and the endpoint 2502 may respond with a message accepting the request. Although not shown, the transfer will fail if this buddy relationship is needed but fails to be established.

In step 2712, the endpoints 106 and 2502 establish one or more communication routes as previously described. In step 2714, a determination may be made as to whether the endpoint 2502 is online. If the endpoint 2502 is not online, the method 2700 moves to step 2716, where the current call (if active) may be continued or ended. For example, the endpoint 106 may indicate to a user that the endpoint 2502 is not available and may prompt the user to provide instructions on what to do next.

If the endpoint 2502 is online as determined in step 2714, the call is transferred from the endpoint 106 to the endpoint 2502 in step 2718. For example, a message may be sent from the endpoint 106 to the endpoint 2502 to transfer the call. In step 2720, the endpoint 106 ends the temporary buddy relationship with the endpoint 2502. For example, the endpoint 106 may send a request to the endpoint 2502 to remove the endpoint 106 as a buddy. In some embodiments, the request may be automatically granted and the buddy relationship may be ended without any user action. The method 2700 then ends.

Figure 28:
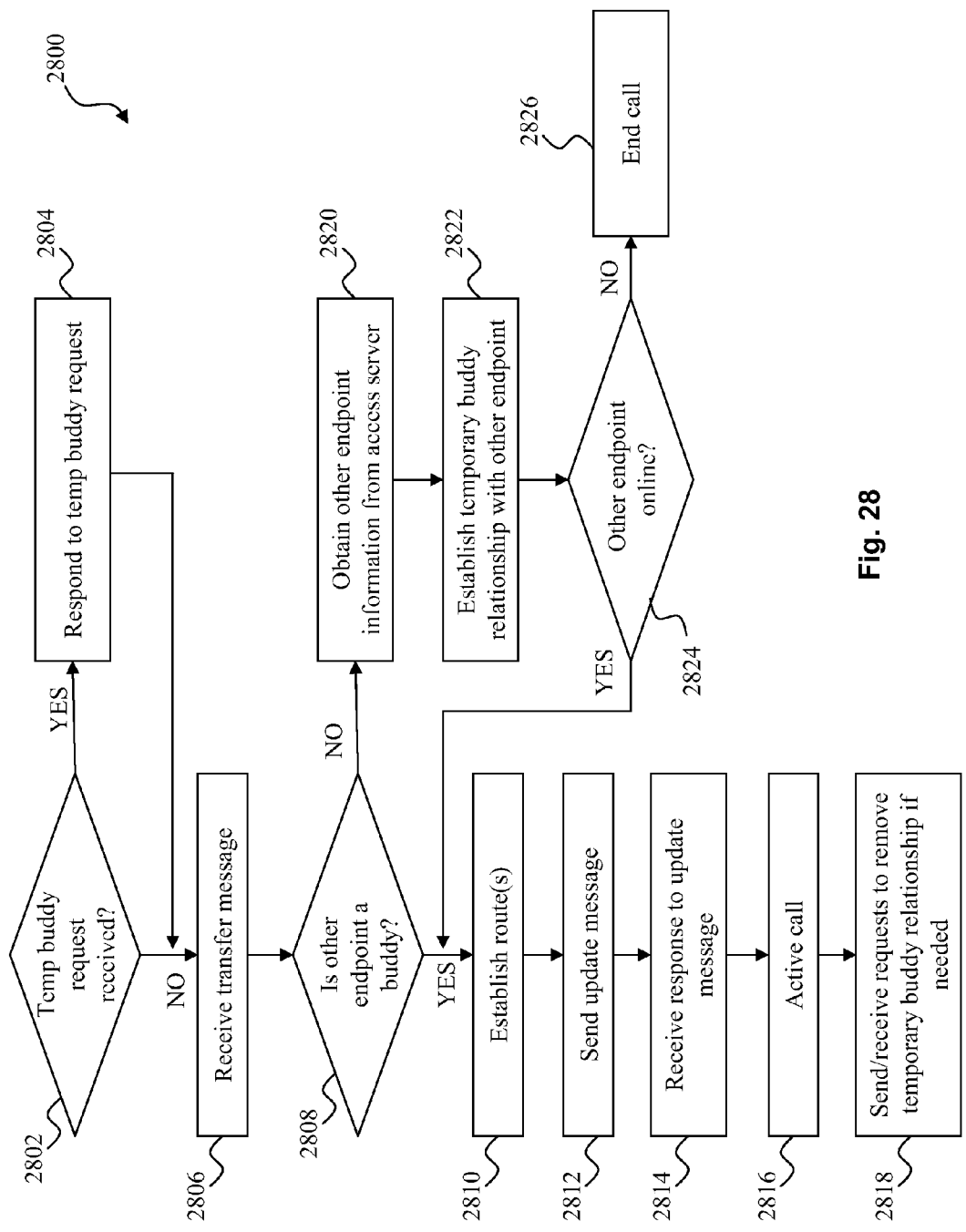
FIG. 28 is a flow chart illustrating one embodiment of a method that may be executed by an endpoint that is receiving the transferred call within the environment of FIG. 25.

Referring to FIG. 28, a flow chart illustrates one embodiment of a method 2800 that may be used by the endpoint 2502 to receive a transferred call in the environment of FIG. 25. The method 2800 may be used in both call transfers and call forwarding.

In step 2802, a determination may be made as to whether a temporary buddy request has been received. As described previously, if the endpoint 2502 and the transferring endpoint (e.g., the endpoint 106) are not buddies, then the endpoints cannot communicate. In this case, a temporary buddy request will be received from the endpoint 106 and the endpoint 2502 may respond in step 2804 (e.g., accepting the temporary relationship). However, if the endpoints 106 and 2502 are already buddies, no request will be received in step 2802.

In step 2806, the endpoint 2502 receives a transfer message indicating that an endpoint (e.g., the endpoint 106) wants to transfer a call. In step 2808, a determination is made as to whether the endpoint that is to be on the other end of the call (e.g., the endpoint 104) is a buddy of the endpoint 2502. In step 2810, the endpoints 104 and 2502 establish one or more communication routes as previously described. If the endpoint 104 is a buddy, the endpoint 2502 sends an update message to the endpoint 104 in step 2812 to initiate a call with the endpoint 104 and receives a response in step 2814. In step 2816, the endpoint 2502 is engaged in an active call with the endpoint 104. In step 2818, one or both of the endpoints 104 and 2502 may send and/or receive messages to remove any temporary buddy relationship that was established for the call.

If the endpoint 104 is not a buddy as determined in step 2808, the method 2800 moves to step 2820. In step 2820, the endpoint 2502 obtains information corresponding to the endpoint 104 from the access server 102. For example, the endpoint 2502 may send a request message to the access server 102 and receive a response containing address/port information for the endpoint 104. This information enables the endpoint 2502 to directly contact the endpoint 104. Accordingly, in step 2822, the endpoint 2502 establishes a temporary buddy relationship with the endpoint 104. For example, the endpoint 2502 may send a temporary buddy request to the endpoint 104 and the endpoint 104 may respond with a message accepting the request.

In step 2824, a determination may be made as to whether the endpoint 104 is online. If the endpoint 104 is not online, the method 2800 moves to step 2826 and the endpoint 2502 may call ends. If the endpoint 104 is online, the method 2800 continues to step 2810 as previously described.

Figure 29:
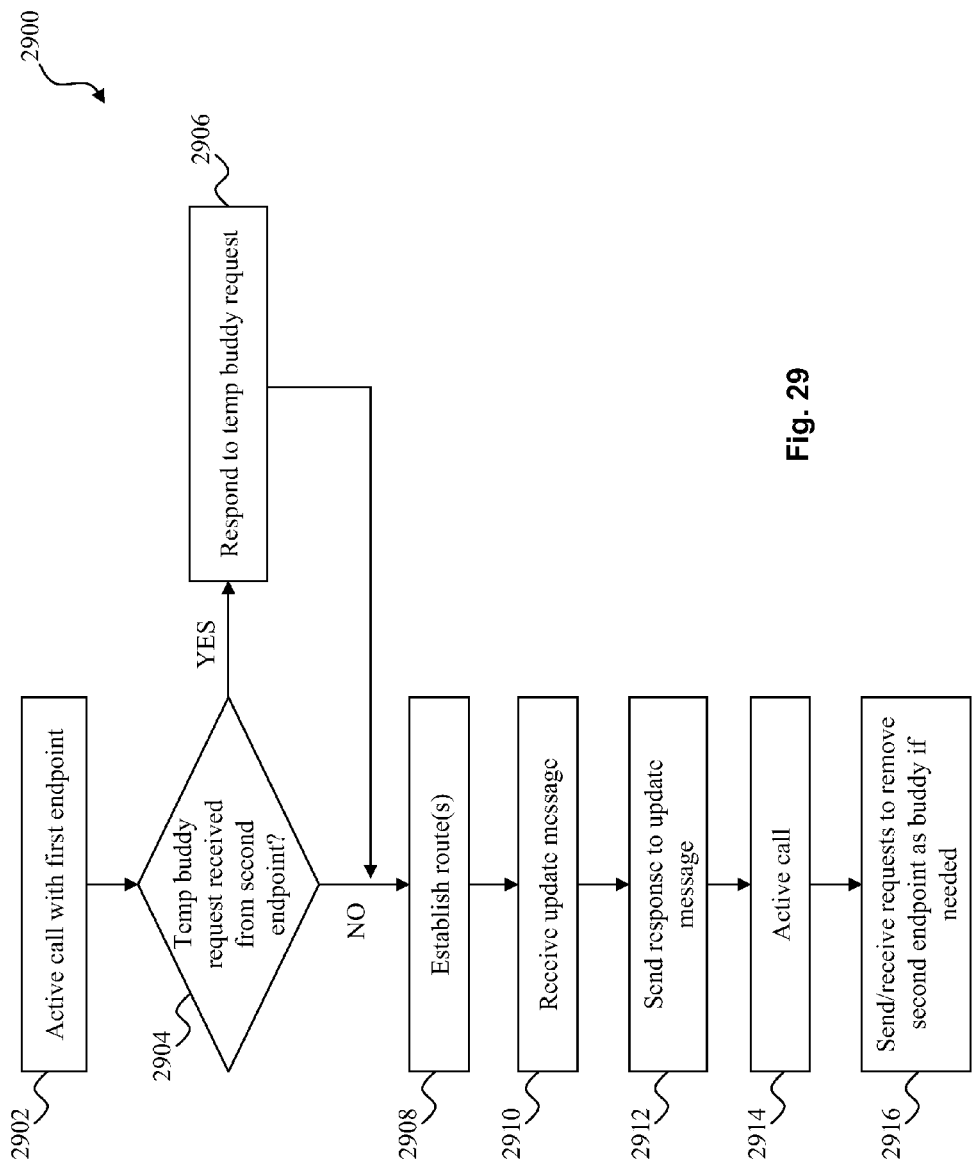
FIG. 29 is a flow chart illustrating one embodiment of a method that may be executed by an endpoint that is involved in a call being transferred between two other endpoints within the environment of FIG. 25.

Referring to FIG. 29, a flow chart illustrates one embodiment of a method 2900 that may be used by the endpoint 104 in the environment of FIG. 25. The method 2900 may be used in both call transfers and call forwarding.

In step 2902, the endpoint 104 is involved in an active call with another endpoint (e.g., the endpoint 106). It is understood that in some embodiments the call may not be active and the endpoint 104 may be waiting to be forwarded. In step 2904, a determination may be made as to whether a temporary buddy request has been received. As described previously, if the endpoint 104 and the other endpoint to be involved in the call (e.g., the endpoint 2502) are not buddies, then the endpoints cannot communicate. In this case, a temporary buddy request will be received from the endpoint 2502 and the endpoint 104 may respond in step 2906 (e.g., accepting the temporary relationship). However, if the endpoints 104 and 2502 are already buddies, no request will be received in step 2904.

In step 2908, the endpoints 104 and 2502 establish one or more communication routes as previously described. In step 2910, the endpoint 104 receives an update message from the endpoint 2502 and, in step 2912, responds to the update message. Based on the update message, the endpoint updates its information and enters an active call with the endpoint 2502. Because the endpoint 104 is already in a call, handling of the update message by the endpoint 104 can be tied to the existing call. In step 2914, the endpoints 104 and 2502 are involved in the active call. In step 2916, one or both of the endpoints 104 and 2502 may send and/or receive messages to remove any temporary buddy relationship that was established for the call.

It is understood that various modifications may be made to the sequence diagrams and flow charts describing embodiments of call transfer/forwarding. For example, checking whether the other endpoint is online may not be done. An endpoint may instead rely on previous indications or may simply attempt the transfer. Furthermore, route establishment may occur in a different order than shown, although such routes need to be established.

Figure 30:
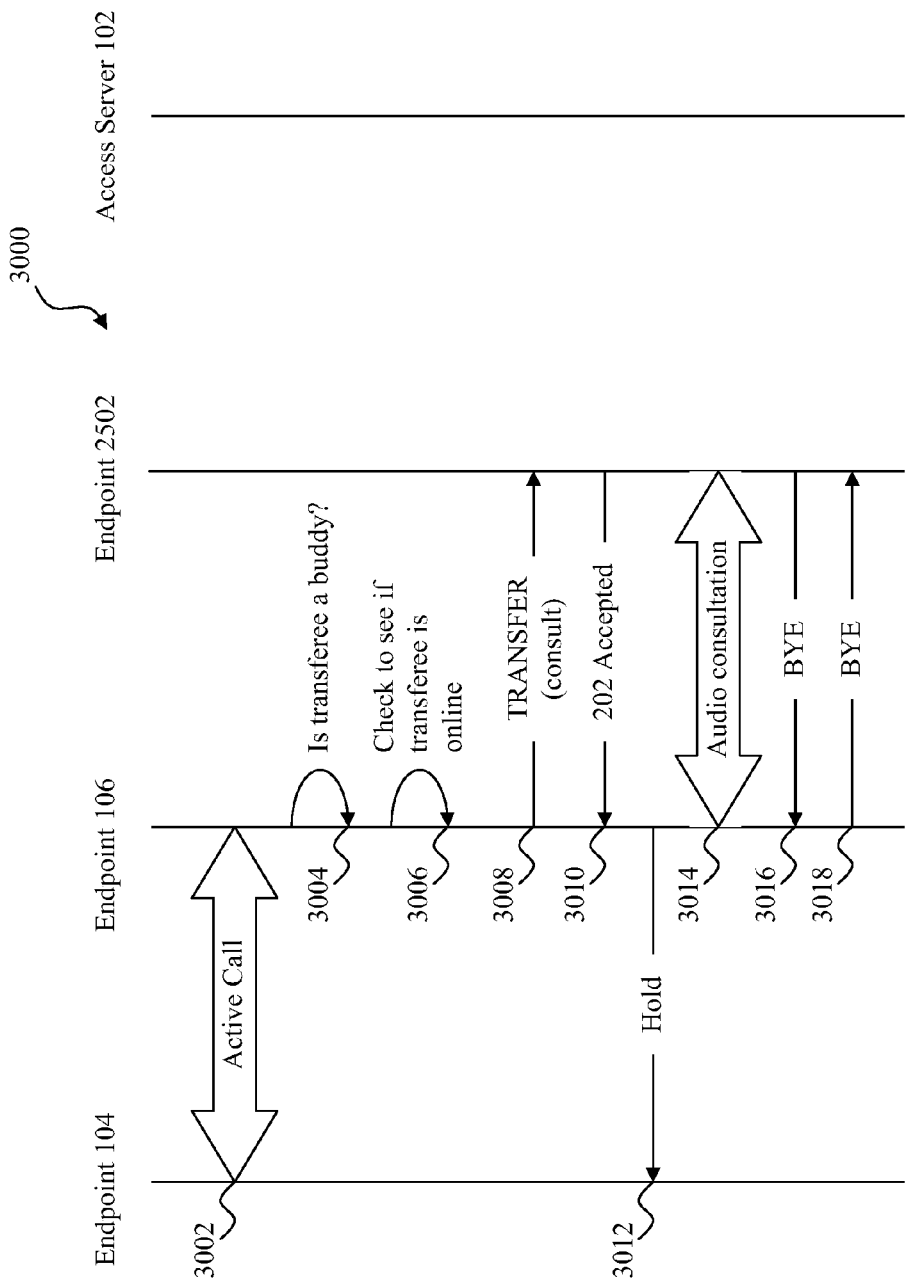
FIG. 30 is a sequence diagram illustrating an embodiment of a message sequence that may occur when a call is being transferred between endpoints within the environment of FIG. 25 using consultation prior to the transfer.

Referring to FIG. 30, a sequence diagram illustrates one embodiment of a message sequence 3000 that may occur in the environment 2500 of FIG. 25 when a session is transferred from the endpoint 106 to the endpoint 2502. In some of the described embodiments, the transfers/forwards may be blind. In other words, they may occur without first determining whether the call transfer/forward will be accepted. However, the present embodiment uses consultation, which entails establishing a communication path (e.g., an audio channel) with the endpoint to which the call is to be transferred before handing off a call.

Steps 3002, 3004, and 3006 are similar or identical to corresponding steps 2602, 2604, and 2606, respectively, of FIG. 26A and are not discussed in detail in the present example.

In step 3008, the endpoint 106 sends a transfer request to the endpoint 2502. In the present example, the transfer request includes information denoting consultation. For example, the transfer request may include a tag for consultation, and the endpoint 2502 may be configured to interpret this tag as a request for consultation with the endpoint that sent the message (i.e., the endpoint 106). Accordingly, in step 3010, the endpoint 2502 responds with a message, such as a 202 Acceptance message, indicating that the endpoint 2502 accepts the consultation request. In step 3012, the endpoint 106 sends a HOLD message to the endpoint 104 to put the active call of step 3002 on hold. Although not shown, it is understood that the endpoint 104 may respond to the HOLD message with an acknowledgement or another response.

In step 3014, the endpoints 106 and 2502 establish a consultation channel. For example, the endpoints 106 and 2502 may establish an audio channel to enable users of the endpoints 106 and 2502 to communicate prior to actually transferring the call. Although not shown, it is understood that one or more routes may be established between the endpoints 106 and 2502 prior to the consultation as previously described. Furthermore, it is understood that the consultation channel may include video, audio, and/or data and is not limited to audio. In steps 3016 and 3018, one or both of the endpoints 106 and 2502 may end the consultation by sending a message such as a BYE message. After the consultation ends, the message sequence 3000 may then continue at step 2610 of FIG. 26A or another appropriate step.

It is understood that consulting may also be used with call forwarding. Accordingly, it is understood that the present disclosure may incorporate many different types of transferring/forwarding and is not limited to those specifically described herein.

Figure 31:
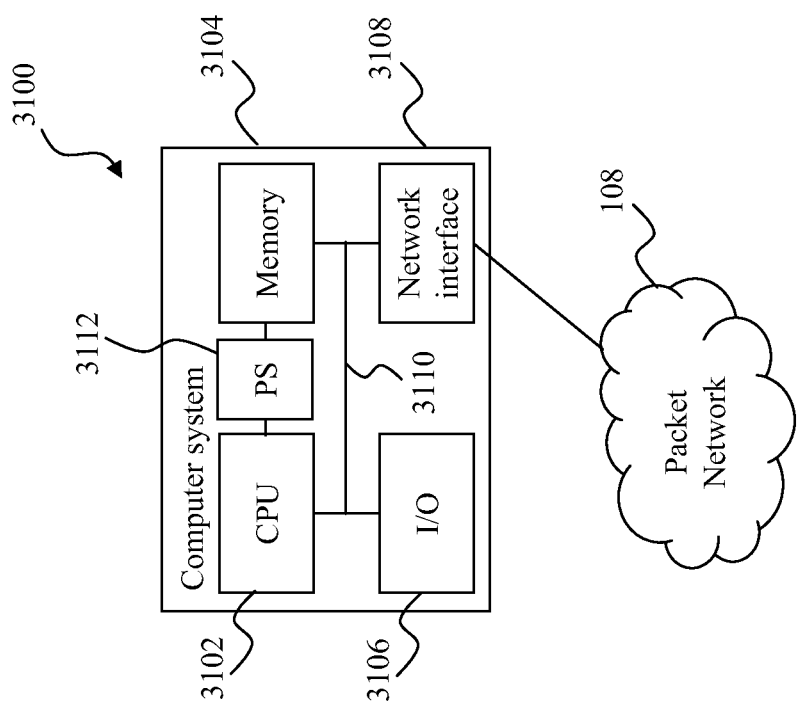
FIG. 31 is a simplified diagram of one embodiment of a computer system that may be used in embodiments of the present disclosure.

Referring to FIG. 31, one embodiment of a computer system 3100 is illustrated. The computer system 3100 is one possible example of a system component or device such as an endpoint or an access server. The computer system 3100 may include a central processing unit ("CPU") 3102, a memory unit 3104, an input/output ("I/O") device 3106, and a network interface 3108. The components 3102, 3104, 3106, and 3108 are interconnected by a transport system (e.g., a bus) 3110. A power supply (PS) 3112 may provide power to components of the computer system 3100, such as the CPU 3102 and memory unit 3104. It is understood that the computer system 3100 may be differently configured and that each of the listed components may actually represent several different components. For example, the CPU 3102 may actually represent a multi-processor or a distributed processing system; the memory unit 3104 may include different levels of cache memory, main memory, hard disks, and remote storage locations; the I/O device 3106 may include monitors, keyboards, and the like; and the network interface 3108 may include one or more network cards providing one or more wired and/or wireless connections to the packet network 108 (FIG. 1). Therefore, a wide range of flexibility is anticipated in the configuration of the computer system 3100.

The computer system 3100 may use any operating system (or multiple operating systems), including various versions of operating systems provided by Microsoft (such as WINDOWS), Apple (such as Mac OS X), UNIX, and LINUX, and may include operating systems specifically developed for handheld devices, personal computers, and servers depending on the use of the computer system 3100. The operating system, as well as other instructions (e.g., for the endpoint engine 252 of FIG. 2 if an endpoint), may be stored in the memory unit 3104 and executed by the processor 3102. For example, if the computer system 3100 is the endpoint 106, the memory unit 3104 may include instructions for sending and receiving messages, communicating with the endpoint 2502, and transferring the call to the endpoint 2502.

In another embodiment, a method for transferring a call in a hybrid peer-to-peer network comprises receiving, by a first endpoint, an instruction to transfer a call to a second endpoint, wherein the first endpoint is engaged in the call with a third endpoint when the instruction is received; determining, by the first endpoint, whether the first endpoint has a buddy relationship with the second endpoint, wherein the first endpoint cannot transfer the call to the second endpoint unless the first and second endpoints have a buddy relationship because the buddy relationship is needed to provide permission by the second endpoint for the first endpoint to communicate with the second endpoint; establishing, by the first endpoint, a buddy relationship with the second endpoint if the first and second endpoints are not in a buddy relationship; sending, by the first endpoint, at least one transfer message to the second endpoint to transfer the call, wherein the at least one transfer message indicates that the first endpoint wants to transfer the call to the second endpoint and identifies the third endpoint as being involved in the call; and ending, by the first endpoint, the first endpoint's involvement in the call after the call is transferred. The method may further comprise sending, by the first endpoint, a message to the second endpoint to end the buddy relationship if the buddy relationship was established in order to transfer the call. The method may further comprise communicating, by the first endpoint, with an access server in the hybrid peer-to-peer network to obtain address information for the second endpoint if the first and second endpoints are not in a buddy relationship. Establishing the buddy relationship includes sending a message from the first endpoint to the second endpoint based on the address information obtained from the access server. The request for the buddy relationship may identify that the buddy relationship is temporary. The method may further comprise answering, by the first endpoint, the call before receiving the instruction to transfer the call. The call may not be answered by the first endpoint before receiving the instruction to transfer the call. The method may further comprise determining, by the first endpoint, whether the second endpoint is online before sending the at least one transfer message to the second endpoint. The method may further comprise establishing, by the first endpoint, at least one communication route with the second endpoint, wherein the at least one communication route is established before sending the at least one transfer message.

In yet another embodiment, a method for receiving a call transfer in a hybrid peer-to-peer network comprises receiving, by a first endpoint, a transfer message from a second endpoint requesting that the first endpoint accept a call transfer for a call in which the second endpoint is engaged with a third endpoint, wherein the call transfer will engage the first endpoint in the call with the third endpoint; accepting, by the first endpoint, the call transfer from the second endpoint; determining, by the first endpoint, whether the first endpoint has a buddy relationship with the third endpoint, wherein the first endpoint cannot communicate with the third endpoint to aid in transferring the call unless the first endpoint and third endpoint have a buddy relationship because the buddy relationship is needed to provide permission by the third endpoint for the first endpoint to communicate with the third endpoint; establishing, by the first endpoint, a buddy relationship with the third endpoint if the first and third endpoints are not in a buddy relationship; sending, by the first endpoint, at least one update message to the third endpoint to aid in transferring the call, wherein the at least one update message indicates that the third endpoint is to update its call information to include the first endpoint in the call; and engaging, by the first endpoint, in the call with the third endpoint. The method may further comprise receiving, by the first endpoint, a request for a buddy relationship from the second endpoint before receiving the transfer message, wherein the transfer message cannot be received from the second endpoint unless the first and second endpoints have a buddy relationship. The method may further comprise ending the buddy relationship with the second endpoint if the buddy relationship was established in order to transfer the call. The request for the buddy relationship may identify that the buddy relationship is temporary. The method may further comprise communicating, by the first endpoint, with an access server in the hybrid peer-to-peer network to obtain address information for the third endpoint if the first and third endpoints are not in a buddy relationship. The method may further comprise determining, by the first endpoint, whether the third endpoint is online before sending the at least one update message to the third endpoint. The method may further comprise ending the call if the third endpoint is not online. The method may further comprise establishing, by the first endpoint, at least one communication route with the third endpoint, wherein the at least one communication route is established before sending the at least one update message.

In still another embodiment, a system comprises a network interface; a processor coupled to the network interface; and a memory coupled to the processor and containing a plurality of instructions for execution by the processor, the instructions including instructions for configuring a first endpoint stored at least partially in the memory to transfer a call between the first endpoint and a third endpoint from the first endpoint to a second endpoint by: receiving an instruction to transfer the call to the second endpoint; determining whether the first endpoint has a buddy relationship with the second endpoint; establishing a buddy relationship with the second endpoint if the first and second endpoints are not in a buddy relationship; sending at least one transfer message to the second endpoint to transfer the call, wherein the at least one transfer message indicates that the first endpoint wants to transfer the call to the second endpoint and identifies the third endpoint as being involved in the call; ending the first endpoint's involvement in the call after the call is transferred; and ending the buddy relationship with the second endpoint if the buddy relationship was established in order to transfer the call. The system may further comprise instructions for: communicating with an access server in the hybrid peer-to-peer network to obtain address information for the second endpoint if the first and second endpoints are not in a buddy relationship; and sending a message from the first endpoint to the second endpoint based on the address information obtained from the access server to establish the buddy relationship. The system may further comprise instructions for answering the call before receiving the instruction to transfer the call.

While the preceding description shows and describes one or more embodiments, it will be understood by those skilled in the art that various changes in form and detail may be made therein without departing from the spirit and scope of the present disclosure. For example, various steps illustrated within a particular sequence diagram or flow chart may be combined or further divided. In addition, steps described in one diagram or flow chart may be incorporated into another diagram or flow chart. Some steps may be performed in an order different from that shown and/or may overlap. Furthermore, the described functionality may be provided by hardware and/or software, and may be distributed or combined into a single platform. Additionally, functionality described in a particular example may be achieved in a manner different than that illustrated, but is still encompassed within the present disclosure. Therefore, the claims should be interpreted in a broad manner, consistent with the present disclosure.

What is claimed is:

1. A method for transferring a call in a hybrid peer-to-peer network comprising:
   receiving, by a peer-to-peer first endpoint, an instruction to transfer a call to a peer-to-peer second endpoint, wherein the first endpoint is engaged in the call with a peer-to-peer third endpoint when the instruction is received;
   determining, by the first endpoint, whether the first endpoint has a buddy relationship with the second endpoint based on a profile obtained by the first endpoint from an access server when authenticating with the hybrid peer-to-peer network, wherein the first endpoint cannot transfer the call to the second endpoint unless the first and second endpoints have a buddy relationship because the buddy relationship is needed to provide permission by the second endpoint for the first endpoint to communicate with the second endpoint, and wherein the profile contains all information needed to communicate with the second endpoint if the first and second endpoints have a buddy relationship;
   establishing, by the first endpoint, a buddy relationship with the second endpoint if the first and second endpoints are not in a buddy relationship, wherein establishing the buddy relationship includes:
      communicating, by the first endpoint, with the access server in the hybrid peer-to-peer network to obtain address information for the second endpoint; and
      sending, by the first endpoint, a request message for the buddy relationship to the second endpoint based on the address information obtained from the access server, wherein the request message identifies that the buddy relationship is to be temporary;
   sending, by the first endpoint, at least one transfer message to the second endpoint to transfer the call, wherein the at least one transfer message indicates that the first endpoint wants to transfer the call to the second endpoint and identifies the third endpoint as being involved in the call, and wherein the transfer message contains all information needed by the second endpoint to accept the transfer from the first endpoint because the hybrid peer-to-peer network does not contain a central switching mechanism;
   ending, by the first endpoint, the first endpoint's involvement in the call after the call is transferred; and
   sending, by the first endpoint, a message to the second endpoint to end the buddy relationship if the buddy relationship was established in order to transfer the call.

2. The method of claim 1 further comprising answering, by the first endpoint, the call before receiving the instruction to transfer the call.

3. The method of claim 1 wherein the call is not answered by the first endpoint before receiving the instruction to transfer the call.

4. The method of claim 1 further comprising determining, by the first endpoint, whether the second endpoint is online before sending the at least one transfer message to the second endpoint.

5. The method of claim 1 further comprising establishing, by the first endpoint, at least one communication route with the second endpoint, wherein the at least one communication route is established before sending the at least one transfer message.

6. A method for receiving a call transfer in a hybrid peer-to-peer network comprising:
   receiving, by a peer-to-peer first endpoint, a request for a buddy relationship from a peer-to-peer second endpoint before receiving a transfer message from the second endpoint, wherein the transfer message cannot be received from the second endpoint unless the first and second endpoints have a buddy relationship;
   receiving, by the first endpoint, the transfer message from the second endpoint requesting that the first endpoint accept a call transfer for a call in which the second endpoint is engaged with a peer-to-peer third endpoint, wherein the call transfer will engage the first endpoint in the call with the third endpoint;
   accepting, by the first endpoint, the call transfer from the second endpoint;
   determining, by the first endpoint, whether the first endpoint has a buddy relationship with the third endpoint based on a profile obtained by the first endpoint from an access server while authenticating with the hybrid peer-to-peer network, wherein the first endpoint cannot communicate with the third endpoint to aid in transferring the call unless the first endpoint and third endpoint have a buddy relationship because the buddy relationship is needed to provide permission by the third endpoint for the first endpoint to communicate with the third endpoint, and wherein the profile contains all information needed to communicate with the third endpoint if the first and third endpoints have a buddy relationship;
   establishing, by the first endpoint, a buddy relationship with the third endpoint if the first and third endpoints are not in a buddy relationship, wherein establishing the buddy relationship includes:
      communicating, by the first endpoint, with the access server in the hybrid peer-to-peer network to obtain address information for the third endpoint; and
      sending, by the first endpoint, a request message for the buddy relationship to the third endpoint based on the address information obtained from the access server, wherein the request message identifies that the buddy relationship is to be temporary;
   sending, by the first endpoint, at least one update message to the third endpoint to aid in transferring the call, wherein the at least one update message indicates that the third endpoint is to update its call information to include the first endpoint in the call;
   ending, by the first endpoint, the buddy relationship with the second endpoint if the buddy relationship was established in order to transfer the call; and
   engaging, by the first endpoint, in the call with the third endpoint.

7. The method of claim 6 further comprising determining, by the first endpoint, whether the third endpoint is online before sending the at least one update message to the third endpoint.

8. The method of claim 7 further comprising ending the call if the third endpoint is not online.

9. The method of claim 6 further comprising establishing, by the first endpoint, at least one communication route with the third endpoint, wherein the at least one communication route is established before sending the at least one update message.

10. A system comprising:
    a network interface;
    a processor coupled to the network interface; and
    a memory coupled to the processor and containing a plurality of instructions for execution by the processor, the instructions including instructions for configuring a peer-to-peer first endpoint stored at least partially in the memory to transfer a call between the first endpoint and a peer-to-peer third endpoint from the first endpoint to a peer-to-peer second endpoint by:

receiving an instruction to transfer the call to the second endpoint;

determining whether the first endpoint has a buddy relationship with the second endpoint based on a profile obtained by the first endpoint from an access server when authenticating with the hybrid peer-to-peer network, wherein the first endpoint cannot transfer the call to the second endpoint unless the first and second endpoints have a buddy relationship because the buddy relationship is needed to provide permission by the second endpoint for the first endpoint to communicate with the second endpoint, and wherein the profile contains all information needed to communicate with the second endpoint if the first and second endpoints have a buddy relationship;

establishing a buddy relationship with the second endpoint if the first and second endpoints are not in a buddy relationship, wherein establishing the buddy relationship includes:

communicating, by the first endpoint, with the access server in the hybrid peer-to-peer network to obtain address information for the second endpoint; and sending, by the first endpoint, a request message for the buddy relationship to the second endpoint based on the address information obtained from the access server, wherein the request message identifies that the buddy relationship is to be temporary;

sending at least one transfer message to the second endpoint to transfer the call, wherein the at least one transfer message indicates that the first endpoint wants to transfer the call to the second endpoint and identifies the third endpoint as being involved in the call, and wherein the transfer message contains all information needed by the second endpoint to accept the transfer from the first endpoint because the hybrid peer-to-peer network does not contain a central switching mechanism;

ending the first endpoint's involvement in the call after the call is transferred; and ending the buddy relationship with the second endpoint if the buddy relationship was established in order to transfer the call.

11. The system of claim 10 further comprising instructions for answering the call before receiving the instruction to transfer the call.

* * * * *